(12) United States Patent
Kim et al.

(10) Patent No.: US 12,048,013 B2
(45) Date of Patent: Jul. 23, 2024

(54) METHOD AND APPARATUS FOR DRIVING PDCP ENTITY DURING DAPS HANDOVER IN NEXT-GENERATION WIRELESS COMMUNICATION SYSTEM

(71) Applicant: Samsung Electronics Co., Ltd., Suwon-si (KR)

(72) Inventors: Donggun Kim, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 17/084,532

(22) Filed: Oct. 29, 2020

(65) Prior Publication Data

US 2021/0136829 A1     May 6, 2021

(30) Foreign Application Priority Data

Nov. 1, 2019    (KR) ........................ 10-2019-0138748

(51) Int. Cl.
    *H04W 74/0833*     (2024.01)
    *H04W 36/00*     (2009.01)
    *H04W 36/08*     (2009.01)

(52) U.S. Cl.
CPC ... *H04W 74/0833* (2013.01); *H04W 36/0072* (2013.01); *H04W 36/0083* (2013.01); *H04W 36/00838* (2023.05); *H04W 36/08* (2013.01)

(58) Field of Classification Search
CPC ......... H04W 74/0833; H04W 36/0083; H04W 36/02; H04W 36/18; H04W 76/30; H04W 36/0005; H04W 36/08
See application file for complete search history.

(56) References Cited

U.S. PATENT DOCUMENTS 11,425,614 B2 *   8/2022   You ................... H04W 36/0055
2020/0314714 A1 * 10/2020   Jung ..................... H04W 76/27
(Continued)

FOREIGN PATENT DOCUMENTS

KR    10-2019-0105930 A    9/2019

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0 (Sep. 2019), 962 pages.
(Continued)

*Primary Examiner* — Jae Y Lee
*Assistant Examiner* — Aixa A Guadalupe Cruz

(57) ABSTRACT

The disclosure relates to a communication method and system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure provides a method and an apparatus for operating a PDCP entity during a handover having no transmission/reception interruption.

12 Claims, 13 Drawing Sheets

(56) References Cited

U.S. PATENT DOCUMENTS

| | | | |
|---|---|---|---|
| 2021/0014764 A1* | 1/2021 | Zhang | H04W 12/106 |
| 2021/0014924 A1* | 1/2021 | Zheng | H04W 76/20 |
| 2021/0045029 A1 | 2/2021 | Ryu | |
| 2022/0159530 A1* | 5/2022 | Kim | H04W 36/305 |
| 2022/0361060 A1* | 11/2022 | Wallentin | H04W 36/00837 |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.4.0 (Jun. 2019), 52 pages.

ZTE Corporation et al., "Discussion on PDCP aspects for RUDI", 3GPP TSG RAN WG2 Meeting #107, Aug. 26-30, 2019, R2-1910758, 6 pages.

"5G; NR; Packet Data Convergence Protocol (PDCP) specification (3GPP TS 38.323 version 15.6.0 Release 15)", ETSI TS 138 323 V15.6.0 (Jul. 2019), 30 pages.

Nokia et al., "Analysis of DAPS Operation", 3GPP TSG-RAN WG2 Meeting #107, Aug. 26-30, 2019, R2-1909036, 7 pages.

Ericsson, "Handover interruption reduction for UM bearers", 3GPP TSG-RAN WG2#107-Bis, Oct. 14-18, 2019, Tdoc R2-1912357, 5 pages.

International Search Report dated Feb. 10, 2021 in connection with International Patent Application No. PCT/KR2020/014942, 3 pages.

Written Opinion of the International Searching Authority dated Feb. 10, 2021 in connection with International Patent Application No. PCT/KR2020/014942, 4 pages.

European Patent Office, "Supplementary European Search Report," dated Sep. 13, 2022, in connection with European Patent Application No. 20882481, 12 pages.

Ericsson, "Enhancements to Make-Before-Break for dual active protocol stacks", R2-1907310, 3GPP TSG-RAN WG2#106, 6 pages.

NEC, "DL PDCP SN handling for DAPS", R2-1909661, 3GPP TSG-RAN WG2#107, 3 pages.

Huawei et al., "Problems of ROHC handling for DAPS", R2-1913206, 3GPP TSG-RAN WG2#107bis, 3 pages.

Qualcomm Incorporated, "Supporting per DRB eMBB HO configuration", R3-195492, 3GPP TSG-RAN WG2#105bis, 2 pages.

* cited by examiner

METHOD AND APPARATUS FOR DRIVING PDCP ENTITY DURING DAPS HANDOVER IN NEXT-GENERATION WIRELESS COMMUNICATION SYSTEM

CROSS-REFERENCE TO RELATED APPLICATION

This application is based on and claims priority under 35 U.S.C. 119 to Korean Patent Application No. 10-2019-0138748 filed on Nov. 1, 2019 in the Korean Intellectual Property Office, the disclosure of which is herein incorporated by reference in its entirety.

BACKGROUND

1. Field

The disclosure relates to a next-generation mobile communication system and, more particularly, to a method and an apparatus for performing an efficient handover (hereinafter, referred to as a dual active protocol stack (DAPS) handover) such that there is no data transmission/reception interruption during a handover in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system defined by the 3GPP is called the New Radio (NR) system.

The 5G communication system is considered to be implemented in higher frequency (mmWave) bands, e.g., 60 gigaHertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques have been discussed and applied in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, in line with development of mobile communication systems, a handover having no data transmission/reception interruption has been extensively studied.

The above information is presented as background information only to assist with an understanding of the disclosure. No determination has been made, and no assertion is made, as to whether any of the above might be applicable as prior art with regard to the disclosure.

SUMMARY

There is a need for an efficient handover method in order to support a service having no data interruption, as well as a low level of transmission delay, in a next-generation mobile communication system.

According to an embodiment of the disclosure, a method performed by a terminal is provided. The method comprises: performing, with a target base station, a random access procedure for a dual active protocol stack (DAPS) handover based on a first message configuring a data radio bearer (DRB) as a DAPS bearer; identifying whether a packet data convergence protocol (PDCP) status report is triggered for the DRB; and transmitting, to the target base station, a second message including the PDCP status report, in case that the PDCP status report is triggered for the DRB.

According to an embodiment of the disclosure, a method performed by a base station is provided. The method comprises: performing, with a terminal, a random access procedure for a dual active protocol stack (DAPS) handover based on a first message configuring a data radio bearer (DRB) as a DAPS bearer; and receiving, from the terminal, a second message including a packet data convergence protocol (PDCP) status report, in case that the PDCP status report is triggered for the DRB.

According to an embodiment of the disclosure, a terminal is provided. The terminal comprises: a transceiver configured to transmit and receive a signal; and a controller configured to: perform, with a target base station, a random access procedure for a dual active protocol stack (DAPS) handover based on a first message configuring a data radio bearer (DRB) as a DAPS bearer, identify whether a packet data convergence protocol (PDCP) status report is triggered for the DRB, and transmit, to the target base station, a second message including the PDCP status report, in case that the PDCP status report is triggered for the DRB.

According to an embodiment of the disclosure, a terminal is provided. The base station comprises: a transceiver configured to transmit and receive a signal; and a controller configured to: perform, with a terminal, a random access procedure for a dual active protocol stack (DAPS) handover based on a first message configuring a data radio bearer (DRB) as a DAPS bearer, and receive, from the terminal, a second message including a packet data convergence protocol (PDCP) status report, in case that the PDCP status report is triggered for the DRB.

The disclosure proposes various efficient handover methods for guaranteeing that, when a handover is performed in a next-generation mobile communication system, no data interruption time occurs due to the handover, thereby supporting services having no data interruption.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
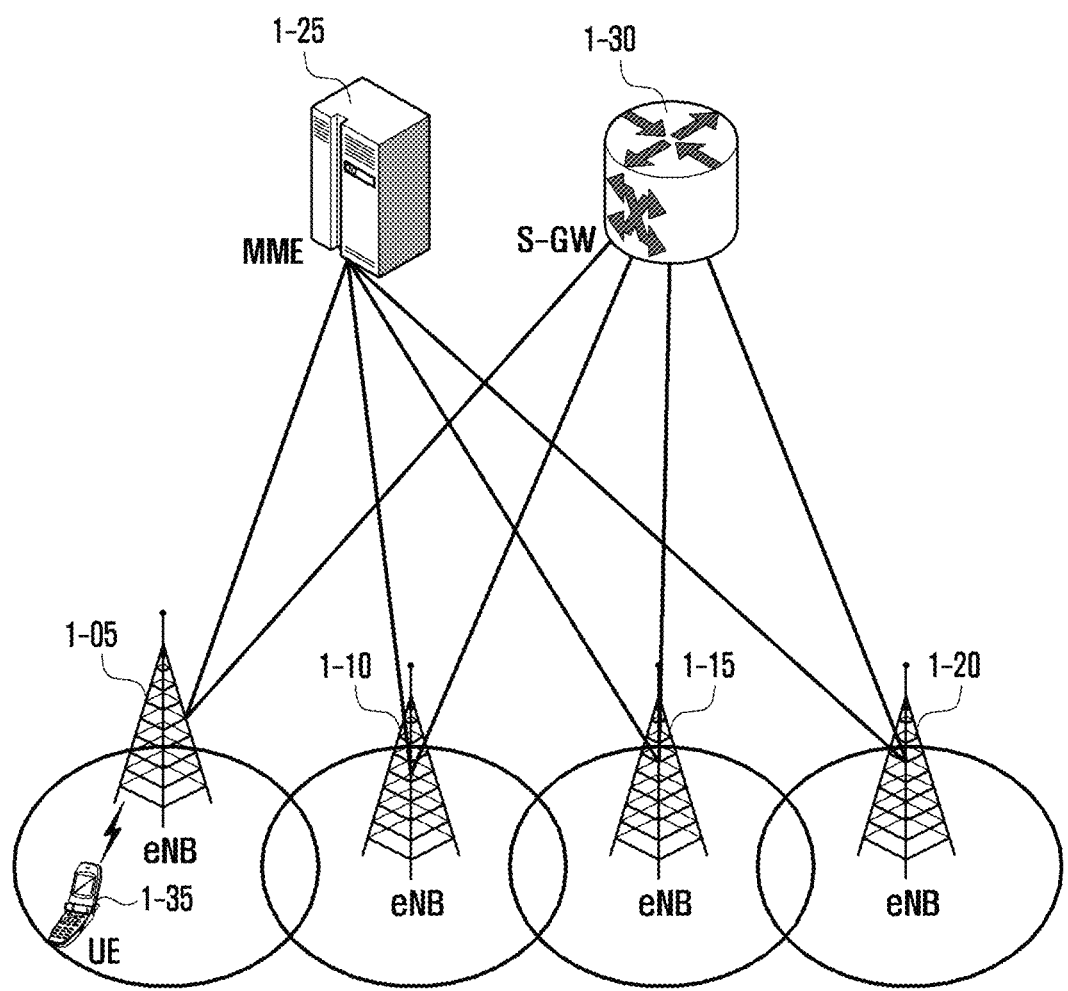
FIG. 1 illustrates a diagram illustrating the structure of an LTE system to which the disclosure is applicable.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of relevant known functions or configurations will be omitted when it may make the subject matter of the disclosure unnecessarily unclear. Hereinafter, embodiments of the disclosure will be described with reference to the accompanying drawings.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

The disclosure proposes seamless handover methods capable of minimizing the data interruption time resulting (or making the same 0 milliseconds (ms)) from a handover in a next-generation mobile communication system.

Particularly, efficient handover methods proposed by the disclosure may have one or more characteristics among the following multiple characteristics:

If a UE is configured to transmit or receive data (transmit and receive uplink or downlink data) with a source base station through respective protocol layer devices (physical (PHY) layer device, medium access control (MAC) layer device, radio link control (RLC) layer device, or PDCP layer device) of multiple first bearers, and if the UE receives a handover command message (or RRC reconfiguration message) from the source base station, the UE may configure protocol layer devices of multiple new second bearers corresponding to the protocol layers of the multiple first bearers (for example, having the same bearer identifier), and may transmit/receive data (transmit and receive uplink or downlink data) while seamlessly maintaining continuous transmission or reception of data (transmission or reception of uplink or downlink data) with the source base station through the multiple first bearers.

In connection with the above-described characteristics, the protocol layer devices (PHY layer device, MAC layer device, RLC layer device, or PDCP layer device) of the multiple second bearers, which are newly configured after the UE receives the handover command message, may be configured to transmit/receive data with a target base station based on bearer configuration information or protocol layer device information included in the handover command message.

In connection with the above-described characteristics, while transmitting or receiving data (transmitting and receiving uplink or downlink data) with the source base station by using the protocol layer devices of the multiple first bearers, the UE may perform a procedure of random access to the target base station by using the protocol layer device (for example, MAC layer device) of the multiple second bearers. In this process, the random access procedure may include preamble transmission, random access response reception, message 3 transmission, message 4 reception (for example, contention resolution MAC control element (CE) or uplink transmission resource reception), or the like.

In connection with the above-described characteristics, while transmitting or receiving data with the source base station by using the protocol layer devices of the multiple first bearers, the UE may complete the procedure of random access to the target base station through the protocol layer device (for example, MAC layer device) of the multiple second bearers, and may transmit a handover completion message to the target base station by using the protocol layer devices of the multiple second bearers.

In connection with the above-described characteristics, while transmitting or receiving data with the source base station by using the protocol layer devices of the multiple first bearers, the UE may complete the procedure of random access to the target base station through the protocol layer device (for example, MAC layer device) of the multiple second bearers, may transmit a handover completion message to the target base station by using the protocol layer devices of the multiple second bearers, and may transmit/receive data (uplink or downlink).

In connection with the above-described characteristics, when the UE has first received an uplink transmission resource from the target base station after completing the procedure of random access to the target base station, the UE may stop transmitting data to the source base station by using the protocol layer devices of the multiple first bearers, may switch to uplink transmission, and may transmit data to the target base station through the multiple second bearers.

In connection with the above-described characteristics, when the UE has received the handover command message, the UE may continue to transmit/receive data (transmit and receive uplink and downlink data) with the source base station by using the multiple first bearers. When the UE has performed the procedure of random access to the target base station through the protocol layer devices of the multiple second bearers, thereby successfully completing the random access procedure, and has first received the uplink transmission resource from the target base station, the UE may stop transmitting uplink data to the source base station by using the protocol layer devices of the multiple first bearers, and may transmit uplink data to the target base station by using only the protocol layer devices of the multiple second bearers. In addition, the UE may continue to receive downlink data from the source base station through the protocol layer devices of the multiple first bearers, and may also continue to receive downlink data from the target base station by using the protocol layer devices of the multiple second bearers.

In connection with the above-described characteristics, the first bearer and the second bearer may be configured according to a second PDCP layer device structure. The second PDCP layer device structure may refer to a structure in which a first bearer (for example, RLC layer device, MAC layer device, or PHY layer device) for the source base station and a second bearer (for example, RLC layer device, MAC layer device, or PHY layer device) for the target base station are both connected to a single PDCP layer device, and uplink data is transmitted through one of the first bearer or the second bearer through the PDCP layer device. That is, according to the second PDCP layer device structure, UE may transmit uplink data through the first bearer until the same performs a procedure of random access to the target base station, successfully completes the random access procedure, and first receives an uplink transmission resource from the target base station. If the UE has performed a procedure of random access to the target base station, has successfully completed the random access procedure, and has first receives an uplink transmission resource from the target base station, the UE may stop transmitting data through the first bearer and may switch to transmit uplink data to the target through the second bearer. However, in the case of the second PDCP layer device structure, the UE may receive downlink data from the source base station and/or the target base station through the first bearer and/or the second bearer.

Hereinafter, efficient handover procedures having no data interruption time, based on the above-described characteristics, will be proposed.

FIG. 1 illustrates a diagram illustrating the structure of an LTE system to which the disclosure is applicable.

Referring to FIG. 1, as illustrated, the radio access network of the LTE system includes evolved Nodes B (hereinafter, referred to as ENBs, Nodes B, or base stations) 1-05, 1-10, 1-15, and 1-20, a mobility management entity (MME) 1-25, and a serving-gateway (S-GW) 1-30. User equipment (hereinafter, referred to as UE or terminal) 1-35 accesses an external network through the ENBs 1-05 to 1-20 and the S-GW 1-30.

The ENBs 1-05 to 1-20 in FIG. 1 correspond to existing nodes B in a universal mobile telecommunication system (UMTS) system. The ENBs are connected to the UE 1-35 through a radio channel, and perform more complicated roles than existing nodes B. In the LTE system, user traffic is provided through a shared channel in connection with all services, including a real-time service such as voice over IP (VoIP) through the Internet protocol. Accordingly, there is a need for a device for aggregating and scheduling state information of UEs, such as the buffer state, the available transmission power state, and the channel state, and the ENBs 1-05 to 1-20 are in charge thereof. One ENB commonly controls multiple cells. For example, in order to implement a transmission rate of 100 Mbps, the LTE system uses, as its radio access technology, orthogonal frequency division multiplexing (hereinafter, referred to as OFDM) in a bandwidth of 20 MHz, for example. In addition, adaptive modulation & coding (hereinafter, referred to as AMC) is applied such that the modulation scheme and the channel coding rate are determined according to the channel state of the UE. The serving gateway (S-GW) 1-30 refers to a device configured to provide a data bearer, and produces or removes a data bearer under the control of the mobility management entity (MME) 1-25. The MME refers to a device in charge of not only a mobility management function, but also various control functions, and is connected to multiple base stations.

Figure 2:
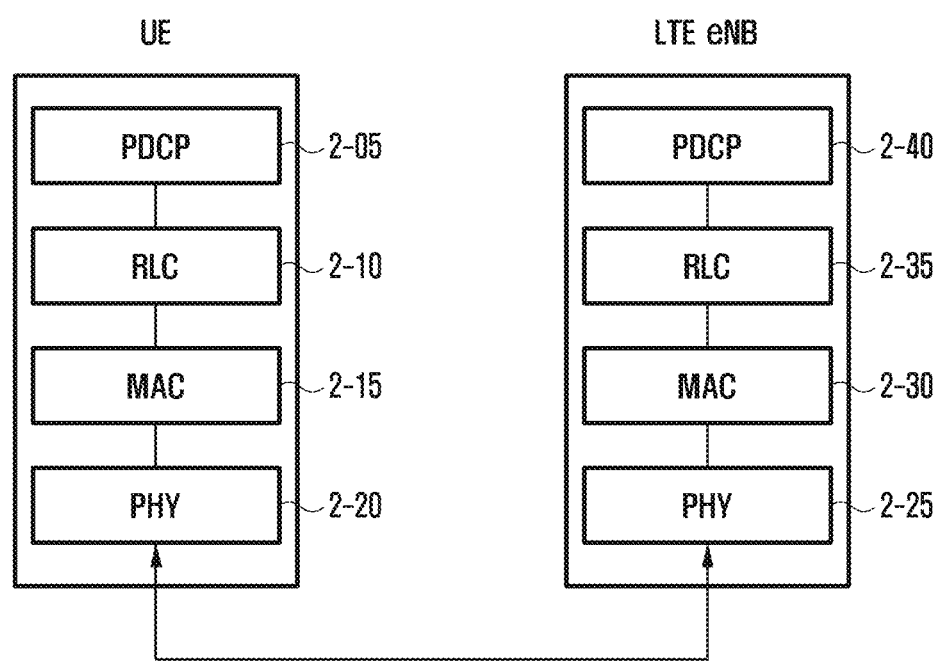
FIG. 2 illustrates a diagram illustrating a wireless protocol structure in an LTE system to which the disclosure is applicable.

FIG. 2 illustrates a diagram illustrating a wireless protocol structure in an LTE system to which the disclosure is applicable.

Referring to FIG. 2, the wireless protocol of the LTE system includes, in connection with the UE and the ENB, PDCPs 2-05 and 2-40, RLCs 2-10 and 2-35, and MACs 2-15 and 2-30, respectively. the PDCPs 2-05 and 2-40 are in charge of operations such as IP header compression/restoration. Major functions of the PDCPs are summarized as follows:

Header compression and decompression: ROHC only
Transfer of user data
In-sequence delivery of upper layer PDUs at PDCP re-establishment procedure for RLC acknowledged mode (AM)
For split bearers in DC (only support for RLC AM): PDCP PDU routing for transmission and PDCP PDU reordering for reception
Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The radio link controls (RLCs) 2-10 and 2-35 reconfigure a PDCP protocol data unit (PDU) into an appropriate size and performs an automatic repeat request (ARQ) operation and the like. Major functions of the RLCs are summarized as follows:

Transfer of upper layer PDUs

Error Correction through ARQ (only for AM data transfer))

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment.

The MACs 2-15 and 2-30 are connected to various RLS layer devices configured in a single UE, and performs operations of multiplexing RLC PDUs to a MAC PDU and demultiplexing the RLC PDUs from the MAC PDU. Major functions of the MACs are summarized as follows:

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through hybrid ARQ (HARD)

Priority handling between logical channels of one UE

Priority handling between UEs by means of dynamic scheduling

Multimedia broadcast multicast services (MBMS) service identification

Transport format selection

Padding

The physical layers 2-20 and 2-25 perform operations of channel-coding and modulating upper-layer data, thereby obtaining an OFDM symbol, and transmitting the same through a radio channel, or demodulating an OFDM symbol received through the radio channel, channel-deciphering the same, and delivering the same to the upper layer.

Figure 3:
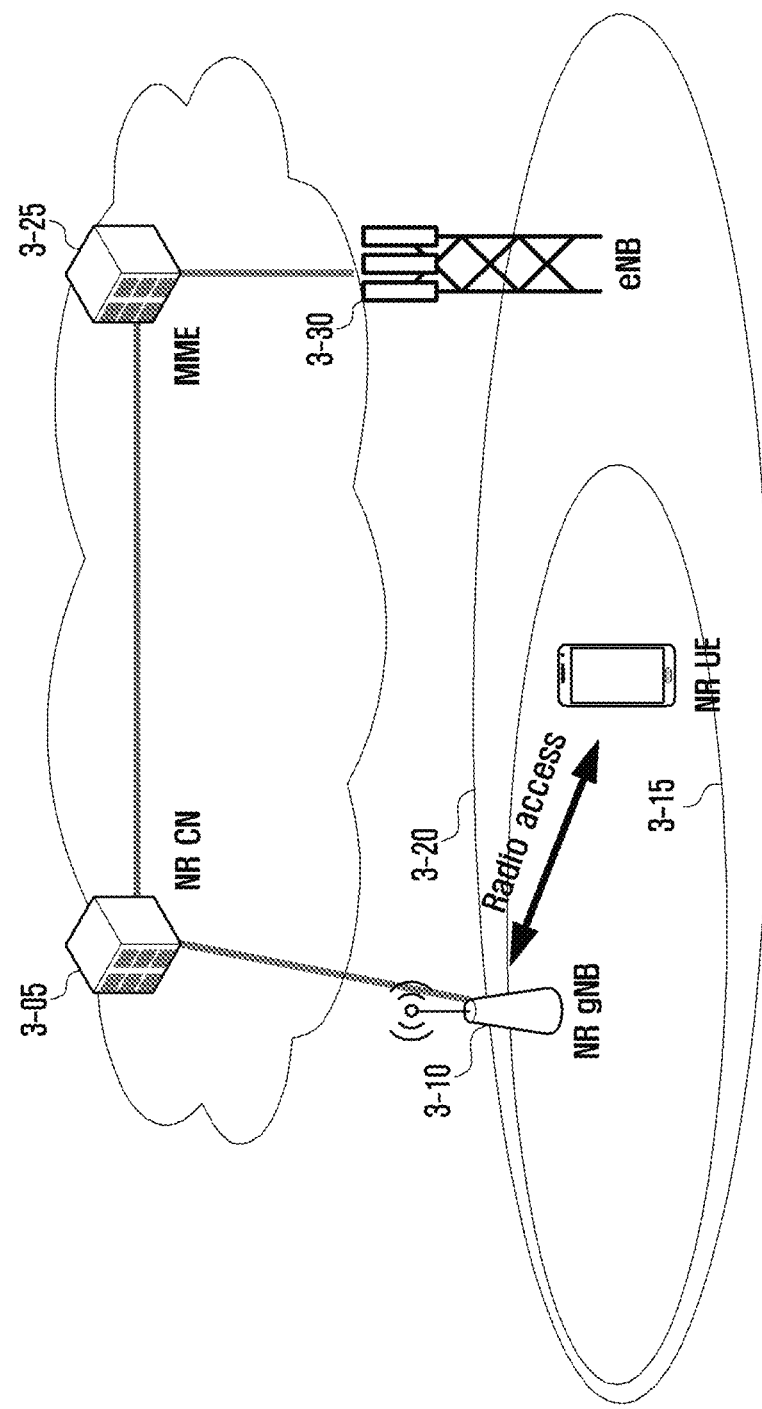
FIG. 3 illustrates a diagram illustrating the structure of a next-generation mobile communication system to which the disclosure is applicable.

FIG. 3 illustrates a diagram illustrating the structure of a next-generation mobile communication system to which the disclosure is applicable.

Referring to FIG. 3, as illustrated, the radio access network of the new radio (hereinafter, referred to as NR or 5G) mobile communication system includes a new radio node B (hereinafter, referred to as NR gNB or NR base station) 3-10 and a new radio core network (NR CN) 3-05. New radio user equipment (hereinafter, referred to as NR UE or terminal) 3-15 accesses an external network through the NR gNB 3-10 and the NR CN 3-05.

The NR gNB 3-10 in FIG. 3 corresponds to an eNB in an existing LTE system. The NR gNB is connected to the NR UE 3-15 through a radio channel, and may provide more superior services than an existing node B. In the NR mobile communication system, all user traffic is provided through a shared channel. Accordingly, a device for aggregating and scheduling state information of UEs, such as the buffer state, the available transmission power state, and the channel state, and the NR NB 3-10 is in charge thereof. One NR gNB commonly controls multiple cells. The same may have a bandwidth equal to/larger than the existing maximum bandwidth, in order to implement super-fast data transmission compared with the current speed of LTE, and OFDM may be used as a radio access technology such that beamforming technology is additionally combined. In addition, an AMC scheme is applied such that the modulation scheme and the channel coding rate are determined according to the channel state of the UE. The NR CN 3-05 perform functions such as mobility support, bearer configuration, quality of service (QoS) configuration, and the like. The NR CN refers to a device in charge of not only a UE-related mobility management function, but also various control functions, and is connected to multiple base stations. In addition, the NR mobile communication system may interwork with an existing LTE system, and the NR CN is connected to the MME 3-25 through a network interface. The MME is connected to an eNB 3-30, which is an existing base station.

Figure 4:
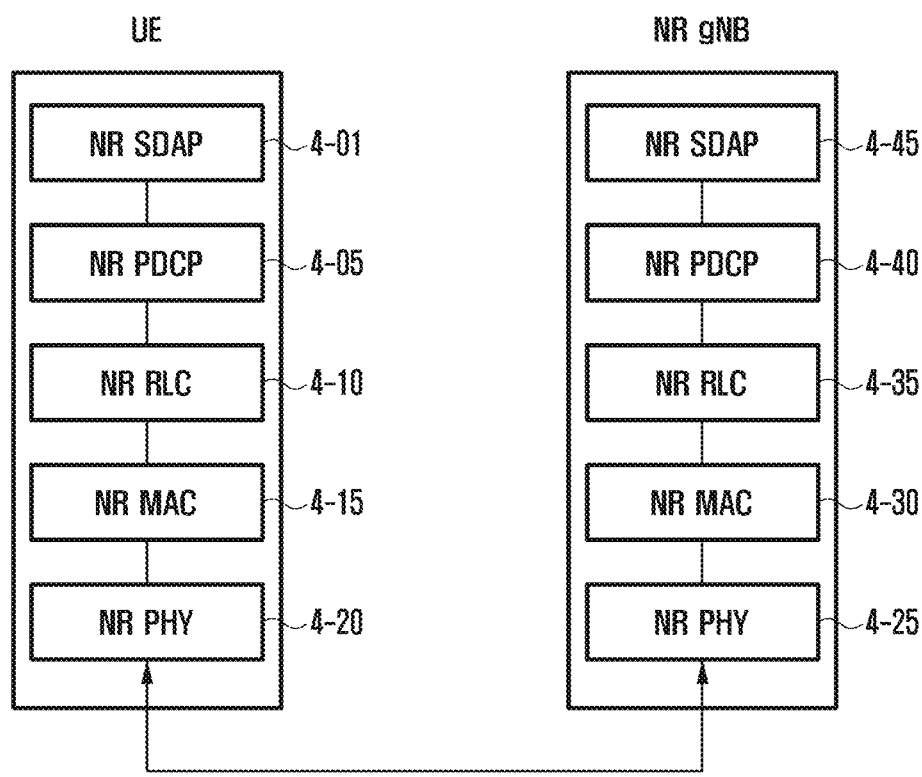
FIG. 4 illustrates a diagram illustrating a wireless protocol structure of a next-generation mobile communication system to which the disclosure is applicable.

FIG. 4 illustrates a diagram illustrating a wireless protocol structure of an NR mobile communication system to which the disclosure is applicable.

Referring to FIG. 4, the wireless protocol of the NR mobile communication system includes, in connection with a UE and an NR base station, NR service data adaption protocols (SDAPs) 4-01 and 4-45, NR PDCPs 4-05 and 4-40, NR RLCs 4-10 and 4-35, and NR MACs 4-15 and 4-30.

Major function of the NR SDAPs 4-01 and 4-45 may include some of the following functions:

Transfer of user plane data

Mapping between a QoS flow and a DRB for both downlink (DL) and uplink (UL)

Marking QoS flow ID in both DL and UL packets

Reflective QoS flow to DRB mapping for the UL SDAP PDUs.

In connection with the SDAP layer device, an RRC message may be used to configure, for the UE, whether or not to use the header of the SDAP layer device with regard to each PDCP layer device, with regard to each bearer, or with regard to each logical channel, or whether or not to use the function of the SDAP layer device. If the SDAP header has been configured, the NAS QoS reflective configuration one-bit indicator (NAS reflective QoS) of the SDAP header and the AS QoS reflective configuration one-bit indicator (AS reflective QoS) thereof may be used to instruct the UE to update or reconfigure the QoS flow of the uplink and the downlink and mapping information regarding data bearers. The SDAP header may include QoS flow ID information indicating the QoS. The QoS information may be used as data processing priority for efficient service support, scheduling information, or the like.

Major functions of the NR PDCPs 4-05 and 4-40 may include some of the following functions:

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

The above-mentioned reordering function of the NR PDCP devices refers to a function of reordering PDCP PDUs received from the lower layer according to the PDCP sequence number (SN), and may include a function of delivering reordered data to the upper layer. Alternatively, the reordering function may include a function of directly delivering data without considering the order, may include a function of recording PDCP PDUs that are lost as a result of reordering, may include a function or reporting the state of the lost PDCP PDUs to the transmitting side, and may include a function or requesting retransmission of the lost PDCP PDUs.

Major functions of the NR RLCs 4-10 and 4-35 may include some of the following functions:
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The above-mentioned in-sequence delivery function of the NR RLC devices refer to a function of delivering RLC SDUs received from the lower layer to the upper layer in an order. If an originally single RLC SDU has been segmented into multiple RLC SDUs, which are then received, the in-sequence delivery function may include a function of reassembling and delivering the same. The in-sequence delivery function may include a function of reordering received RLC PDUs with reference to the RLC SN or PDCP SN, may include a function of recording RLC PDUs that are lost as a result of reordering, may include a function of reporting the state of the lost RLC PDUs to the transmitting side, and may include a function of requesting retransmission of the lost RLC PDUs. If there is a lost RLC SDU, the in-sequence delivery function may include a function of delivering only RLC SDUs that precede the lost RLC SDU to the upper layer in an order. Alternatively, if a predetermined timer has expired even when there is a lost RLC SDU, the in-sequence delivery function may include a function of delivering all RLC SDUs received before the timer has started to the upper layer in an order. Alternatively, if a predetermined timer has expired even when there is a lost RLC SDU, the in-sequence delivery function may include a function of delivering all RLC SDUs received so far to the upper layer in an order. In addition, the RLC PDUs may be processed in the received order (regardless of the order of the sequence number, as soon as they arrive), and may be delivered to the PDCP device regardless of the order (out-of-sequence delivery). In the case of segments, segments which are stored in a buffer, or which are to be received later, may be received, reconfigured as a single complete RLC PDU, processed, and delivered to the PDCP device. The NR MAC lay may include no concatenation function, and the function may be performed by the NR MAC layer or replaced with a multiplexing function of the NR MAC layer.

The above-mentioned out-of-sequence delivery function of the NR RLC devices refers to a function of instantly delivering RLC SDUs received from the lower layer to the upper layer regardless of the order. If an originally single RLC SDU has been segmented into multiple RLC SDUs, which are then received, the out-of-sequence delivery function may include a function of reassembling and delivering the same. The out-of-sequence delivery function may include a function of storing the RLC SN or PDCP SN of received RLC PDUs, reordering the same, and recording lost RLC PDUs.

The NR MACs 4-15 and 4-30 may be connected to multiple NR RLC layer devices configured in a single UE, and major functions of the NR MACs may include some of the following functions:
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding The NR PHY layers 4-20 and 4-25 may perform operations of channel-coding and modulating upper-layer data, thereby obtaining an OFDM symbol, and transmitting the same through a radio channel, or demodulating an OFDM symbol received through the radio channel, channel-deciphering the same, and delivering the same to the upper layer.

Figure 5:
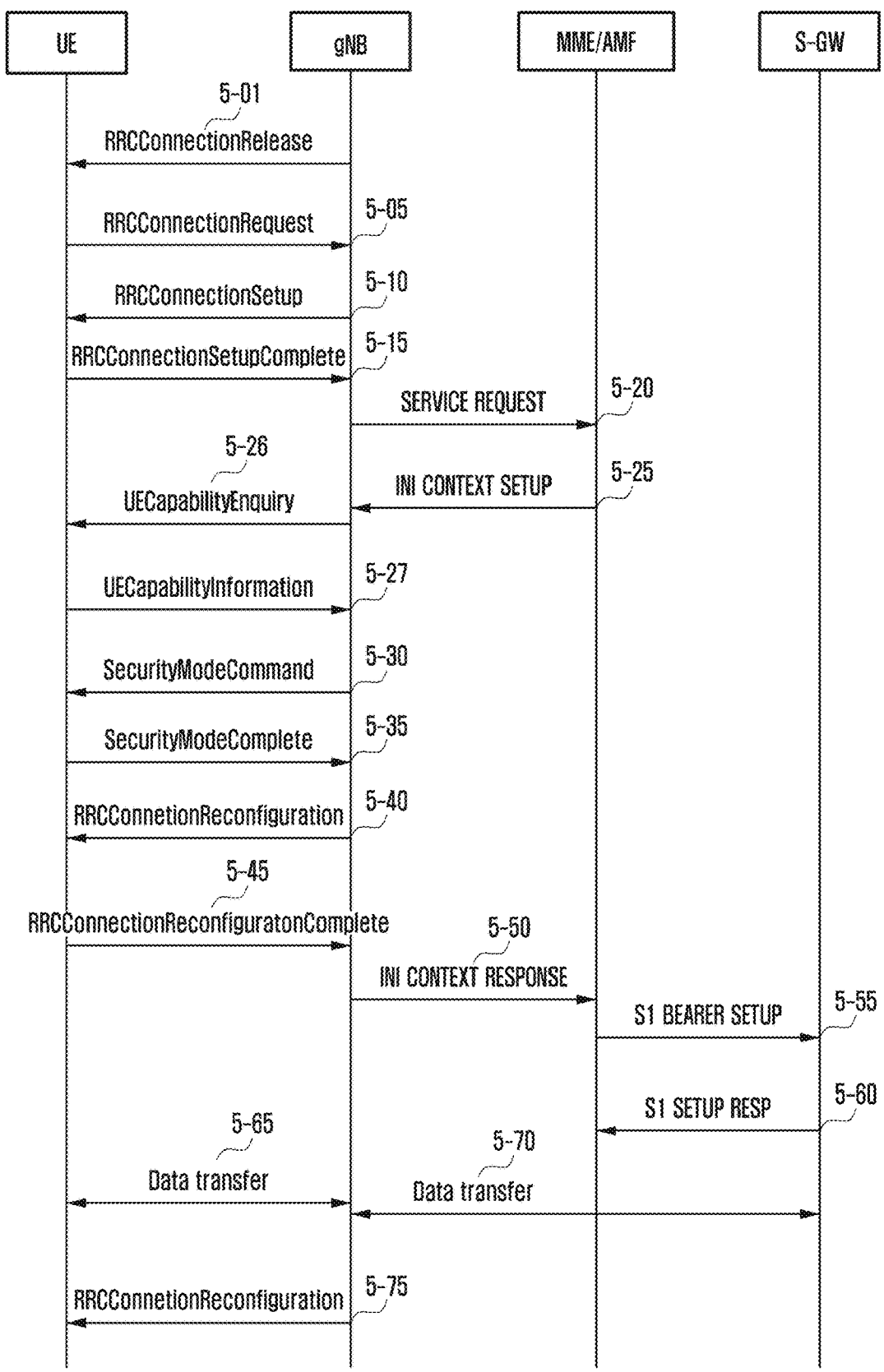
FIG. 5 illustrates a diagram illustrating a procedure in which a UE switches from a radio resource control (RRC) idle mode to an RRC connected mode and configures connection with a network.

FIG. 5 illustrates a diagram illustrating a procedure in which a UE switches from an RRC idle mode to an RRC connected mode and configures connection with a network in the disclosure.

In FIG. 5, if the UE that has been transmitting/receiving data in the RRC connected mode transmits/receives no data for some reasons or for a predetermined time, the gNB may send an RRCConnectionRelease message to the UE, thereby instructing the UE to switch to the RRC idle mode (5-01). If the UE having no configured connection (hereinafter, referred to as idle-mode UE) has later data to transmit, the UE performs an RRC connection establishment process with the gNB. The UE establishes backward transmission synchronization with the gNB through a random access process, and transmits an RRCConnectionRequest to the gNB (5-05). The message includes the identifier of the UE, the reason to configure connection (establishmentCause), and the like. The gNB transmits an RRCConnectionSetup message such that the UE configures RRC connection (5-10).

The message includes configuration information with regard to each service/bearer/each RLC device, with regard to each logical channel, or with regard to each bearer, and may include at least one of the following information: whether or not to use robust header compression (ROHC) with regard to each bearer/logical channel; ROHC configuration information (for example, ROHC version, initial information, and the like); statusReportRequired information (information used by the gNB to instruct the UE to send a PDCP status report); drb-ContinueROHC information (configuration information instructing that ROHC configuration information be maintained and used as is, and the same may be transmitted while being included in PDCP layer device configuration information (pdcp-config)); and the like. In addition, the message contains RRC connection configuration information and the like. The bearer for RRC connection is also referred to as a signaling radio bearer (SRB), and is used to transmit/receive an RRC message, which is a control message between the UE and the gNB.

After configuring RRC connection, the UE transmits a RRCConnectionSetupComplete message to the gNB (5-15). The message includes a control message, referred to as SERVICE REQUEST, used by the UE to request the MME to establish a bearer configuration for a predetermined service. The gNB transmits the SERVICE REQUEST message included in the RRCConnetionSetupComplete message to the MME or access and mobility management function (AMF) (5-20), and the MME or AMF determines whether or not to provide the service requested by the UE. If it is determined to provide the service requested by the UE, the MME or AMF transmits a message, referred to as INITIAL CONTEXT SETUP REQUEST, to the gNB (5-25). The message includes information such as QoS information to be applied when a data radio bearer (DRB) is configured, security-related information to be applied to the DRB (for example, security key, security algorithm), and the like.

In addition, if the gNB has failed to receive UE capability information from the MME or AMF, the gNB may transmit a UE capability information request message to the UE in order to identify UE capability information (5-26). Upon receiving the UE capability information request message, the UE may configure and produce a UE capability information message and may report the same to the gNB (5-27). The UE capability information may include the type of handover methods supported by the UE. For example, the UE may report UE capability to the gNB through a predetermined indicator that indicates whether or not the UE supports an efficient handover method proposed by the disclosure (or dual active protocol stack (DAPS)).

After identifying the UE capability information, the gNB may define an indicator with regard to each handover method when indicating a handover to the UE, thereby indicating, through a handover command message, which handover is indicated. For example, the gNB may indicate an efficient handover method proposed by the disclosure (DAPS handover method) to the UE. As another method, the gNB may configured the DAPS handover method with regard to each bearer (DRB or SRB) of the UE. When the gNG configures the DPAS handover method for the UE, the same may be indicated together with other handover methods (for example, conditional handover method (multiple target cells are configured; multiple conditions are configured for the UE; and if the conditions are satisfied during a cell selection or reselection procedure by the UE, the UE performs a procedure of handover to one target cell), or a handover method without random access procedure (RACH-less), thereby preventing data loss or transmission delay that may otherwise occur during a handover. The UE may perform a procedure of handover to the target gNB according to the handover method indicated by the handover command message.

The gNB exchanges a SecurityModeCommand message (5-30) and a SecurityModeComplete message (5-35) in order to configure security with the UE. After security configuration is completed, the gNB transmits an RRCConnectionReconfiguration message to the UE (5-40).

The message includes configuration information with regard to each service/bearer/each RLC device, with regard to each logical channel, or with regard to each bearer, and may include at least one of the following information: whether or not to use ROHC with regard to each bearer/logical channel; ROHC configuration information (for example, ROHC version, initial information, and the like); statusReportRequired information (information used by the gNB to instruct the UE to send a PDCP status report); drb-ContinueROHC information (configuration information instructing that ROHC configuration information be maintained and used as is, and the same may be transmitted while being included in PDCP layer device configuration information (pdcp-config)); and the like. In addition, the message contains RRC connection configuration information and the like. The bearer for RRC connection is also referred to as an SRB, and is used to transmit/receive an RRC message, which is a control message between the UE and the gNB.

In addition, the message includes configuration information of a DRB to be used to process user data. The UE applies the information to configure the DRB, and transmits an RRCConnectionReconfigurationComplete message to the gNB (5-45). After completing DRB configuration with the UE, the gNB transmits an INITIAL CONTEXT SETUP COMPLETE message to the MME or AMF (5-50). After receiving the same, the MME or AFM exchanges an S1 BEARER SETUP message and an S1 BEARER SETUP RESPONSE message in order to configure an S1 bearer with the S-GW (5-55, 5-60). The S1 bearer establishes data transmission connection between the S-GW and the gNB, and have one-to-one correspondence with the DRB. After the above processes are all completed, the UE transmits/receives data with the gNG through the S-GW (5-65, 5-70). As such, a normal data transmission process includes the following three steps: RRC connection configuration, security configuration, and DRB configuration. In addition, the gNB may transmit an RRC Connection Reconfiguration message to the UE in order to renew, add, or modify the existing configuration for the UE for some reasons (5-75).

As used herein, a bearer may be used in a sense encompassing an SRB and a DRB. The SRB refers to a signaling radio bearer, and the DRB refers to a data radio bearer. The SRB is commonly used to transmit and receive an RRC message of an RRC layer device, and the DRB is commonly used to transmit and receive user layer data. In addition, a UM DRB refers to a DRB that uses an RLC layer device operating in an unacknowledged mode (UM), and the AM DRB refers to a DRB that uses an RLC layer device operating in an acknowledged mode (AM).

Figure 6:
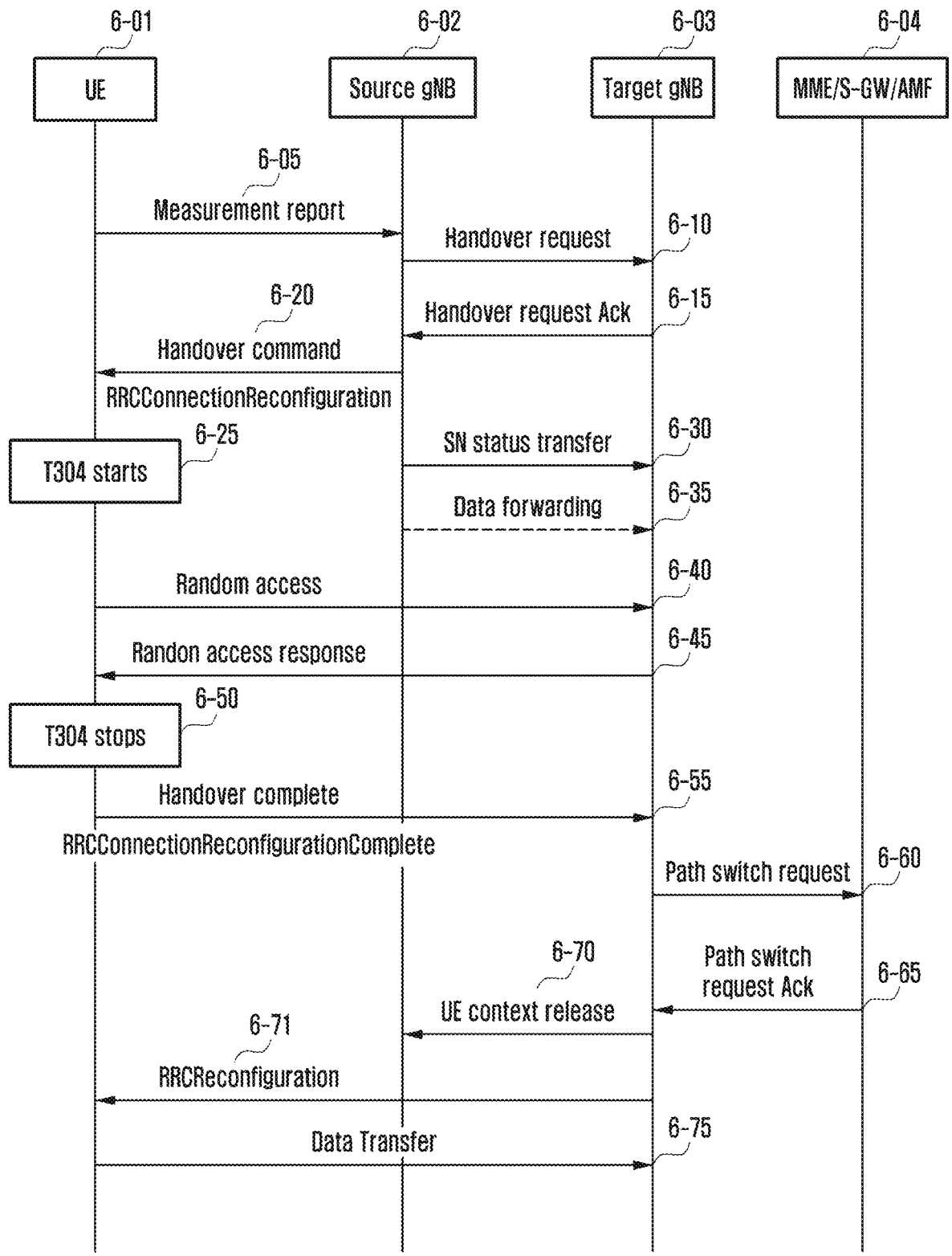
FIG. 6 illustrates a diagram illustrating signaling procedures for performing a handover proposed by the disclosure in a next-generation mobile communication system.

FIG. 6 illustrates a diagram illustrating signaling procedures for performing a handover proposed by the disclosure in a next-generation mobile communication system.

A UE 6-01 in an RRC connected mode reports cell measurement information (measurement report) to a source eNB 6-02 periodically or if a specific event is satisfied (6-05). The source eNB determines, based on the measurement information, whether or not the UE is to conduct a handover to an adjacent cell. The handover refers to a technology for replacing a source eNB that provides a UE in a connected mode with a service with another eNB (or another cell of the same eNB). After determining a handover, the source eNB sends a handover (HO) request message (for example, handover preparation information message) to a new eNB supposed to provide the UE with a service (that is, target eNB 6-03), thereby requesting a handover (6-10). If the target eNB accepts the handover request, the target eNB transmits an HO request ack message (for example, handover command message) to the source eNB (6-15). After receiving the message, the source eNB transmits an HO command message (or an RRCReconfiguration message included in a dedicated control channel (DCCH) of the HO request ack message) (6-20). The HO command message is extracted by the source eNB from the message received from the target eNB and delivered to the UE by using an RRC connection reconfiguration message (6-20).

The disclosure proposes a method wherein, when the source eNB transmits the handover preparation information message 6-10 to the target eNB as described above, and when the target eNB transmits the handover command message 6-15 to the source eNB in response thereto, the two messages are used to determine an efficient DAPS handover method.

The first embodiment of the above method for determining an efficient DAPS handover method proposed by the disclosure is as follows:

The first embodiment may be characterized in that the entity which determines the DAPS handover method is the source eNB. The first embodiment may also be characterized in that, if the source eNB has requested the target eNB to perform a DAPS handover method, the target eNB always indicates or performs the DAPS handover method.

The source eNB may define a new indicator in the handover preparation information message, thereby indicating/requesting to the target eNB that the source eNB will perform the DAPS handover method proposed by the disclosure. The handover preparation information message may include the UE's current bearer configuration information, security key information, cell group configuration information, UE capability information, or the like. The source eNB may share the capability of the target eNB in advance, thereby identifying whether or not the target eNB supports the DAPS handover method in advance. Alternatively, the source eNB may indicate to the target eNB that the source eNB will perform the DAPS handover method, thereby informing the target eNB that the source eNB may perform data forwarding quickly or early (that is, early data forwarding), and may instruct the target eNB to receive data forwarding and to be prepared for quick processing thereof. The source eNB may send a request regarding the DAPS handover method to each bearer (DRB or SRB).

If the target eNB has received the handover preparation information message from the source eNB and has identified that an indicator that requests the DAPS handover method is included, the target eNB may configure an RRCReconfiguration message, which will be used to indicate a handover to the UE, such that the RRCReconfiguration message includes an indicator that indicates the DAPS handover method and includes bearer configuration information necessary for the UE to perform the DAPS handover method, security key information, cell group configuration information, or system information. The target eNB may include the configured RRCReconfiguration message in the DL-DCCH message of the handover command message and may deliver the same to the source eNB. The target eNB may separately indicate the DAPS handover method with regard to each bearer (DRB or SRB).

If the source eNB receives the handover command message, the source eNB may extract the RRCReconfiguration message included in the handover command message, or may transmit the RRCReconfiguration message to the UE, thereby indicating a handover. The source eNB may identify the indicated DAPS handover method with regard to each bearer, thereby performing the DAPS handover method with regard to each bearer (DRB or SRB).

The second embodiment of the method for determining an efficient DAPS handover method proposed by the disclosure is as follows:

The second embodiment may be characterized in that the entity which determines the DAPS handover method is the target eNB. The second embodiment may also be characterized in that, if the source eNB has requested, by using an indicator, the target eNB to perform a DAPS handover method, the target eNB may reject the request, may accept the same, or may indicate another handover method to the source eNB through a handover command message.

The source eNB may define a new indicator in the handover preparation information message, thereby indicating/requesting to the target eNB that the source eNB will perform the DAPS handover method proposed by the disclosure. The handover preparation information message may include the UE's current bearer configuration information, security key information, cell group configuration information, UE capability information, or the like. The source eNB may share the capability of the target eNB in advance, thereby identifying whether or not the target eNB supports the DAPS handover method in advance. Alternatively, the source eNB may indicate to the target eNB that the source eNB will perform the DAPS handover method, thereby informing the target eNB that the source eNB may perform data forwarding quickly or early (that is, early data forwarding), and may instruct the target eNB to receive data forwarding and to be prepared for quick processing thereof. The source eNB may send a request regarding the DAPS handover method to each bearer (DRB or SRB).

If the target eNB has received the handover preparation information message from the source eNB and has identified that an indicator that requests the DAPS handover method is included, the target eNB may reject or accept the request regarding the DAPA handover according to whether or not the target eNB can support the DAPS handover method, the current amount of transmission resources, or the scheduling situation. Alternatively, the target eNB may indicate another handover method. The target eNB may include, in the handover command message, an indicator that rejects the request regarding the DAPS handover method, an indicator that accepts the request, or an indicator that indicates a different kind of handover method, and may transmit the same to the source eNB. The target eNB may configure an RRCReconfiguration message, which will be used to indicate a handover to the UE, such that the RRCReconfiguration message includes an indicator that indicates the DAPS handover method if the DAPS handover method has been accepted, includes an indicator that indicates another handover method if the DAPS handover method has been rejected, and includes bearer configuration information necessary for the UE to perform the DAPS handover method or another handover method, security key information, cell group configuration information, or system information. The target eNB may include the configured RRCReconfiguration message in the DL-DCCH message of the handover command message and may deliver the same to the source eNB. The target eNB may separately indicate the DAPS handover method with regard to each bearer (DRB or SRB).

If the source eNB receives the handover command message, the source eNB may identify the indicator included in the handover command message, thereby confirming whether or not the request regarding the DAPS handover method has been accepted or rejected. If the request has been accepted, the source eNB may also perform the DAPS handover method, and may extract the RRCReconfiguration message included in the handover command message, or may transmit the RRCReconfiguration message to the UE, thereby indicating a handover. However, if it is confirmed as a result of identifying the indicator included in the handover command message that the request regarding the DAPS handover method has been rejected, or if another handover method has been indicated, the source eNB may also perform another handover method indicated by the target eNB. In addition, the source eNB may extract the RRCReconfiguration message included in the handover command message, or may transmit the RRCReconfiguration message to the UE, thereby indicating a handover. As another method, even if the handover command message includes no separate indicator, the source eNB may read the RRCReconfiguration message included in the handover command message, thereby identifying what handover method has been indicated by the target eNB, and confirming whether the request regarding the DAPS handover method has been accepted or rejected. The source eNB may also perform the handover method indicated in the RRCReconfiguration message (for example, DAPS handover method or another handover method). The source eNB may identify the indicated DAPS handover method with regard to each bearer, thereby performing the DAPS handover method with regard to each bearer (DRB or SRB).

The third embodiment of the method for determining an efficient DAPS handover method proposed by the disclosure is as follows:

The third embodiment may be characterized in that the entity which determines the DAPS handover method is the target eNB. The third embodiment may also be characterized in that the target eNB identifies the capability of the UE and determines the handover method (for example, DAPS handover method) according to whether or not the target eNB can support the DAPS handover method, the current amount of transmission resources, or the scheduling situation.

The source eNB may include, in the handover preparation information message, the UE's current bearer configuration information, security key information, cell group configuration information, UE capability information, or the like, and may transmit the message in order to request the target eNB to perform a handover. The source eNB may share the capability of the target eNB in advance, thereby identifying whether or not the target eNB supports the DAPS handover method in advance. If the target eNB has indicated that the same will perform the DAPS handover method, the source eNB may perform data forwarding quickly or early (that is, early data forwarding).

The target eNB may receive the handover preparation information message and may determine the handover method (for example, DAPS handover method) according to UE capability information, whether or not the target eNB can support the DAPS handover method, the current amount of transmission resources, or the scheduling situation. If the DAPS handover method has been determined, the target eNB may include, in the handover command message, an indicator that indicates the DAPS handover method and may transmit the same. The target eNB may configure an RRCReconfiguration message, which will be used to indicate a handover to the UE if the DAPS handover method has been determined, such that the RRCReconfiguration message includes an indicator that indicates the DAPS handover method, includes an indicator that indicates another handover method if another handover method other than the DAPS handover method has been determined, and includes bearer configuration information necessary for the UE to perform the DAPS handover method or another handover method, security key information, cell group configuration information, or system information. The target eNB may include the configured RRCReconfiguration message in the DL-DCCH message of the handover command message and may deliver the same to the source eNB. The target eNB may separately indicate the DAPS handover method with regard to each bearer (DRB or SRB).

If the source eNB receives the handover command message, the source eNB may identify the indicator included in the handover command message, thereby confirming whether or not the DAPS handover method has been determined. If the DAPS handover method has been indicated, the source eNB may also perform the DAPS handover method, and may extract the RRCReconfiguration message included in the handover command message, or may transmit the RRCReconfiguration message to the UE, thereby indicating a handover. However, if it is confirmed as a result of identifying the indicator included in the handover command message that the DAPS handover method has not been determined, or if another handover method has been indicated, the source eNB may also perform another handover method indicated by the target eNB. In addition, the source eNB may extract the RRCReconfiguration message included in the handover command message, or may transmit the RRCReconfiguration message to the UE, thereby indicating a handover. As another method, even if the handover command message includes no separate indicator, the source eNB may read the RRCReconfiguration message included in the handover command message, thereby identifying what handover method has been indicated by the target eNB, and confirming whether or not a determination regarding the DAPS handover method has been made. If another handover method has been indicated, the source eNB may also perform the indicated handover method. The source eNB may identify the indicated DAPS handover method with regard to each bearer, thereby performing the DAPS handover method with regard to each bearer (DRB or SRB).

One or more of the methods of the first, second, or third embodiment for determining an efficient DAPS handover method proposed by the disclosure may be combined and extended into a new embodiment.

The eNB may indicate, through the RRCReconfiguration message, an efficient handover method (DAPS handover method) proposed by the disclosure to the UE. As another method, the eNB may configure the DAPS handover method with regard to each bearer (DRB or SRB) of the UE. For example, the source eNB or the target eNB may define a new indicator that indicates the efficient handover method (DAPS handover method) in bearer configuration information, PDCP configuration information, or RLC configuration information, with regard to each bearer identifier or logical channel identity (LCID), through the RRC message, and may use the indicator so as to indicate the efficient handover method to the UE with regard to each bearer or each LCID. When the eNB configures the DPAS handover method for the UE, the same may be indicated together with other handover methods (for example, conditional handover method (multiple target cells are configured; multiple conditions are configured for the UE; and if the conditions are satisfied during a cell selection or reselection procedure by the UE, the UE performs a procedure of handover to one target cell), or a handover method without random access procedure), thereby preventing data loss or transmission delay that may otherwise occur during a handover.

If the message is received, the UE stops data transmission/reception with the source eNB according to the configured handover method, or continues to perform the same, and starts a T304 timer. T304 refers to a timer configured such that, if the UE fails to hand over to the target eNB for a predetermined time (for example, if T304 timer has expired), the original configuration of the UE is restored, and the same switches to the RRC idle state. In addition, an RRC connection reestablishment procedure may be triggered based on the T304 timer. As another method, if an efficient handover method has been configured, and if connection with the source eNB is valid, the UE may fall back, report the handover failure to the source eNB, and may reconfigure the connection. The source eNB delivers a sequence number (SN) status regarding up/downlink data to each bearer (for example, RLC UM bearer or RLC AM bearer) and, if downlink data or uplink exists, delivers the same to the target eNB (6-30, 6-35).

The UE attempts a random access to the target cell indicated by the source eNB (6-40). The random access is both for the purpose of notifying the target cell that the UE is moving to the target cell through the handover and for making uplink synchronization with the target cell. For the random access, the UE transmits a preamble corresponding to a preamble ID received from the source eNB, or a randomly selected preamble ID, to the target cell. After the preamble is transmitted, and after a specific number of subframes have passed, the UE monitors whether or not a random access response (RAR) message is transmitted from the target cell. The monitoring time interval is referred to as a random access response window (RAR window). If an RAR is received during the specific time (6-45), the UE transmits an HO complete message, as an RRC reconfiguration complete message, to the target eNB (6-55). If the RAR is successfully received from the target eNB in this manner, the UE ends the T304 timer (6-50).

The target eNB requests the source eNB to make path modification in order to modify the path of bearers that have been configured (6-60, 6-65), and notifies the source eNB so as to delete UE context of the UE (6-70). In addition, the target eNB may transmit an RRC message (for example, RRCReconfiguration message) to the UE (6-71), thereby transmitting an indicator that instructs disconnection from the source eNB. As another method, the target eNB may transmit/indicates MAC control information, RLC control information, or PDCP control information, thereby instructing disconnection from the source eNB. Therefore, the UE attempts to receive data from the RAR window starting timepoint, with regard to the target eNB. After receiving the RAR, the UE transmits an RRC reconfiguration complete message and receives a downlink transmission resource or uplink transmission resource, thereby starting to transmit/receive data with the target eNB.

The disclosure proposes seamless handover methods wherein, in a next-generation mobile communication system, data interruption time resulting from a handover can be minimized or reduced to 0 ms.

The UE may configure multiple first bearers with the source eNB and may transmit/receive data (transmit and receive uplink or downlink data) through respective protocol layer devices (PHY layer device, MAC layer device, RLC layer device, or PDPC layer device) of each of the bearers. However, it will be assumed in the following description and in the drawings, for convenience of description, that the UE has one bearer. Obviously, in spite of such assumption in the illustration and description, the following description is equally applicable to a situation in which the UE configures multiple bearers and operates accordingly.

Figure 7:
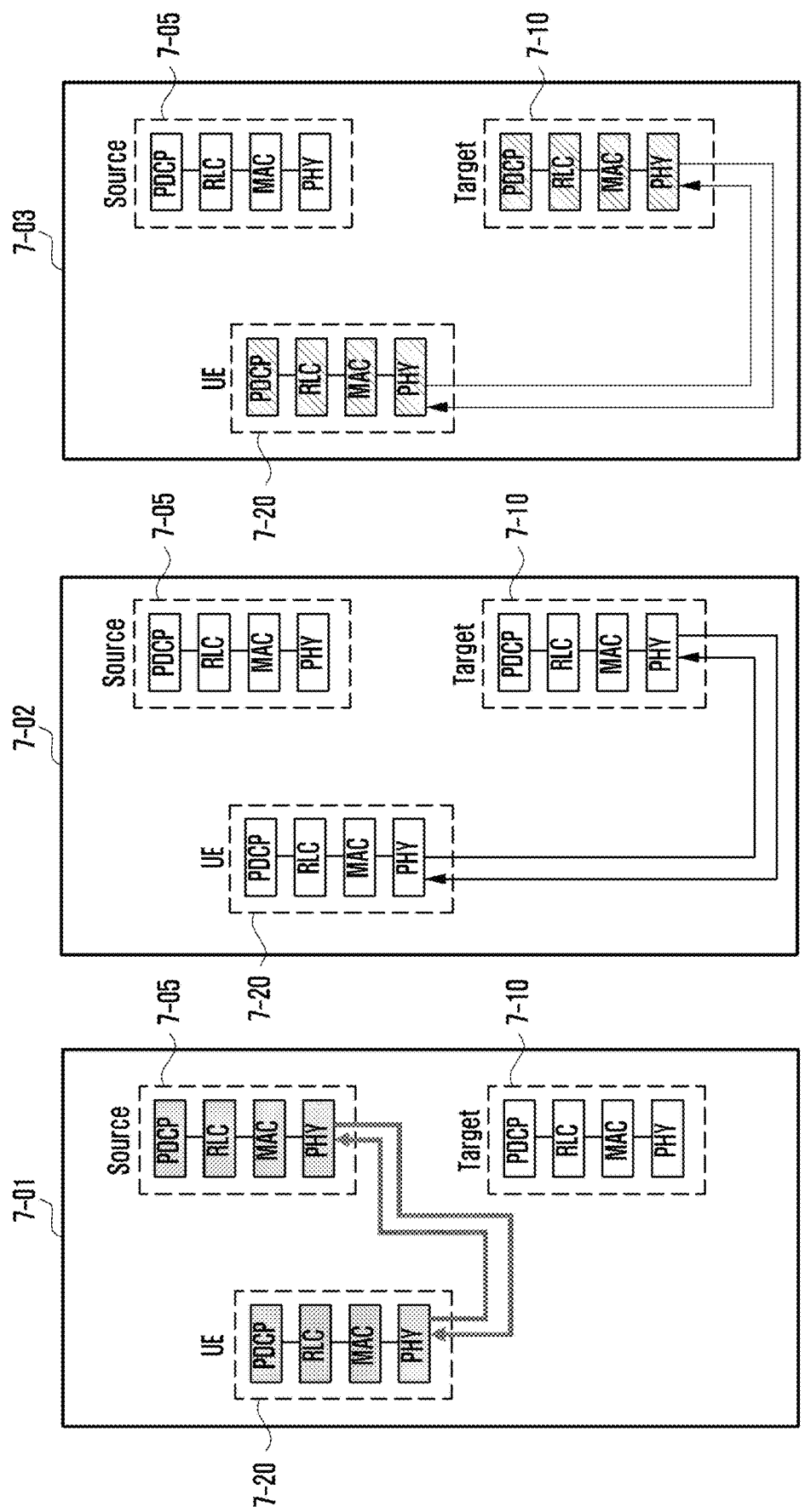
FIG. 7 illustrates detailed steps of a first embodiment of an efficient handover method for minimizing data interruption time resulting from a handover in the disclosure.

FIG. 7 illustrates detailed steps of the first embodiment of an efficient handover method for minimizing data interruption time resulting from a handover in the disclosure.

According to the first embodiment of the efficient handover method in FIG. 7, the UE 7-20 may transmit/receive data with the source eNB 7-05 in the first step 7-01. If a handover command message is received from the source eNB, the UE 7-20 may disconnect from the source eNB 7-05 according to the handover method indicated by the handover command message (for example, RRCReconfiguration message), may perform a procedure of random access to the target eNB 7-10, and may perform a handover procedure. As another method, the UE 7-20 may continuously transmit/receive data with the source eNB 7-05 in order to minimize the data interruption time occurring during a handover according to the handover method indicated by the source eNB.

The first embodiment of the efficient handover method in FIG. 7 may be characterized in that the UE 7-20 stops transmitting/receiving data (transmitting uplink data and receiving downlink data) with the source eNB 7-05 when the UE performs a procedure of random access to the target eNB 7-10 according to the handover method indicated by the handover command message in the second step 7-02, when the UE transmits a preamble, or when the UE first transmits data with an uplink transmission resource by using a physical uplink control channel (PUCCH) or physical uplink shared channel (PUSCH) transmission resource.

The first embodiment of the efficient handover method in FIG. 7 is characterized in that the UE 7-20 completes the procedure of random access to the target eNB 7-10 in the third step 7-03, transmits a handover completion message to the target eNB 7-10, and starts transmitting/receiving data (transmitting uplink data and receiving downlink data) with the target eNB 7-10.

Figure 8:
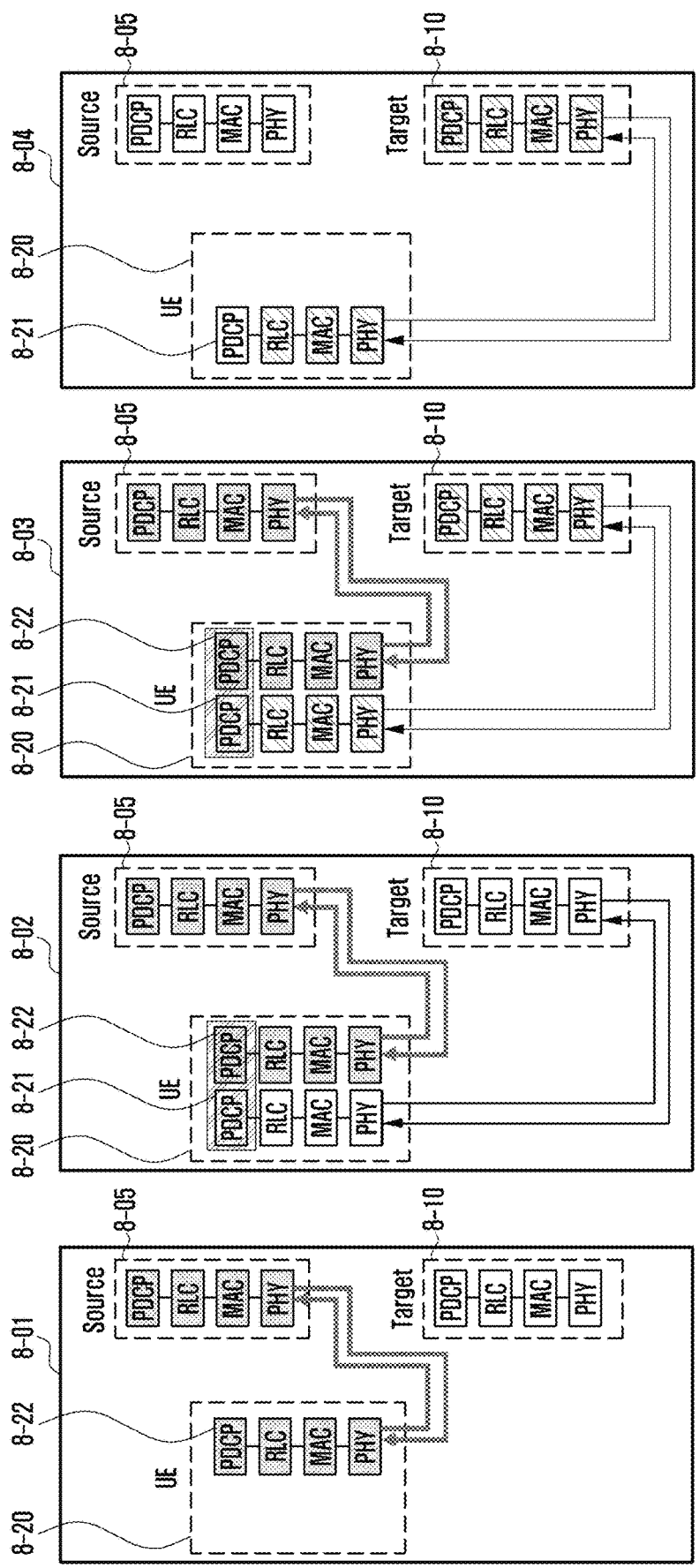
FIG. 8 illustrates detailed steps of a second embodiment of an efficient handover method for minimizing data interruption time resulting from a handover in the disclosure.

FIG. 8 illustrates detailed steps of the second embodiment of an efficient handover method for minimizing data interruption time resulting from a handover in the disclosure.

According to the second embodiment of the efficient handover method in FIG. 8, the UE 8-20 may transmit/receive data with the source eNB 8-05 in the first step 8-01. If a handover command message is received from the source eNB 8-05, and if the handover command message has indicated the second embodiment of efficient handover method (for example, DAPS handover method) proposed in the disclosure or has indicated the same for each bearer, the UE 8-20 may continuously transmit/receive data with the source eNB 8-05 through the protocol layer devices 8-22 of the first bearer, in order to minimize the data interruption time that occurs during a handover, although the handover command message has been received.

In addition, if the UE has identified an indication regarding the second embodiment of the efficient handover method proposed in the disclosure (for example, DAPS handover method) from the handover command message included in the RRC layer device, or if the UE has identified an indicator regarding the DAPS handover method with regard to each bearer, the RRC layer device may deliver the indicator to the PDCP layer device corresponding to each bearer or to the bearer for which the DAPS handover method has been indicated. After receiving the indicator, the PDCP layer device switches from the first PDCP layer device structure 9-11 or 9-12 to the second PDCP layer device structure 9-20. The first step 8-01 may refer to a step in which the UE 8-20 receives a handover command message (RRCReconfiguration message) from the source eNB 8-05. In addition, according to the configuration included in the handover command message received by the UE 8-20, the UE 8-20 may, when switching to the second PDCP layer device structure 9-20, preconfigure or establish protocol layer devices (PHY layer device, MAC layer device, RLC layer device, or PDCP layer device) 8-21 of the second bearer for the target eNB 8-10, may induce and update a security key for the target eNB 8-10, and may configure header (or data) compression context for the target eNB 8-10.

In addition, it will be assumed that the UE 8-20 has received a handover command message, and that the handover command message has indicated the DAPS handover method proposed by the disclosure, or the DAPS handover method has been indicated with regard to specific bearers, or a PDCP reordering timer value has been newly configured. Then, when switching from the first PDCP layer device structure or function 9-11 or 9-12 to the second PDCP layer device structure or function 9-20 proposed by the disclosure with regard to each bearer or with regard to the bearer for which the DAPS handover method has been indicated, the UE 8-20 may update the parameter for reordering to "PDCP sequence number expected to be received next time or count value", may stop the reordering timer, and may restart the same. In addition, when the UE 8-20 has received a handover command message (for example, RRCReconfiguration message), the RRC layer device of the UE may start the first timer (for example, T304). The first timer may be stopped if the UE 8-20 performs a procedure of random access to the target eNB 8-10 in order to perform a hand over, and if the random access procedure is successfully completed (for example, the first condition proposed by the disclosure is satisfied). If the handover fails, and if the first timer expires, the UE 8-20 may fall back if the connection with the source eNB 8-05 is valid, may report the handover failure to the source eNB 8-05, and may attempt connection recovery. If the connection with the source eNB 8-05 is invalid, the UE 8-20 may perform an RRC connection reestablishment procedure.

The handover command message may be configured and established such that the second bearer has the same bearer identifier as the first bearer, thereby guaranteeing that no data interruption time occurs for each bearer. In addition, the second embodiment may be characterized in that the PDCP layer device of the first bearer and the PDCP layer device of the second bearer operate as a logically single PDCP layer device. A more detailed operating method will be described with reference to FIGS. 9A-9B.

In addition, in connection with the second embodiment, if the UE 8-20 is configured to be able to transmit uplink data both to the source eNB 8-05 and the target eNB 8-10, uplink data may be transmitted to only one of the source eNB 8-05 and the target eNB 8-10 in the second embodiment, in order to avoid the problem of coverage reduction due to lacking transmission power of the UE 8-20, or the problem of having to determine to which eNB a transmission resource request for uplink data is to be sent and then uplink data is to be transmitted (link selection). Specifically, if the UE 8-20 in the second embodiment is incapable of simultaneously transmitting uplink data to different eNBs at different frequencies or at the same frequency (incapable of dual uplink transmission), uplink data may be transmitted, in a single time unit, to only one of the source eNB 8-05 and the target eNB 8-10. Accordingly, the UE 8-20 may send a scheduling request to only one of the source eNB 8-05 and the target eNB 8-10, may transmit a report on the size of data to be transmitted by the PDCP layer device (for example, buffer status report) to only one of the source eNB 8-05 and the target eNB 8-10, may receive an uplink transmission resource, and may transmit uplink data to only one eNB. In addition, even if a handover command message is received from the source eNB 8-05, the UE 8-20 may not initialize the MAC layer device of the first bearer, in order to prevent data loss due to continued transmission and reception of data resulting from HARQ retransmission. The second embodiment may also be characterized in that, in the case of an AM-mode RLC layer device, RLC retransmission can be continuously performed.

As another method, if the handover command message indicates the second embodiment of the efficient handover method proposed by the disclosure (DAPS handover method) with regard to each bearer, the UE 8-20 may continuously transmit or receive data with the source eNB 8-05 with regard to only the bearer for which the second embodiment (DAPS handover method) has been indicated through the handover command message, with regard to only the PDCP layer device corresponding to the LCID, with regard to only the RLC layer device or MAC layer device, or with regard to only data corresponding to the bearer or LCID. In addition, even if the first condition proposed by the disclosure is satisfied (for example, uplink data transmission is switched to the target eNB 8-10), the UE 8-20 may continuously transmit or receive RLC control data (RLC status report), PDCP control data (ROHC feedback or PDCP status report), or HARQ retransmission with the source eNB 8-05 with regard to only the bearer for which the second embodiment (DAPS handover method) has been indicated through the handover command message, with regard to only the PDCP layer device corresponding to the LCID, or with regard to only the RLC layer device or MAC layer device. In addition, the handover command message indicates or has indicated the second embodiment of the efficient handover method proposed by the disclosure (DAPS handover method) for each bearer, the UE 8-20 stops transmitting or receiving data with the source eNB 8-05 with regard to a bearer for which the second embodiment (DAPS handover method) has not been indicated through the handover command message, with regard to the PDCP layer device corresponding to the LCID, or with regard to the RLC layer device or MAC layer device.

In connection with the second embodiment of the efficient handover method in FIG. 8, even when the UE 8-20 performs a procedure of random access to the target eNB 8-10 indicated by the handover command message in the second step 8-02 through protocol layer devices of the second bearer, the UE 8-20 may continuously transmit or receive data (transmit uplink data or receive downlink data) with the source eNB 8-05 through the protocol layer devices of the first bearer. The second step 8-02 may refer to a step in which the UE 8-20 performs a cell selection or reselection procedure, and performs a random access procedure with regard to the target cell indicated by the handover command message (RRCReconfiguration message) received from the source eNB 8-05.

The second embodiment of the efficient handover method in FIG. 8 is characterized in that, if the first condition is satisfied in the third step 8-03, the UE 8-20 stops transmitting uplink data to the source eNB 8-05 through the protocol layer devices 8-22 of the first bearer, and transmits uplink data to the target eNB 8-10 through the protocol layer devices 8-21 of the second bearer. In addition, the UE 8-20 may continuously receive downlink data from the source eNB 8-05 and the target eNB 8-10 through the protocol layer devices of the first and second bearers.

The third step 8-03 refers to a step in which the first condition is satisfied, and the UE 8-20 thus switches uplink transmission from the source eNB 8-05 to the target eNB 8-10. To be specific, until the first condition is satisfied, the UE 8-20 transmits uplink data to the source eNB 8-05 through a first bearer. If the first condition is satisfied, the UE 8-20 stops transmitting uplink data to the source eNB 8-05 through the first bearer, and starts transmitting uplink data to the target eNB 8-10 through a second bearer.

Specifically, in connection with the second PDCP layer device structure 9-20 proposed by the disclosure, if the first condition is satisfied, the PDCP layer device, which has been transmitting uplink data through the first bearer, then receives an indicator from the lower layer device (if a random access procedure from the MAC layer device to the target eNB has succeeded) or from the upper layer device (if the first timer in the RRC layer device has expired). Then, the PDCP layer device may stop transmitting uplink data through the first bearer and may switch so as to start transmitting uplink data through the second bearer. Furthermore, as in the PDCP layer device structure proposed in FIGS. 9A-9B, the receiving PDCP layer device 8-21 of the second bearer is driven integrally with the receiving PDCP layer device 8-22 of the first bearer, and may continuously perform seamless data reception from the source eNB 8-05 or the target eNB 8-10 by using information such as stored transmission/reception data, sequence number information, header compression and decompression context, and the like. The first condition may be one of the following conditions. The first condition proposed below provides an uplink data transmission switching timepoint configured such that transmission resources can be used most efficiently, and the data interruption time can be minimized to the largest extent.

It may be determined that the first condition is satisfied if the UE 8-20 has successfully completed a procedure of random access to the target eNB 8-10 through layer devices (for example, MAC layer device) of the second bearer, if the UE 8-20 has successfully completed a procedure of random access to the target eNB 8-10 through layer devices (for example, MAC layer device) of the second bearer and has received the first uplink transmission resource assigned thereto from the target eNB 8-10, or if an uplink transmission resource has first been indicated to the UE 8-20.

For example, more particularly, if the UE 8-20 has received a handover command message from the source eNB 8-05, if the UE 8-20 has been instructed to make a random access to the target eNB 8-10, and if the instructed random access is a contention-free random access (CFRA) (for example, if a predesignated preamble or a UE cell identifier (for example, cell radio network temporary identifier (C-RNTI) has been assigned thereto)

It may be considered that the random access procedure has been successfully completed when the UE 8-20 has transmitted a predesignated preamble to a cell of the target eNB 8-10 and has received an RAR message. Therefore, it may be determined that the first condition is satisfied if the UE 8-20 has received the first uplink transmission resource assigned, included, or indicated by the RAR message. As another method, it may be determined that the first condition is satisfied if an uplink transmission resource is first received after the RAR is received.

If the UE 8-20 has received a handover command message from the source eNB 8-05, if the UE 8-20 has been instructed to make a random access to the target eNB 8-10, and if the instructed random access is a contention-based random access (CBRA) (for example, if a predesignated preamble or a UE cell identifier (for example, C-RNTI) has not been assigned thereto)

It may be considered that the UE 8-20 has successfully completed the procedure of random access to the target eNB 8-10 if the UE 8-20 has transmitted a preamble (for example, any preamble) to a cell of the target eNB 8-10, has received an RAR message, has transmitted message 3 (for example, handover completion message) by using an uplink transmission resource assigned, included, or indicated by the RAR message, and has received a MAC CE indicating that contention has been resolved (that is, contention resolution MAC CE), through message 4, from the target eNB, or has received an uplink transmission resource through a PDCCH corresponding to the C-RNTI of the UE 8-20. Therefore, it may be determined that the first condition is satisfied if the UE 8-20 first thereafter monitors the PDCCH and first receives (or first receives indication of) an uplink transmission resource through the PDCCH corresponding to the C-RNTI of the UE. As another method, if the uplink transmission resource assigned through the RAR message has such a sufficient size that, after message 3 is transmitted, the UE 8-20 can additionally transmit uplink data, it may be determined that the first uplink transmission resource is received, and that the first condition is satisfied. That is, it may be determined, if the RAR is received, that the first uplink transmission resource is received, and that the first condition is satisfied.

If the handover command message received by the UE 8-20 also indicates a handover method requiring no random access procedure (RACH-less handover), If the handover command message includes an uplink transmission resource regarding the target eNB, The UE 8-20 may determine that the random access procedure has been successfully completed, and that the first condition is satisfied, if the UE 8-20 transmits message 3 (for example, handover completion message or RRCReconfigurationComplete message) by using the uplink transmission resource of the target eNB, and if the UE 8-20 receives a UE identify confirmation MAC CE from the eNB through message 4, or if the UE 8-20 receives an uplink transmission resource through a PDCCH corresponding to the C-RNTI of the UE. As another method, the UE 8-20 may determine that the first condition is satisfied, if the first uplink transmission resource is received through the PDCCH corresponding to the C-RNTI of the UE as a result of PDCCH monitoring after the random access procedure is successfully completed.

If the handover command message includes no uplink transmission resource regarding the target eNB 8-10, The UE 8-20 may determine that the random access procedure has been successfully completed, and that the first condition is satisfied, if an uplink transmission resource is received through the PDCCH corresponding to the C-RNTI of the UE as a result of PDCCH monitoring regarding the target eNB (or cell), if the UE 8-20 transmits message 3 (for example, handover completion message or RRCReconfigurationComplete message) by using the uplink transmission resource and receives a UE identify confirmation MAC CE from the eNB, or if the UE 8-20 receives an uplink transmission resource through the PDCCH corresponding to the C-RNTI of the UE. As another method, the UE 8-20 may determine that the first condition is satisfied, if the first uplink transmission resource is received through the PDCCH corresponding to the C-RNTI of the UE as a result of PDCCH monitoring after the random access procedure is successfully completed.

Hereinafter, a method for efficiently switching uplink data from the source eNB 8-05 to the target eNB 8-10 will be proposed in connection with the DAPS handover method proposed by the disclosure. Whether or not the first condition is satisfied may be confirmed or detected by a MAC layer device (or an RRC layer device) for the target eNB corresponding to the second bearer according to one of the following methods, which may be combined and extended into a new method.

First method: for example, if the RRCReconfiguration message received by the UE 8-20 indicates a DAPS handover, the UE 8-20 may configure a MAC layer device for the target eNB 8-10 corresponding to the second bearer, and the MAC layer device may perform a random access procedure and may confirm whether or not the first condition is satisfied. If the first condition is satisfied, the MAC layer device may send an indicator to the upper layer device (for example, PDCP layer device) so as to instruct the same to switch uplink data transmission from the source eNB, through the first bearer, to the target eNB, through the second bearer, in connection with the DAPS handover method proposed by the disclosure.

Second method: as another method, for example, if the RRCReconfiguration message received by the UE 8-20 indicates a DAPS handover, the UE 8-20 may configure a MAC layer device for the target eNB 8-10 corresponding to the second bearer, and the MAC layer device may perform a random access procedure and may confirm whether or not the first condition is satisfied. If the first condition is satisfied, the MAC layer device may indicate, to the upper layer device (for example, RRC layer device), that the first condition is satisfied. In addition, the upper layer device (for example, RRC layer device) may send an indicator to the lower layer device (for example, PDCP layer device) so as to instruct the same to switch uplink data transmission from the source eNB 8-05, through the first bearer, to the target eNB 8-10, through the second bearer, in connection with the DAPS handover method proposed by the disclosure. The upper layer device (for example, RRC layer device) stops the first timer if the first condition is satisfied, or if the procedure of random access to the target eNB 8-10 is successfully performed. For this reason, if the first timer stops, the RRC layer device may send an indicator to the PDCP layer device so as to instruct the same to switch uplink data transmission.

Third method: if the RRCReconfiguration message received by the UE 8-20 indicates a DAPS handover, the UE 8-20 may configure a MAC layer device for the target eNB 8-10 corresponding to the second bearer. If the RRC layer device of the UE 8-20 has sent an indicator to the lower layer device (for example, MAC layer device) so as to indicate that the same will perform a DAPS handover, the MAC layer device may perform a random access procedure and may confirm whether or not the first condition is satisfied. If the first condition is satisfied, the MAC layer device may send an indicator to the upper layer device (for example, PDCP layer device) so as to instruct the same to switch uplink data transmission from the source eNB 8-05, through the first bearer, to the target eNB 8-10, through the second bearer, in connection with the DAPS handover method proposed by the disclosure.

Fourth method: as another method, if the RRCReconfiguration message received by the UE 8-20 indicates a DAPS handover, the UE 8-20 may configure a MAC layer device for the target eNB 8-10 corresponding to the second bearer. If the RRC layer device of the UE 8-20 has sent an indicator to the lower layer device (for example, MAC layer device) so as to indicate that the same will perform a DAPS handover, the MAC layer device may perform a random access procedure and may confirm whether or not the first condition is satisfied. If the first condition is satisfied, the MAC layer device may indicate, to the upper layer device (for example, RRC layer device), that the first condition is satisfied. After identifying the indicator, the upper layer device (for example, RRC layer device) may stop the first timer, because the first timer stops if the first condition proposed by the disclosure is satisfied, or if the procedure of random access to the target eNB is successfully performed. In addition, the upper layer device (for example, RRC layer device) may send an indicator to the lower layer device (for example, PDCP layer device) so as to instruct the same to switch uplink data transmission from the source, through the first bearer, to the target, through the second bearer, in connection with the DAPS handover method proposed by the disclosure.

According to the first, second, third, or fourth method, if the PDCP layer device receives an indicator indicating that the first condition is satisfied, or an indicator instructing uplink data transmission from the source eNB to the target eNB, from the upper layer device (for example, RRC layer device) or from the lower layer device (for example, MAC layer device) (for example, if the DAPS handover method is indicated), the PDCP layer device may perform the following protocol layer device operation, in order to effectively switch uplink data transmission, and may perform one or more of the following operations, in order to prevent data loss caused by uplink data transmission. The following operations may be applied to a PDCP layer device connected to an AM DRB or UM DRB (an RLC layer device operating in the AM mode, or an RLC layer device operating in the UM mode). If there is data to be transmitted in its buffer before the first condition is satisfied, or before an indicator indicating that the first condition is satisfied is received, the PDCP layer device may indicate the size or amount of the data to be transmitted (for example, PDCP data volume) to the MAC layer device of the first bearer for the source eNB, thereby informing that there is data to be transmitted, and may transmit uplink data to the source eNB. The MAC layer device of the first bearer for the source eNB may then perform a scheduling request or buffer status report procedure in order to receive an uplink transmission resource assigned thereto from the source eNB. However, if the first condition is satisfied, or if an indicator indicating that the first condition is satisfied is received, the PDCP layer device may switch uplink data transmission to the target eNB 8-10 in the following manner:

The PDCP layer device may indicate that the size or amount of data to be transmitted to the MAC layer device of the first bearer for the source eNB 8-05 is zero (or there is none), in order to switch uplink data transmission from the first bearer for the source eNB 8-05 to the second bearer for the target eNB 8-10. That is, the PDCP layer device may indicate, to the MAC layer device of the first bearer, that the PDCP data volume is zero, thereby informing that there is no more data to be transmitted (even if there is actually data to be transmitted in the buffer, the PDCP layer device may indicate that there is no data to be transmitted to the MAC layer device of the first bearer for the source eNB, in order to switch uplink data transmission). However, if the handover method of the second embodiment of the disclosure (DAPS handover method) is indicated as proposed by the disclosure, or in the case of a bearer for which the handover method of the second embodiment of the disclosure (DAPS handover method) is indicated, and if RLC control data (RLC status report) or PDCP control data (PDCP status report or ROCH feedback) is produced, the UE 8-20 may indicate a data volume corresponding to the RLC control data or PDCP control data to the MAC layer device, and may transmit data to the source eNB.

The PDCP layer device connected to the AM DRB (RLC layer device operating in the AM mode) discards all of already-stored PDCP PDUs (for example, PDCP SDUs are not discarded in order to prevent loss of original data), and performs a new header compression procedure, based on header context for the target eNB 8-10, with regard to data (PDCP SDUs in the buffer) in the ascending order of COUNT values (or PDCP sequence number) assigned before the first condition is satisfied, or before an indicator indicating that the first condition is satisfied is received, from the first data (for example, PDCP SDU), successful delivery of which from lower layers (for example, RLC layer device corresponding to the first bearer for the source eNB 8-05) is not confirmed. The PDCP layer device applies security keys for the target eNB 8-10, thereby re-performing an integrity procedure or a ciphering procedure, configures a PDCP header, and delivers the same to a lower layer device (RLC layer device for the second bearer for the target eNB), thereby performing retransmission or transmission. That is, the PDCP layer device performs accumulative retransmission from the first data, successful delivery of which is not confirmed. As another method, the PDCP layer device may perform retransmission with regard to only data, successful delivery of which from lower layers (for example, (RLC layer devices of the first bearer for the source eNB 8-05) is not confirmed, when retransmission is performed.

More particularly, the PDCP layer device connected to the AM DRB (RLC layer device operating in the AM mode) discards all PDCP PDUs that have been stored to be transmitted to the source eNB 8-05 through the first protocol layer device already connected to the PDCP layer device (for example, PDCP SDUs are not discarded in order to prevent loss of original data). The PDCP layer device performs a new header or data compression procedure by applying header compression (or data compression) protocol context (or security key) corresponding to the target eNB 8-10, based on COUNT values (or PDCP sequence number) assigned before the first condition is satisfied, or before an indicator indicating that the first condition is satisfied is received, with regard to only data (for example, PDCP SDU), successful delivery of which from lower layers (which are first protocol layer devices for the source eNB 8-05, such as RLC layer device) is not confirmed. The PDCP layer device re-performs an integrity procedure or a ciphering procedure, configures a PDCP header, and delivers the same to a lower layer device, which is a second protocol layer device for transmitting the same to the target eNB 8-10, thereby performing retransmission or transmission. That is, in order to prevent transmission resources from being wasted, the PDCP layer device may perform selective retransmission with regard to only data, successful delivery of which is not confirmed.

As another method, the transmission or retransmission operation may be performed after releasing lower layers (for example, transmitting or receiving RLC layer device or MAC layer device), which are first protocol layer devices for transmitting data to the source eNB 8-05. If the transmission or retransmission operation is extended to the UM DRB, the PDCP layer device connected to the RLC layer device operating in the UM mode may consider that data that has not yet been delivered to the lower layer devices, data for which the PDCP discard timer has not expired, or data to which a PDCP sequence number (or COUNT value) has already been assigned is data received from an upper layer device, or data newly received. Without restarting the PDCP discard timer with regard to each piece of data, the PDCP layer device may perform header (or data) compression with regard to the data by using header (or data) compression context (or security key) for the target eNB 8-10. Alternatively, the PDCP layer device may perform a ciphering or integrity protection procedure, may produce a PDCP header, may concatenate the same, and may perform transmission or retransmission. The PDCP layer device may process data in the ascending order of COUNT values assigned before the procedure was triggered, and may perform transmission or retransmission. In addition, the window status parameter of the PDCP layer device connected to the UM DRB or AM DRB is not initialized, but is used with no change.

If there is data to be transmitted in the buffer, the PDCP layer device may indicate the size or amount of data to be transmitted (for example, PDCP data volume) to the MAC layer device of the second bearer for the target eNB 8-10, thereby informing that there is data to be transmitted, and may perform uplink data transmission switching to the target eNB 8-10. The MAC layer device of the second bearer for the target eNB 8-10 may then perform a scheduling request or buffer status report procedure in order to receive an uplink transmission resource assigned from the target eNB 8-10.

If an indicator indicating that the first condition is satisfied is received from the upper layer device (for example, RRC layer device) or from the lower layer device (for example, MAC layer device), the LTE or NR PDCP layer device connected to the AM DRB (RLC layer device operating in the AM mode) may switch uplink data transmission to the second bearer (for example, RLC layer device or MAC layer device) for the target eNB 8-10, and may send an indicator to the lower layer device (for example, RLC layer device or MAC layer device) of the first bearer for the source eNB 8-05 so as to instruct the same to discard data (for example, PDCP data (PDCP PDU)). The is because uplink data transmission is switched with regard to the AM DRB, data, successful delivery of which is not confirmed, is retransmitted through the second bearer for the target eNB 8-10, and, for this reason, data transmission to the source eNB 8-05 through the first bearer, if continued, is unnecessary and thus will waste the transmission resource. When an indicator is sent to the lower layer device so as to instruct the same to discard data, the PDCP layer device may send a discard indicator with regard to PDCP user data (PDCP data PDU) only, and may not send a discard indicator with regard to PDCP control data (PDCP control PDU, for example, PDCP status report or ROHC feedback). This is because the PDCP control data (PDCP control PDU, for example, PDCP status report or ROHC feedback) is information which needs to be transmitted in order to continuously receive downlink data from the source eNB 8-05 even after the first condition is satisfied, and if the same is lost, errors may occur to downlink data transmission.

The LTE or NR PDCP layer device connected to the AM DRB (RLC layer device operating in the AM mode) may switch uplink data transmission to the second bearer (for example, RLC layer device or MAC layer device) for the target eNB 8-10, and may send an indicator to the lower layer device (for example, RLC layer device or MAC layer device) of the first bearer for the source eNB 8-05 so as to instruct the same to discard all PDCP user data (PDCP data PDU) which the same stores or holds, except for the PDCP control data (PDCP control PDU, for example, PDCP status report or ROHC feedback).

As another method, the LTE or NR PDCP layer device connected to the AM DRB (RLC layer device operating in the AM mode) may switch uplink data transmission to the second bearer (for example, RLC layer device or MAC layer device) for the target eNB 8-10, and may send an indicator to the lower layer device (for example, RLC layer device or MAC layer device) of the first bearer for the source eNB 8-05 so as to instruct the same to discard PDCP user data (PDCP data PDU), successful delivery of which is not confirmed, or which is stored or held thereby, except for the PDCP control data (PDCP control PDU, for example, PDCP status report or ROHC feedback). The NR PDCP layer device may be connected to an LTE RLC layer device or NR RLC layer device so as to transmit or receive data, and the LTE PDCP layer device may be connected only to the LTE RLC layer device so as to transmit or receive data. Accordingly, specific operations are proposed, as follows:

If an indicator instructing that data (for example, PDCP user data) be discarded has been received from the LTE or NR PDCP layer device, and if the RLC layer device that has received the discard indicator is an LTE RLC layer device, If a part of user data (PDCP PDU, PDCP data PDU, or RLC SDU) received from the upper layer device (PDCP layer device) has not yet been mapped to RLC user data (RLC data PDU), or if the same has not been produced as RLC user data, the LTE PDCP layer device discards the user data. Therefore, if a part of the user data has already been mapped to the RLC user data (RLC data PDU), or if the same has been produced as RLC user data, the LTE PDCP layer device may transmit data to the source eNB without discarding the user data.

If an indicator instructing that data (for example, PDCP user data) be discarded has been received from the LTE or NR PDCP layer device, and if the RLC layer device that has received the discard indicator is an NR RLC layer device, If user data (PDCP PDU, PDCP data PDU, or RLC SDU) received from the upper layer device (PDCP layer device) or a part of the user data has been neither delivered nor sent to a lower layer device, the NR RLC layer device discards the user data. Therefore, if the user data or a part of the user data has been delivered or sent to a lower layer device, the NR RLC layer device may transmit data to the source eNB without discarding the user data. Therefore, unlike the LTE RLC layer device, the NR RLC layer device may discard more data, because even if the user data has been produced as RLC user data, the same may be discarded, as long as the same has not been delivered to a lower layer device. In addition, unnecessary data transmission may be prevented more efficiently.

The procedure of the LTE or PDCP layer device connected to the AM DRB sending a data discard indicator to a lower layer device may not be applied to the UM DRB in order to prevent transmission delay or data loss. This is because the UM DRB may perform no retransmission procedure.

However, as another method, the procedure of the LTE or PDCP layer device connected to the AM DRB sending a data discard indicator to a lower layer device may be expanded and applied to the UM DRB, in order to minimize uplink data transmission to the source eNB after uplink data transmission switching. For example, if an indicator indicating that the first condition is satisfied is received from an upper layer device (RRC layer device) or a lower layer device (MAC layer device), the LTE or NR PDCP layer device connected to the UM DRB (RLC layer device operating in the UM mode) may switch uplink data transmission to the second bearer (for example, RLC layer device or MAC layer device) for the target eNB 8-10, and may send an indicator to the lower layer device (for example, RLC layer device or MAC layer device) of the first bearer for the source eNB 8-05 so as to instruct the same to discard data (for example, PDCP data (PDCP PDU)). This is because, if uplink data transmission is switched to the UM DRB, and if data transmission to the source eNB 8-05 through the first bearer is minimized, transmission delay resulting from data forwarding from the source eNB 8-05 to the target eNB 8-10 can be prevented, and waste of transmission resources by the source eNB 8-05 can be prevented. When sending an indicator to a lower layer device so as to instruct the same to discard data, the PDCP layer device may send a discard indicator with regard to only PDCP user data (PDCP data PDU) and may not send a discard indicator with regard to PDCP control data (PDCP control PDU, for example, PDCP status report or ROHC feedback). This is because the PDCP control data (PDCP control PDU, for example, PDCP status report or ROHC feedback) is information which needs to be transmitted such that the UE 8-20 continuously receives downlink data from the source eNB 8-05 even after the first condition is satisfied, and if the same is lost, errors may occur to downlink data transmission.

The LTE or NR PDCP layer device connected to the UM DRB (RLC layer device operating in the UM mode) may switch uplink data transmission to the second bearer (for example, RLC layer device or MAC layer device) for the target eNB 8-10, and may send an indicator to a lower layer device (for example, RLC layer device or MAC layer device) of the first bearer for the source eNB 8-05 so as to instruct the same to discard all PDCP user data (PDCP data PDU) which the same stores or holds, except for the PDCP control data (PDCP control PDU, for example, PDCP status report or ROHC feedback).

As another method, the LTE or NR PDCP layer device connected to the UM DRB (RLC layer device operating in the UM mode) may switch uplink data transmission to the second bearer (for example, RLC layer device or MAC layer device) for the target eNB 8-10, and may send an indicator to a lower layer device (for example, RLC layer device or MAC layer device) of the first bearer for the source eNB 8-05 so as to instruct the same to discard PDCP user data (PDCP data PDU), which has been delivered from the PDCP layer device to the lower layer device, which is not actually transmitted by the lower layer device, for which the PDCP discard timer has not expired, or which is stored or held, except for the PDCP control data (PDCP control PDU, for example, PDCP status report or ROHC feedback). The NR PDCP layer device may be connected to an LTE RLC layer device or NR RLC layer device so as to transmit or receive data, and the LTE PDCP layer device may be connected only to the LTE RLC layer device so as to transmit or receive data. Accordingly, specific operations are proposed, as follows:

If an indicator instructing that data (for example, PDCP user data) be discarded has been received from the LTE or NR PDCP layer device, and if the RLC layer device that has received the discard indicator is an LTE RLC layer device, If a part of user data (PDCP PDU, PDCP data PDU, or RLC SDU) received from the upper layer device (PDCP layer device) has not yet been mapped to RLC user data (RLC data PDU), or if the same has not been produced as RLC user data, the LTE RLC layer device discards the user data. Therefore, if a part of the user data has already been mapped to the RLC user data (RLC data PDU), or if the same has been produced as RLC user data, the LTE RLC layer device may transmit data to the source eNB without discarding the user data.

If an indicator instructing that data (for example, PDCP user data) be discarded has been received from the LTE or NR PDCP layer device, and if the RLC layer device that has received the discard indicator is an NR RLC layer device, If user data (PDCP PDU, PDCP data PDU, or RLC SDU) received from the upper layer device (PDCP layer device) or a part of the user data has neither been delivered nor sent to a lower layer device, the NR RLC layer device discards the user data. Therefore, if the user data or a part of the user data has been delivered or sent to a lower layer device, the NR RLC layer device may transmit data to the source eNB without discarding the user data. Therefore, unlike the LTE RLC layer device, the NR RLC layer device may discard more data, because even if the user data has been produced as RLC user data, the same can be discarded, as long as the same has not been delivered to a lower layer device. In addition, unnecessary data transmission may be prevented more efficiently.

In connection with the second embodiment of the efficient handover method proposed by the disclosure (for example, DAPS handover method), the UE 8-20 may continuously receive downlink data from the source eNB 8-05 or the target eNB 8-10 through protocol layer devices of the first bearer for the source eNB 8-05 or the second bearer for the target eNB 8-10, even after a handover command message (for example, RRCReconfiguration message) has been received. In addition, transmission may be allowed, with regard to AM bearers, such that the RLC status report, which is not data, can be continuously uplink-transmitted to the source eNB (or target eNB) through the protocol layer devices of the first bearer (or second bearer), in order to guarantee that downlink data can be efficiently received from the source eNB (or target eNB), or that the source eNB (or target eNB) can efficiently transmit downlink data. That is, even if the UE has switched uplink data transmission to the target eNB on the ground that the first condition is satisfied, data transmission may be allowed through the first bearer for the source eNB in such a case in which RLC status report, HARQ ACK, NACK, or PDCP control data (PDCP ROHC feedback or PDCP status report) needs to be transmitted to the source eNB. This is because, in the case of AM bearers, if successful delivery is not indicated through an RLC status report (that is, if no RLC status report is received) after data is transmitted to the transmitting end, data can no longer be transmitted thereafter.

Specifically, in connection with the second embodiment of the efficient handover method in FIG. 8, it will be assumed that, since the first condition is satisfied, the UE 8-20 has stopped transmitting uplink data to the source eNB through the protocol layer device 8-22 of the first bearer, and has switched so as to start transmitting uplink data to the target eNB through the protocol layer devices 8-21 of the second bearer, in the third step (8-03). Even in such a case, the UE 8-20 may continuously transmit the HARQ ACK or HARQ NACK information, RLC status report (ACK or NACK information), or PDCP control data (for example, PDCP status report or PDCP ROHC feedback information) through the protocol layer devices of the first bearer (or second bearer) such that downlink data can be efficiently received from the source eNB (or target eNB), or such that the source eNB (or target eNB) can efficiently transmit downlink data.

In addition, in connection with the second embodiment of the efficient handover method in FIG. 8, it will be assumed that, since the first condition is satisfied, the UE 8-20 has stopped transmitting uplink data to the source eNB through the protocol layer device 8-22 of the first bearer, and has switched so as to start transmitting uplink data to the target eNB through the protocol layer devices 8-21 of the second bearer, in the third step (8-03). Even in such a case, the UE 8-20 may continue data transmission resulting from HARQ retransmission by the MAC device or resulting from retransmission by the AM-mode RLC layer device, in order to guarantee that there is no data loss to the source eNB 8-05. In addition, in connection with the second embodiment of the efficient handover method in FIG. 8, it will be assumed that, since the first condition is satisfied, the UE 8-20 has stopped transmitting uplink data to the source eNB 8-05 through the protocol layer device 8-22 of the first bearer, and has switched so as to start transmitting uplink data to the target eNB 8-10 through the protocol layer devices 8-21 of the second bearer, in the third step (8-03). In such a case, the source eNB 8-05 or the target eNB 8-10 may divide time and assign a transmission resource to the UE 8-20 such that the uplink transmission resource to the target eNB 8-10 and the uplink transmission resource to the source eNB 8-05 do not collide. If the uplink transmission resource to the target eNB 8-10 and the uplink transmission resource to the source eNB 8-05 collide and overlap, the UE 8-20 may prioritize the uplink transmission resource to the source eNB 8-05 and thereby transmit data to the source eNB, in order to maintain downlink data transmission from the source eNB 8-05, or in order to continuously receive the same with no problem. As another method, if the uplink transmission resource to the target eNB 8-10 and the uplink transmission resource to the source eNB 8-05 collide and overlap, the UE 8-20 may prioritize the uplink transmission resource to the target eNB 8-10 and thereby transmit data to the target eNB 8-10, in order to maintain downlink data transmission from the target eNB 8-10.

Specifically, if the UE 8-20 has received a handover command message, and if a handover corresponding to the second embodiment of the disclosure (for example, DAPS handover method) has been indicated, or if the same has been indicated to each bearer, the UE 8-20 or the bearer to which the DAPS handover method has been indicated may perform a scheduling request through the first protocol layer device, may transmits a buffer status report to the source eNB 8-05, may receive an uplink transmission resource, may transmit uplink data, and may receive downlink data from the source eNB 8-05, until the first condition is satisfied. However, if the first condition is satisfied, the UE 8-20 may no longer transmit data to the source eNB 8-05, may switch the uplink, may perform a scheduling request through the second protocol layer device, may transmit a buffer status report to the target eNB 8-10, may receive an uplink transmission resource, and may transmit uplink data to the target eNB 8-10. However, the UE 8-20 may continuously receive downlink data from the source eNB 8-05, and even after uplink transmission switching, the UE 8-20 may continuously transmit an HARQ ACK or HARQ NACK, RLC status report, or PDCP control data (for example, PDCP status report or ROHC feedback information) corresponding to the downlink data. In addition, the UE 8-20 may continuously receive downlink data from the source eNB 8-05 or target eNB 8-10 even if the first condition is satisfied.

The second embodiment of the efficient handover method in FIG. 8 may be characterized in that, if a second condition is satisfied, the UE 8-20 stops receiving downlink data from the source eNB 8-05 through the protocol layer devices 8-22 of the first bearer, or disconnects from the source eNB 8-05, in the fourth step 8-04. The second condition may be one of the following conditions. In addition, the PDCP layer device 8-21 of the second bearer may continue seamless data transmission or reception with the target eNB 8-10 by using information such as transmission or reception data, sequence number information, header compression and decompression context, and the like, stored in the PDCP layer device 8-22 of the first bearer.

It may be determined that the second condition is satisfied if the UE has performed a procedure of random access to the target eNB 8-10 through the layer devices 8-21 of the second bearer and has receive an RAR.

It may be determined that the second condition is satisfied if the UE has performed a procedure of random access to the target eNB 8-10 through the layer devices of the second bearer, has received an RAR, has configured a handover completion message, and has transmitted the same to the target eNB 8-10.

It may be determined that the second condition is satisfied if the UE has completed a procedure of random access to the target eNB 8-10 through the layer devices of the second bearer and has first transmitted data by using a PUCCH or PUSCH uplink transmission resource, or has first received the PUCCH or PUSCH uplink transmission resource.

It may be determined that the second condition is satisfied if the eNB has configured a separate timer for the UE 8-20 through an RRC message, and if the timer has expired.

The timer may be started if the UE has received a handover command message from the source eNB 8-05, if the UE has started a random access to the target eNB 8-10 (has transmitted a preamble), if the UE has received an RAR from the target eNB 8-10, if the UE has transmitted a handover completion message to the target eNB 8-10, or if the UE has first transmitted data by using a PUCCH or PUSCH uplink transmission resource.

It may be determined that the second condition is satisfied if the UE 8-20 has performed a procedure of random access to the target eNB 8-10 through the layer devices of the second bearer, has received an RAR, has configured a handover completion message, and has transmitted the same to the target eNB 8-10, and if successful delivery of the handover completion message has been confirmed by the MAC layer device (HARQ ACK) or RLC layer device (RLC ACK).

It may be determined that the second condition is satisfied if the UE 8-20 has performed a procedure of random access to the target eNB 8-10 through the layer devices of the second bearer and has received an RAR, or has configured a handover completion message, has transmitted the same to the target eNB 8-10, and has first received an uplink transmission resource assigned from the target eNB 8-10, or if the uplink transmission resource has first been indicated.

When the source eNB performs the efficient handover proposed by the disclosure, the same may determine when to stop transmitting downlink data to the UE 8-20 or when to disconnect from the UE 8-20. For example, the same may be determined in a predetermined method (for example, when a predetermined timer has expired (timer may start after handover is indicated), or when the source eNB 8-05 has received, from the target eNB 8-10, an indication that the UE 8-20 has successfully handed over to the target eNB 8-10). In addition, the UE 8-20 may determine that the second condition is satisfied if no downlink data is received form the source eNB 8-05 for a predetermined time, may determine that the same has disconnected from the source eNB 8-05, and may disconnect therefrom.

It may be determined that the second condition is satisfied if the UE has received, from the target eNB 8-10, an instruction (for example, RRC message (for example, RRCReconfiguration message), MAC CE, RLC control PDU, or PDCP control PDU) to disconnect from the source eNB 8-05.

It may be determined that the second condition is satisfied if the UE 8-20 has received, from the source eNB 8-05, an instruction (for example, RRC message (for example, RRCReconfiguration message), MAC CE, RLC control PDU, or PDCP control PDU) to disconnect from the source eNB 8-05.

It may be determined that the second condition is satisfied if the UE 8-20 fails to receive downlink data from the source eNB 8-05 for a predetermined time.

It may be determined that the second condition is satisfied if the UE 8-20 has successfully completed a procedure of random access to the target eNB 8-10 through layer devices (for example, MAC layer device) of the second bearer, if the UE 8-20 has successfully completed a procedure of random access to the target eNB 8-10 through layer devices of the second bearer and has received the first uplink transmission resource assigned from the target eNB 8-10, or if the uplink transmission resource has first been indicated to the UE 8-20.

For example, more specifically, if the UE 8-20 has received a handover command message from the source eNB 8-05, if the UE 8-20 has been instructed to make a random access to the target eNB 8-10, and if the instructed random access is a contention-free random access (CFRA) (for example, if a predesignated preamble or a UE cell identifier (for example, C-RNTI) has been assigned thereto)

It may be considered that the random access procedure has been successfully completed when the UE 8-20 has transmitted a predesignated preamble to a cell of the target eNB 8-10 and has received an RAR message. Therefore, it may be determined that the second condition is satisfied if the UE 8-20 has received the first uplink transmission resource assigned, included, or indicated by the RAR message. As another method, it may be determined that the second condition is satisfied if an uplink transmission resource is first received after the RAR is received.

If the UE 8-20 has received a handover command message from the source eNB 8-05, if the UE 8-20 has been instructed to make a random access to the target eNB 8-10, and if the instructed random access is a contention-based random access (CBRA) (for example, if a predesignated preamble or a UE cell identifier (for example, C-RNTI) has not been assigned thereto)

It may be considered that the UE 8-20 has successfully completed the procedure of random access to the target eNB 8-10 if the UE 8-20 has transmitted a preamble (for example, any preamble) to a cell of the target eNB 8-10, has received an RAR message, has transmitted message 3 (for example, handover completion message) by using an uplink transmission resource assigned, included, or indicated by the RAR message, and has received a MAC CE indicating that contention has been resolved (contention resolution MAC CE), through message 4, from the target eNB 8-10, or has received an uplink transmission resource through a PDCCH corresponding to the C-RNTI of the UE 8-20. Therefore, it may be determined that the second condition is satisfied if the UE 8-20 first thereafter monitors the PDCCH and first receives (or first receives indication of) an uplink transmission resource through the PDCCH corresponding to the C-RNTI of the UE. As another method, if the uplink transmission resource assigned through the RAR message has such a sufficient size that, after message 3 is transmitted, the UE 8-20 can additionally transmit uplink data, it may be determined that the first uplink transmission resource is received, and that the second condition is satisfied. That is, it may be determined, if the RAR is received, that the first uplink transmission resource is received, and that the second condition is satisfied.

If the handover command message received by the UE 8-20 also indicates a handover method requiring no random access procedure (RACH-less handover), If the handover command message includes an uplink transmission resource regarding the target eNB 8-10, The UE 8-20 may determine that the random access procedure has been successfully completed, and that the second condition is satisfied, if the UE 8-20 transmits message 3 (for example, handover completion message or RRCReconfigurationComplete message) by using the uplink transmission resource of the target eNB 8-10, and if the UE 8-20 receives a UE identify confirmation MAC CE from the target eNB 8-10 through message 4, or if the UE 8-20 receives an uplink transmission resource through a PDCCH corresponding to the C-RNTI of the UE 8-20. As another method, the UE 8-20 may determine that the second condition is satisfied, if the first uplink transmission resource is received through the PDCCH corresponding to the C-RNTI of the UE as a result of PDCCH monitoring after the random access procedure is successfully completed.

If the handover command message includes no uplink transmission resource regarding the target eNB 8-10, The UE 8-20 may determine that the random access procedure has been successfully completed, and that the second condition is satisfied, if an uplink transmission resource is received through the PDCCH corresponding to the C-RNTI of the UE as a result of PDCCH monitoring regarding the target eNB (or cell), if the UE 8-20 transmits message 3 (for example, handover completion message or RRCReconfigurationComplete message) by using the uplink transmission resource and receives a UE identify confirmation MAC CE from the target eNB 8-10, or if the UE 8-20 receives an uplink transmission resource through the PDCCH corresponding to the C-RNTI of the UE 8-20. As another method, the UE 8-20 may determine that the second condition is satisfied, if the first uplink transmission resource is received through the PDCCH corresponding to the C-RNTI of the UE as a result of PDCCH monitoring after the random access procedure is successfully completed.

When the UE 8-20 performs the second embodiment of the efficient handover method proposed by the disclosure (DAPS handover method), if the RRC layer device, MAC layer device, or RLC layer device of the first bearer for the source eNB 8-05 of the UE 8-20 or the RRC layer device, MAC layer device, or RLC layer device of the second bearer for the target eNB confirms that the second condition proposed by the disclosure is satisfied, an indicator may be sent to the PDCP layer device of the UE or bearer performing the DAPS handover method so as to indicate that the second condition is satisfied. If the PDCP layer device of the UE 8-20 receives, from a lower or upper layer device, an indicator indicating that the second condition is satisfied, the same may perform one or more of the following procedures, thereby successfully completing the efficient handover method proposed by the disclosure.

The UE 8-20 may release the first bearer for the source eNB 8-05 and may disconnect from the source eNB 8-05.

After disconnecting from the source eNB 8-05, the UE 8-20 may trigger a PDCP status report procedure in order to report the reception status of downlink data received from the source eNB 8-05 to the target eNB 8-10, may configure a PDCP status report, and may transmit the PDCP status report to the target eNB 8-10.

If the second condition is satisfied, the UE 8-20 may switch from the structure or function 9-20 of the second PDCP layer device to the structure or function 9-11 or 9-12 of the first PDCP layer device with regard to each bearer or with regard to the bearer to which the DAPS handover method has been indicated. The UE 8-20 may initialize the parameter for reordering, may stop the reordering timer, and may initialize the same. The UE 8-20 may apply a security key for the source eNB 8-05 or header decompression context to data stored in the buffer for reordering (for example, data received from the source eNB), thereby performing a deciphering procedure or header (or data) decompression, and may then discard the security key for the source eNB 8-05 or header decompression context. In addition, the UE 8-20 may deliver the processed data to the upper layer in an ascending order. That is, if the second condition is satisfied, the UE 8-20 may apply a security key for the source eNB 8-05 or header decompression context to data stored in the buffer for reordering (for example, data received from the source eNB), thereby performing a deciphering procedure or header (or data) decompression, and may then discard the security key for the source eNB 8-05 or header decompression context.

As another method, if the second condition is satisfied, the UE 8-20 may switch from the structure or function 9-20 of the second PDCP layer device to the structure or function 9-30 of the third PDCP layer device proposed by the disclosure with regard to each bearer or with regard to the bearer to which the DAPS handover method has been indicated. The UE 8-20 may continuously use the parameter for reordering and the reordering timer as they are, without stopping or initializing the same. However, the UE 8-20 may apply a security key for the source eNB 8-05 or header decompression context to data stored in the buffer for reordering (for example, data received from the source eNB), thereby performing a deciphering procedure or header (or data) decompression, and may then discard the security key for the source eNB 8-05 or header decompression context. In addition, the UE 8-20 may deliver the processed data to the upper layer in an ascending order. That is, if the second condition is satisfied, the UE 8-20 may apply a security key for the source eNB 8-05 or header decompression context to data stored in the buffer for reordering (for example, data received from the source eNB), thereby performing a deciphering procedure or header (or data) decompression, and may then discard the security key for the source eNB 8-05 or header decompression context.

The UE 8-20 may release QoS mapping information of the SDAP layer device for the source eNB 8-05, security key information for the source eNB 8-05 of the PDCP layer device, header (or data) compression context information for the source eNB 8-05, the RLC layer device or MAC layer device for the source eNB 8-05. If the second condition is satisfied, when the structure of the second PDCP layer device is changed, reconfigured, or switched to the structure of the first or third PDCP layer device with regard to the bearer for which the second embodiment of the disclosure (DAPS handover method) has been configured, or when the structure of the first PDCP layer device of the disclosure is changed, reconfigured, or switched to the structure of the second PDCP layer device, a proposed window parameter (for example, $(1-1)^{th}$ window parameter, $(1-2)^{th}$ window parameter, $(1-3)^{th}$ window parameter, $(1-4)^{th}$ window parameter, $(2-1)^{th}$ window parameter, $(2-2)^{th}$ window parameter, $(2-3)^{th}$ window parameter, or $(2-4)^{th}$ window parameter) update procedure may be applied. As another method, if the second condition is satisfied, when the structure of the second PDCP layer device is changed, reconfigured, or switched to the structure of the first or third PDCP layer device with regard to the bearer for which the second embodiment of the disclosure (DAPS handover method) has been configured, the value of the already-used window parameter (for example, $(1-1)^{th}$ window parameter, $(1-2)^{th}$ window parameter, $(1-3)^{th}$ window parameter, $(1-4)^{th}$ window parameter, $(2-1)^{th}$ window parameter, $(2-2)^{th}$ window parameter, $(2-3)^{th}$ window parameter, or $(2-4)^{th}$ window parameter) may be maintained and used as is.

In FIG. 6 of the disclosure, when the eNB transmits a handover command message 6-20 to the UE, the handover command message (for example, RRCReconfiguration message) may be used to define indicators regarding embodiments proposed by the disclosure and may be used to indicate, to the UE, a handover procedure corresponding to what embodiment is to be triggered. The UE may perform a handover procedure according to the handover method indicated through the handover command message. For example, the UE may perform the second embodiment of the efficient handover method proposed by the disclosure (DAPS handover method), thereby performing a handover to the target eNB while minimizing the data interruption time. As another method, the handover command message may be used to define indicators regarding embodiments proposed by the disclosure with regard to each bearer, and may be used to specifically indicate which embodiment is to be applied to which bearer during a handover. For example, application of the second embodiment of the disclosure only to an AM bearer for which an RLC layer device is driven in an AM mode may be indicated, or the same may be extensively applied to a UM bearer for which an RLC layer device is driven in a UM mode. In addition, it will be assumed that the embodiments proposed by the disclosure will be applied to a DRB. However, the same may be extensively applied to an SRB as well, if necessary (for example, if the UE, which maintains an SRB regarding the source eNB, has failed to hand over to the target eNB, and thus may report or restore a handover failure message by using the SRB regarding the source eNB).

According to embodiments of the disclosure, when the UE transmits/receives data with the source eNB through protocol layer devices of the first bearer and transmits/receives data with the target eNB through protocol layer devices of the second bearer, the MAC layer device of the first bearer and the MAC layer device of the second bearer may apply separate discontinuous reception (DRX) cycles, respectively, thereby reducing UE battery consumption. That is, assuming that the UE has applied the DRX cycle of the MAC layer device when transmitting/receiving data through protocol layer devices of the first bearer, the UE may still apply the same even after receiving a handover command message, and may also suspend the DRX according to the first or second condition of the disclosure. In addition, the UE may follow an instruction from the target eNB regarding application of a separate DRX cycle to the MAC layer device of the second bearer.

In addition, the description that the UE in the disclosure stops uplink transmission to the source eNB through protocol layer devices of the first bearer and stops downlink data reception from the source eNB means that the UE reestablishes, initializes, or releases the protocol layer devices (PHY layer device, MAC layer device, RLC layer device, or PDCP layer device) of the first bearer.

It has been assumed in the above description of embodiments of the disclosure, for convenience of description, that a first bearer for the source eNB or a second bearer for the target eNB is configured for the UE, but the description may be easily extended and equally applied to a case in which multiple first bearers for the source eNB or multiple second bearers for the target eNB are configured for the UE. As another method, the description may be easily extended and equally applied to a case in which multiple bearers are configured for multiple target eNBs. For example, second bearers may be configured while performing a procedure of handover to a first target eNB. If the handover fails, second bearers may be configured while performing a procedure of handover to a second target eNB. Accordingly, the UE may independently search for a cell satisfying a predetermined condition (for example, a predetermined signal intensity or higher) among multiple target eNBs, may determine a single cell, and may perform a handover procedure.

Figure 9A:
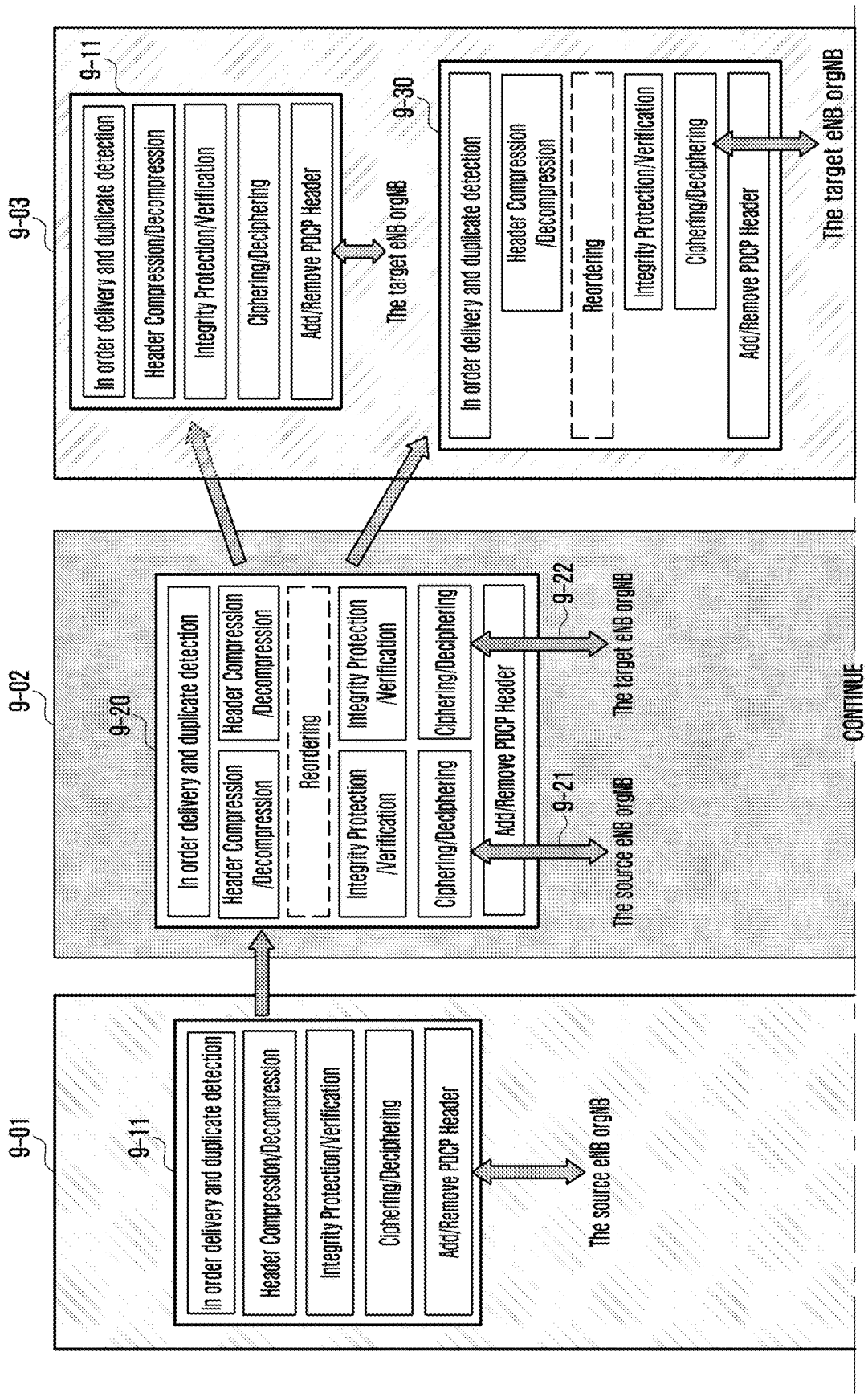
FIGS. 9A and 9B illustrates a diagram illustrating structures of an efficient packet data convergence protocol (PDCP) layer device applied to a dual active protocol stack (DAPS) handover method, which is a second embodiment of an efficient handover method proposed by the disclosure, and a method for applying the structures.
Figure 9B:
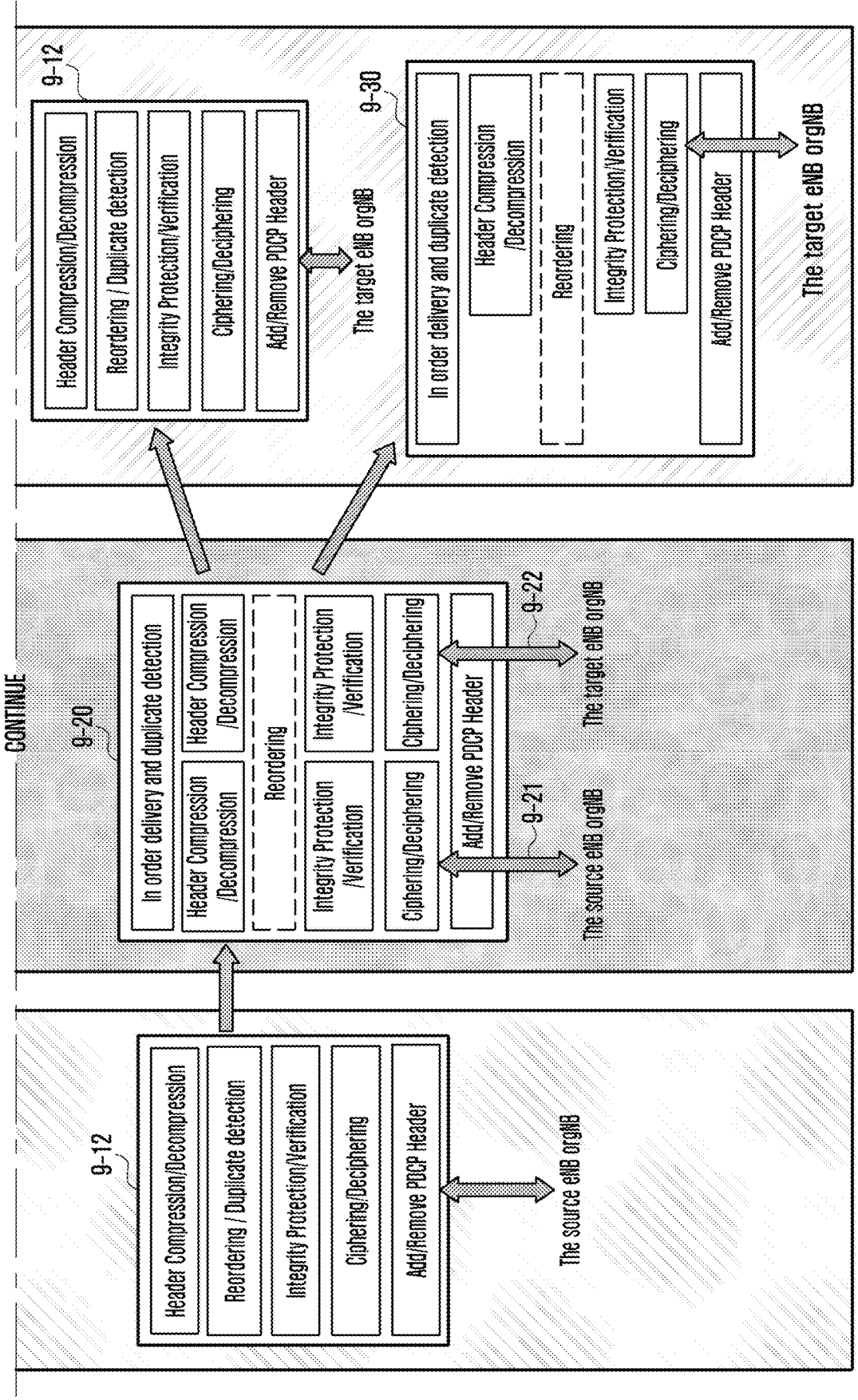

FIGS. 9A and 9B illustrates a diagram illustrating structures of an efficient PDCP layer device applied in a DAPS handover method, which is the second embodiment of the efficient handover method proposed by the disclosure, and a method for applying the structures.

FIGS. 9A-9B proposes detailed structures and functions of an efficient PDCP layer device applied in a DAPS handover method, which is the second embodiment of the efficient handover method proposed by the disclosure, and is characterized in that, while performing a DAPS handover procedure, structure of the PDCP layer device proposed below (different PDCP layer structures) may be applied at different timepoints with regard to each bearer.

For example, before a handover command message is received from the eNB, the UE may apply structures and functions 9-11 or 9-12 of the first PDCP layer device proposed by the disclosure with regard to each bearer, thereby processing data and transmitting or receiving the same (9-01).

However, if the UE has received a handover command message from the eNB, and if the handover command message indicates the DAPS handover method proposed by the disclosure, or if the handover command message indicates the DAPS handover method with regard to specific bearers, the UE may apply structures and functions 9-20 of the second PDCP layer device proposed by the disclosure with regard to respective bearers or with regard to the bearers for which the DAPS handover method has been indicated, thereby processing data and transmitting or receiving the same (9-02). That is, if the UE has received a handover command message, and if the handover command message indicates the DAPS handover method proposed by the disclosure, or if the handover command message indicates the DAPS handover method with regard to specific bearers, the UE may switch from the structure or function 9-11 or 9-12 of the first PDCP layer device that has been used by each bearer to the structure or function 9-20 of the second PDCP layer device proposed by the disclosure, with regard to each bearer or with regard to the bearer for which the DAPS handover method has been indicated. As another method, the UE may switch, if the first condition proposed by the disclosure is satisfied, from the structure or function 9-11 or 9-12 of the first PDCP layer device that has been used by each bearer to the structure or function 9-20 of the second PDCP layer device proposed by the disclosure, with regard to each bearer or with regard to the bearer for which the DAPS handover method has been indicated (9-02). In addition, it will be assumed that the UE has received a handover command message, and the handover command message indicates the DAPS handover method proposed by the disclosure, or the handover command message indicates the DAPS handover method with regard to specific bearers, or the PDCP reordering timer value is newly configured. When switching from the structure or function 9-11 or 9-12 of the first PDCP layer device to the structure or function 9-20 of the second PDCP layer device proposed by the disclosure with regard to each bearer or with regard to the bearer for which the DAPS handover method has been indicated, the UE may update the parameter for reordering to "PDCP sequence number or COUNT value expected to be received next", stop the reordering timer, and restart the same.

In addition, if the second condition proposed by the disclosure is satisfied while the UE performs the DAPS handover method proposed by the disclosure, the UE may release the structure and function 9-20 of the second PDCP layer device that has been applied with regard to each bearer or with regard to the bearer for which the DAPS handover method has been indicated, from the first bearers for the source eNB, may switch back to the structure and function 9-11 or 9-12 of the first PDCP layer device, and may apply the same. In addition, if the second condition is satisfied, and when the UE switches from the structure or function 9-20 of the second PDCP layer device to the structure and function 9-11 or 9-12 of the first PDCP layer device proposed by the disclosure with regard to each bearer or with regard to the bearer for which the DAPS handover method has been indicated, the UE may initialize the parameter for reordering, may stop the reordering timer, and may initialize the same. Furthermore, the UE may apply a security key for the source eNB or header decompression context to data stored in the buffer for reordering (for example, data received from the source eNB), thereby performing a deciphering procedure or header (or data) decompression, and may then discard the security key for the source eNB or header decompression context. In addition, the UE may deliver the processed data to the upper layer in an ascending order. That is, if the second condition is satisfied, the UE may apply a security key for the source eNB or header decompression context to data stored in the buffer for reordering (for example, data received from the source eNB), thereby performing a deciphering procedure or header (or data) decompression, and may then discard the security key for the source eNB or header decompression context.

As another method, if the second condition proposed by the disclosure is satisfied while the UE performs the DAPS handover method proposed by the disclosure, the UE may release the structure and function 9-20 of the second PDCP layer device that has been applied with regard to each bearer or with regard to the bearer for which the DAPS handover method has been indicated, from the bearers for the source eNB, may switch to the structure and function 9-30 of the third PDCP layer device, and may apply the same. In addition, if the second condition is satisfied, and when the UE switches from the structure or function 9-20 of the second PDCP layer device to the structure and function 9-30 of the third PDCP layer device proposed by the disclosure with regard to each bearer or with regard to the bearer for which the DAPS handover method has been indicated, the UE may not stop or initialize the parameter for reordering and the reordering timer, and may continuously use the same as they are. However, the UE may apply a security key for the source eNB or header decompression context to data stored in the buffer for reordering (for example, data received from the source eNB), thereby performing a deciphering procedure or header (or data) decompression, and may then discard the security key for the source eNB or header decompression context. In addition, the UE may deliver the processed data to the upper layer in an ascending order. That is, if the second condition is satisfied, the UE may apply a security key for the source eNB or header decompression context to data stored in the buffer for reordering (for example, data received from the source eNB), thereby performing a deciphering procedure or header (or data) decompression, and may then discard the security key for the source eNB or header decompression context.

As proposed above with reference to FIGS. 9A-9B of the disclosure, the UE may avoid data loss and minimize the data interruption time if a handover is performed by applying the structure and function 9-11 or 9-12 of the first PDCP layer device, the structure and function 9-20 of the second PDCP layer device, or the structure and function 9-30 of the third PDCP layer device, which are different from each other, with regard to each bearer at different timepoints.

The receiving operation of the receiving PDCP layer device in the structure of the first PDCP layer device or the structure of the second PDCP layer device proposed by the disclosure may be specified by using window parameters or constants as follows:

The $(1\text{-}1)^{th}$ window parameter (Next_PDCP_TX_SN): is a window parameter used by an LTE PDCP layer device, and indicates, in a transmitting PDCP layer device, the PDCP sequence number of next data (PDCP SDU), data to be processed next (PDCP SDU), or data to be transmitted next (PDCP SDU). The initial value of the window parameter is set to zero when the PDCP layer device is established.

The $(1\text{-}2)^{th}$ window parameter (Next_PDCP_RX_SN): is a window parameter used by an LTE PDCP layer device, and indicates a PDCP sequence number expected to be received next by a receiving PDCP layer device. The initial value of the window parameter is set to zero when the PDCP layer device is established.

The $(1\text{-}3)^{th}$ window parameter (Last_Submitted_PDCP_RX_SN): is a window parameter used by an LTE PDCP layer device, and indicates a PDCP sequence number corresponding to the last data (PDCP SDU) delivered from the receiving PDCP layer device to the upper layer device. The window parameter is set to a first constant value (Maximum_PDCP_SN) when the PDCP layer device is established.

The $(1\text{-}4)^{th}$ window parameter (Reordering_PDCP_RX_COUNT): is a window parameter used by an LTE PDCP layer device. The window parameter may be used when the receiving PDCP layer device performs a reordering function. The window parameter indicates, stores, or has the next COUNT value of the COUNT value corresponding to data (PDCP PDU) that has triggered the reordering timer.

The first constant value (Maximum_PDCP_SN): is a constant value used by an LTE PDCP layer device, and the value of 2^(length of PDCP sequence number)−1 is stored as the constant value.

The second constant value (Reordering_Window or Window_Size): is a constant value used by an LTE PDCP layer device or NR PDCP layer device, and the value of 2^(length of PDCP sequence number−1) is stored as the constant value.

The $(2\text{-}1)^{th}$ window parameter (TX_NEXT): is a window parameter used by an NR PDCP layer device, and indicates, in a transmitting PDCP layer device, the COUNT value of next data (PDCP SDU), data to be processed next (PDCP SDU), or data to be transmitted next (PDCP SDU). The initial value of the window parameter is set to zero when the PDCP layer device is established.

The $(2\text{-}2)^{th}$ window parameter (RX_NEXT): is a window parameter used by an NR PDCP layer device, and indicates a COUNT value expected to be received by the receiving PDCP layer device. The initial value of the window parameter is set to zero when the PDCP layer device is established.

The $(2\text{-}3)^{th}$ window parameter (RX_DELIV): is a window parameter used by an NR PDCP layer device, and indicates a COUNT value corresponding to the first data (PDCP SDU) not delivered from the receiving PDCP layer device to the upper layer device. The initial value of the window parameter is set to zero when the PDCP layer device is established.

The $(2\text{-}4)^{th}$ window parameter (RX_REORD): is a window parameter used by an NR PDCP layer device. The window parameter may be used when the receiving PDCP layer device performs a reordering function. The window parameter indicates, stores, or has the next COUNT value of a COUNT value corresponding to data (PDCP PDU) that has triggered the reordering timer.

The structure 9-11 or 9-12 of the first PDCP layer device proposed in FIGS. 9A-9B may have the following $(1\text{-}1)^{th}$ PDCP layer device, $(1-2)^{th}$ PDCP layer device, $(1-3)^{th}$ PDCP layer device, or $(1-4)^{th}$ PDCP layer device proposed by the disclosure, and may have the following characteristics:

1> (In the case of the structure of the $(1-1)^{th}$ PDCP layer device), if the UE applies the structure and function 9-11 of the first PDCP layer device to a PDCP layer device (for example, E-UTRA PDCP layer device or LTE PDCP layer device) connected to an AM RLC layer device (for example, E-UTRA AM RLC layer device), for example, the following procedure may be performed based on the $(1-2)^{th}$ window parameter, the $(1-3)^{th}$ window parameter, or the second constant value.

2> The receiving PDCP layer device may first perform detection of data outside the window or detection of duplicated data, based on the $(1-2)^{th}$ window parameter, the $(1-3)^{th}$ window parameter, or the second constant value, with regard to received data. (the RLC AM may have retransmission, and the LTE RLC SN and the PDCP SN may have different sizes. Therefore, duplicated data or data outside the window may be received. The window refers to an area of the PDCP sequence number of COUNT value in which effective data is received.)

3> The UE performs a deciphering procedure and a header decompression procedure, and then discards the data outside the window or the duplicated data, based on the $(1-2)^{th}$ window parameter, the $(1-3)^{th}$ window parameter, or the second constant value. (This is because the same may include useful information (for example, IR packet or header compression information) for the header decompression procedure. Therefore, the same may be discarded after being checked.)

2> The UE drives a PUSH window, based on the $(1-2)^{th}$ window parameter, $(1-3)^{th}$ window parameter, or second constant value. In addition, the UE instantly deciphers pieces of data, which are received without being discarded, without reordering them, and then performs a header decompression procedure. This is because the E-UTRA AM RLC layer device sorts pieces of data in an order and delivers them to the PDCP layer device.

2> In addition, the UE delivers the pieces of data to the upper layer in the ascending order of the COUNT value.

2> If the UE has received a handover command message, and if the handover command message (for example, RRCReconfiguration message) indicates the second embodiment proposed by the disclosure (DAPS handover method) with regard to an AM DRB having the structure of the $(1-1)^{th}$ PDCP layer device performing the above procedure (for example, PDCP layer device (for example, E-UTRA PDCP layer device or LTE PDCP layer device) connected to AM RLC layer device (for example, E-UTRA AM RLC layer device)), the UE may change, reconfigure, or switch from the structure of the $(1-1)^{th}$ PDCP layer device to the second PDCP layer device, and may perform the following window parameter update procedure:

3> In the structure of the $(1-1)^{th}$ PDCP layer device, the UE performs a received data processing operation based on the $(1-2)^{th}$ window parameter, the $(1-3)^{th}$ window parameter, or the second constant value, but in the structure of the second PDCP layer device, the UE performs a received data processing operation based on not only the $(1-2)^{th}$ window parameter, the $(1-3)^{th}$ window parameter, or the second constant value, but also the $(1-4)^{th}$ window parameter for a reordering function. Therefore, when changing, reconfiguring, or switching to the structure of the second PDCP layer device, the UE may configure, update, or initialize the $(1-4)^{th}$ window parameter to a COUNT value which includes the $(1-2)^{th}$ window parameter and a corresponding received hyper frame number (HFN), or which is related thereto. As another method, if a reordering timer value has been configured by the handover command message, or if the reordering timer is being driven, the UE may stop the reordering timer, may restart the reordering timer with a newly configured timer value, and may configure, update, or initialize the $(1-4)^{th}$ window parameter to a COUNT value which includes the $(1-2)^{th}$ window parameter and a corresponding received hyper frame number (HFN), or which is related thereto. If the reordering timer is not being driven, the UE may update the reordering timer value to the new reordering timer value, and may configure, update, or initialize the $(1-4)^{th}$ window parameter to a COUNT value which includes the $(1-2)^{th}$ window parameter and a corresponding received hyper frame number (HFN), or which is related thereto. As another method, if the PDCP sequence number of data (PDCP SDU) first received after changing or reconfiguring to the structure of the second PDCP layer device is x (or if the x value is not zero), the $(1-4)^{th}$ window parameter may be configured, updated, or initialized to a COUNT value which includes the calculation result value of [(x+1) modulo (first constant value+1)] and a corresponding received hyper frame number (HFN), or which is related thereto.

3> After changing or reconfiguring to the structure of the second PDCP layer device, the $(1-2)^{th}$ window parameter or the $(1-3)^{th}$ window parameter is used as is without changing the parameter value.

1> (In the case of the structure of the $(1-2)^{th}$ PDCP layer device), if the UE applies the structure and function 9-11 of the first PDCP layer device to a PDCP layer device (for example, E-UTRA PDCP layer device or LTE PDCP layer device) connected to an UM RLC layer device (for example, E-UTRA UM RLC layer device), for example, the following procedure may be performed based on the $(1-2)^{th}$ window parameter or the second constant value.

2> The UE may not perform a procedure of detecting data outside the window or detecting duplicated data. This is because the UM E-UTRA RLC layer device has no retransmission procedure.

2> The UE may determine an HFN value or a COUNT value, based on the $(1-2)^{th}$ window parameter or the second constant value, may drive a PULL window procedure, may instantly perform a deciphering procedure regarding the received data, and may perform a header decompression procedure.

2> In addition, the UE may deliver to a layer immediately above the reordering procedure (for example, in ascending order).

2> If the UE has received a handover command message, and if the handover command message (for example, RRCReconfiguration message) indicates the second embodiment proposed by the disclosure (DAPS handover method) with regard to a UM DRB having the structure of the $(1-2)^{th}$ PDCP layer device performing the above procedure (for example, PDCP layer device (for example, E-UTRA PDCP layer device or LTE PDCP layer device) connected to UM RLC layer device (for example, E-UTRA UM RLC layer device)), the UE may change, reconfigure, or switch from the structure of the $(1-2)^{th}$ PDCP layer device to the second PDCP layer device, and may perform the following window parameter update procedure:

3> In the structure of the $(1-2)^{th}$ PDCP layer device, the UE performs a received data processing operation based on the $(1-2)^{th}$ window parameter or the second constant value, but in the structure of the second PDCP layer device, the UE performs a received data processing operation based on not only the $(1-2)^{th}$ window parameter or the second constant value, but also the $(1-3)^{th}$ window parameter and the $(1-4)^{th}$ window parameter for a reordering function. Therefore, when changing, reconfiguring, or switching to the structure of the second PDCP layer device, the $(1-3)^{th}$ window parameter or the $(1-4)^{th}$ window parameter may be updated in the following method:

4> The UE may configure, update, or initialize the $(1-4)^{th}$ window parameter to a COUNT value which includes the $(1-2)^{th}$ window parameter and a corresponding received hyper frame number (HFN), or which is related thereto. As another method, if a reordering timer value has been configured by the handover command message, or if the reordering timer is being driven, the UE may stop the reordering timer, may restart the reordering timer with a newly configured timer value, and may configure, update, or initialize the $(1-4)^{th}$ window parameter to a COUNT value which includes the $(1-2)^{th}$ window parameter and a corresponding received hyper frame number (HFN), or which is related thereto. If the reordering timer is not being driven, the UE may update the reordering timer value to the new reordering timer value, and may configure, update, or initialize the $(1-4)^{th}$ window parameter to a COUNT value which includes the $(1-2)^{th}$ window parameter and a corresponding received hyper frame number (HFN), or which is related thereto. As another method, if the PDCP sequence number of data (PDCP SDU) first received after changing or reconfiguring to the structure of the second PDCP layer device is x (or if the x value is not zero), the $(1-4)^{th}$ window parameter may be configured, updated, or initialized to a COUNT value which includes the calculation result value of [(x+1) modulo (first constant value+1)] and a corresponding received hyper frame number (HFN), or which is related thereto.

4> The UE may configure, update, or initialize the $(1-3)^{th}$ window parameter to a PDCP sequence number corresponding to the last data (PDCP SDU) delivered to the upper layer device. As another method, the UE may configure, update, or initialize the $(1-3)^{th}$ window parameter to a calculation result value of $[((1-2)^{th}$ window parameter value−1) modulo (first constant value+1)]. As another method, if the PDCP sequence number of data (PDCP SDU) first received after changing or reconfiguring to the structure of the second PDCP layer device is x (or if the x value is not zero), the $(1-3)^{th}$ window parameter may be configured, updated, or initialized to a calculation result value of [x modulo (first constant value+1)].

4> After changing or reconfiguring to the structure of the second PDCP layer device, the UE may use the $(1-2)^{th}$ window parameter as is without changing the parameter value.

1> (In the case of the structure of the $(1-3)^{th}$ PDCP layer device), if the UE applies the structure and function 9-11 of the first PDCP layer device to a PDCP layer device (for example, E-UTRA PDCP layer device or LTE PDCP layer device) configured as a split bearer, packet duplication bearer, or LTE wireless local area network (WLAN) aggregation (LWA) bearer, for example, the UE may always apply the reordering procedure and the reordering timer, and may perform the following procedure, based on the $(1-2)^{th}$ window parameter, $(1-3)^{th}$ window parameter, $(1-4)^{th}$ window parameter, or first constant value.

2> The UE may first detect data outside the window or detect duplicated data, with regard to received data, based on the $(1-2)^{th}$ window parameter, $(1-3)^{th}$ window parameter, $(1-4)^{th}$ window parameter, or first constant value. (This is because the RLC AM may retransmit data, or data may be received from different RLC layer devices at different timepoints; the LTE RLC SN and the PDCP SN may have different sizes; and, as a result, data outside the window or duplicated data may be received.)

3> The UE performs a deciphering procedure, but does not perform a header decomposition procedure. (This is because the E-UTRA PDCP cannot configure a header compression protocol with regard to a split bearer or LWA bearer.)

3> If an integrity protection or verification procedure is performed, the UE discards data after performing the same. If the integrity verification procedure fails, the data may be discarded and reported to the upper layer device.

3> The UE discards data outside the window or reduplicated data.

2> The UE may perform a PUSH window operation based on the $(1-2)^{th}$ window parameter, $(1-3)^{th}$ window parameter, $(1-4)^{th}$ window parameter, or first constant value. If none is discarded, the UE may instantly perform a deciphering procedure with regard to received pieces of data without reordering them. In addition, if integrity protection or verification is configured, the UE performs integrity verification. If an integrity protection or verification procedure is performed, the UE discards data after performing the same. If the integrity verification procedure fails, the UE may discard the data and report to the upper layer device.

2> In addition, the UE may reorder received pieces of data. If they are sorted continuously in the ascending order with no gap of the PDCP sequence number or COUNT value, the UE may perform a header compression procedure (if header compression procedure or decompression procedure has been configured), and may deliver the data to the upper layer in the ascending order.

2> If the reordering timer is being driven

3> If data corresponding to a COUNT value having the same value as a value obtained by subtracting one from the value maintained by the parameter for reordering has been delivered to the upper layer device, or if all data has been delivered to the upper layer with no gap in the PDCP sequence number (or COUNT value)

4> The UE stops and initializes the reordering timer.

2> If the reordering timer is not being driven

3> If there is data, which has not delivered to the upper layer device, and which is stored in the buffer, or if there is a gap in the PDCP sequence number (or COUNT value)

4> The UE starts the reordering timer.

4> In addition, the UE updates the parameter for reordering to a PDCP sequence number or COUNT value expected to be received next.

2> If the reordering timer has expired

3> If a header decompression procedure is configured with regard to stored pieces of data, in the ascending order of the PDCP sequence number or COUNT value, with regard to values smaller than the reordering parameter value, the UE performs a header decompression procedure and delivers the same to the upper layer device.

3> If a header decompression procedure is configured continuously with regard to stored pieces of data, in the ascending order of the PDCP sequence number or COUNT value, with regard to values equal to or larger than the reordering parameter value, the UE performs a header decompression procedure and delivers the same to the upper layer device.

3> In addition, the UE updates the parameter value regarding the last data delivered to the upper layer to the PDCP sequence number or CONT value of the last delivered data.

3> If there is data, which has not delivered to the upper layer device, and which is stored in the buffer, or if there is a gap in the PDCP sequence number (or COUNT value)
4> The UE starts the reordering timer.
4> In addition, the UE updates the parameter for reordering to a PDCP sequence number or COUNT value expected to be received next.
2> If the UE has received a handover command message, and if the handover command message (for example, RRCReconfiguration message) indicates the second embodiment proposed by the disclosure (DAPS handover method) with regard to a DRB having a PDCP layer device (for example, E-UTRA PDCP layer device or LTE PDCP layer device) connected to the structure of the $(1-3)^{th}$ PDCP layer device performing the above procedure, the UE may change, reconfigure, or switch from the structure of the $(1-3)^{th}$ PDCP layer device to the second PDCP layer device, and may perform the following window parameter update procedure:
3> The UE may configure, update, or initialize the $(1-4)^{th}$ window parameter to a COUNT value which includes the $(1-2)^{th}$ window parameter and a corresponding received hyper frame number (HFN), or which is related thereto. As another method, if a reordering timer value has been configured by the handover command message, or if the reordering timer is being driven, the UE may stop the reordering timer, may restart the reordering timer with a newly configured timer value, and may configure, update, or initialize the $(1-4)^{th}$ window parameter to a COUNT value which includes the $(1-2)^{th}$ window parameter and a corresponding received hyper frame number (HFN), or which is related thereto. If the reordering timer is not being driven, the UE may update the reordering timer value to the new reordering timer value, and may configure, update, or initialize the $(1-4)^{th}$ window parameter to a COUNT value which includes the $(1-2)^{th}$ window parameter and a corresponding received hyper frame number (HFN), or which is related thereto. As another method, if the PDCP sequence number of data (PDCP SDU) first received after changing or reconfiguring to the structure of the second PDCP layer device is x (or if the x value is not zero), the $(1-4)^{th}$ window parameter may be configured, updated, or initialized to a COUNT value which includes the calculation result value of [(x+1) modulo (first constant value+1)] and a corresponding received hyper frame number (HFN), or which is related thereto. As another method, the UE may maintain the existing $(1-4)^{th}$ window parameter value and may apply the same as is.
3> After changing or reconfiguring to the structure of the second PDCP layer device, the UE may maintain the parameter value of the $(1-2)^{th}$ window parameter, the $(1-3)^{th}$ window parameter, or the $(1-4)^{th}$ window parameter and may use the same as is.
1> (In the case of the structure of the $(1-4)^{th}$ PDCP layer device), if the UE applies the structure and function 9-12 of the first PDCP layer device to an NR PDCP layer device, the UE may always apply the reordering procedure and the reordering timer, and may perform the following procedure based on the $(2-2)^{th}$ window parameter, the $(2-3)^{th}$ window parameter, the $(2-4)^{th}$ window parameter, or the first constant value.
2> The UE may first perform a deciphering procedure with regard to received data.
2> If an integrity protection or verification procedure is configured, the UE may perform the integrity protection or verification procedure with regard to the received data. If the integrity verification procedure fails, the data may be discarded and reported to the upper layer device.
2> The UE detects data outside the window or detects duplicated data, with regard to the received data, based on the $(2-2)^{th}$ window parameter, the $(2-3)^{th}$ window parameter, the $(2-4)^{th}$ window parameter, or first constant value. (The UE may detect data outside the window or duplicated data after performing a deciphering procedure. As another method, the UE may detect data outside the window or duplicated data after performing a deciphering procedure only if an integrity protection or verification procedure has been configured. If no integrity protection or verification procedure has been configured, the UE may perform a deciphering procedure with regard to only data that has not been discarded after detecting data outside the window or duplicated data.)
3> The UE discards data outside the window or duplicated data.
2> The UE may drive a PUSH window based on the $(2-2)^{th}$ window parameter, $(2-3)^{th}$ window parameter, $(2-4)^{th}$ window parameter, or first constant value. If none is discarded, the UE may sort received pieces of data in an order, and if they are sorted continuously in the ascending order with no gap of the PDCP sequence number or COUNT value, the UE may perform a header compression procedure (if header compression procedure or decompression procedure has been configured), and may deliver the data to the upper layer in the ascending order.
2> In addition, the UE delivers data to the upper layer in the ascending order of the COUNT value.
2> If the reordering timer is being driven
3> If data corresponding to a COUNT value having the same value as a value obtained by subtracting one from the value maintained by the parameter for reordering has been delivered to the upper layer device, if all data has been delivered to the upper layer with no gap in the PDCP sequence number (or COUNT value), or if the value of the parameter storing the value of the PDCP sequence number (or COUNT value) of data to be delivered to the upper layer is larger than or equal to the value of the parameter for reordering
4> The UE stops and initializes the reordering timer.
2> If the reordering timer is not being driven
3> If there is data, which has not delivered to the upper layer device, and which is stored in the buffer, if there is a gap in the PDCP sequence number (or COUNT value), or if the value of the parameter storing the COUNT value of the first data, which has not been delivered to the upper layer, is smaller than the value of the parameter for reordering
4> In addition, the UE updates the parameter for reordering to a PDCP sequence number or COUNT value expected to be received next.
4> The UE starts the reordering timer.
2> If the reordering timer has expired
3> If a header decompression procedure is configured with regard to stored pieces of data, in the ascending order of the PDCP sequence number or COUNT value, with regard to values smaller than the reordering parameter value, the UE performs a header decompression procedure and delivers the same to the upper layer device.
3> If a header decompression procedure is configured continuously with regard to stored pieces of data, in the ascending order of the PDCP sequence number or COUNT value, with regard to values equal to or larger than the reordering parameter value, the UE performs a header decompression procedure and delivers the same to the upper layer device.
3> In addition, the UE updates the parameter value regarding the first data that has not been delivered to the upper layer to the PDCP sequence number or CONT value of the first data that has not been delivered to the upper layer.

3> If there is data, which has not delivered to the upper layer device, and which is stored in the buffer, if there is a gap in the PDCP sequence number (or COUNT value), or if the value of the parameter storing the COUNT value of the first data that has not been delivered to the upper layer is smaller than the value of the parameter for reordering 4> In addition, the UE updates the parameter for reordering to a PDCP sequence number or COUNT value expected to be received next.

4> The UE starts the reordering timer.

2> If the UE has received a handover command message, and if the handover command message (for example, RRCReconfiguration message) indicates the second embodiment proposed by the disclosure (DAPS handover method) with regard to a DRB having a PDCP layer device (for example, NR PDCP layer device) connected to the structure of the $(1\text{-}4)^{th}$ PDCP layer device performing the above procedure, the UE may change, reconfigure, or switch from the structure of the $(1\text{-}4)^{th}$ PDCP layer device to the second PDCP layer device, and may perform the following window parameter update procedure:

3> The UE may configure, update, or initialize the $(2\text{-}4)^{th}$ window parameter to the COUNT value of the $(2\text{-}2)^{th}$ window parameter. As another method, if a reordering timer value has been configured by the handover command message, or if the reordering timer is being driven, the UE may stop the reordering timer, may restart the reordering timer with a newly configured timer value, and may configure, update, or initialize the $(2\text{-}4)^{th}$ window parameter to the COUNT value of the $(2\text{-}2)^{th}$ window parameter. If the reordering timer is not being driven, the UE may update the reordering timer value to the new reordering timer value, and may configure, update, or initialize the $(2\text{-}4)^{th}$ window parameter to the COUNT value of the $(2\text{-}2)^{th}$ window parameter. As another method, if the COUNT value of data (PDCP SDU) first received after changing or reconfiguring to the structure of the second PDCP layer device is x (or if the x value is not zero), the UE may configure, update, or initialize the $(2\text{-}4)^{th}$ window parameter to the COUNT value of x+1. As another method, the UE may maintain the existing $(2\text{-}4)^{th}$ window parameter value and may apply the same as is.

3> After changing or reconfiguring to the structure of the second PDCP layer device, the UE may maintain the parameter value of the $(2\text{-}2)^{th}$ window parameter, the $(2\text{-}3)^{th}$ window parameter, or the $(2\text{-}4)^{th}$ window parameter and may use the same as is.

The structure 9-20 of the second PDCP layer device proposed in FIGS. 9A-9B may have the following $(2\text{-}1)^{th}$ PDCP layer device structure or $(2\text{-}2)^{th}$ PDCP layer device structure, and may have the following characteristics:

The disclosure proposes the structure of a second PDCP layer device that is handover-efficient, as in 9-20. The structure of the second PDCP layer device may be applied to the second embodiment of the efficient handover method for minimizing the data interruption time proposed by the disclosure.

In the second PDCP layer device structure, the UE may transmit or receive data with the source eNB 9-21 through protocol layer devices (for example, SDAP layer device, PDCP layer device, RLC layer device, or MAC layer device) of the first bearer, and may transmit or receive data with the target eNB 9-22 through protocol layer devices (for example, SDAP layer device, PDCP layer device, RLC layer device, or MAC layer device) of the second bearer.

The PDCP layer device of the first bearer and the PDCP layer device of the second bearer may be separately configured for the UE, but may operate logically as a single PDCP layer device as in 9-20. Specifically, the single PDCP layer device may be implemented such that function of the PDCP layer device are divided into functions of the upper PDCP layer device (for example, sequence number assigning function, reordering function, in-sequence delivery function, or duplication detecting function) and functions of two lower PDCP layer devices for each source eNB and each target eNB (for example, ciphering or deciphering function, header (or data) compression or header (or data) decompression function, integrity protection or verification function, or duplication detecting function). In addition, in connection with the DAPS handover method as proposed above, the UE may transmit uplink to the source eNB and, if the first condition is satisfied, may switch to the target eNB. The UE may continuously receive downlink data from the source eNB and the target eNB. Therefore, in connection with header (or data) compression protocol context, only one type of context for the source eNB or target eNB may be maintained and applied with regard to the uplink, and two types of context for the source eNB or target eNB may be maintained and applied with regard to the downlink.

The $(2\text{-}1)^{th}$ PDCP layer structure proposed by the disclosure (for example, E-TRAN PDCP layer device for DAPS handover method) based on the second PDCP layer structure proposed above may have the following characteristics. In addition, the same may be characterized in that, in the $(2\text{-}1)^{th}$ PDCP layer structure, a PUSH window is driven, based on the $(1\text{-}2)^{th}$ window parameter, $(1\text{-}3)^{th}$ window parameter, or $(1\text{-}4)^{th}$ window parameter, and received data is processed.

The upper transmitting PDCP layer device function may play the role (or function) of assigning PDCP sequence numbers to pieces of data received from the upper layer device. In addition, in connection with two lower transmitting PDCP layer device functions 9-21 and 9-22 for reach source eNB and each target eNB, separate security keys configured with each source eNB and each target eNB may be used such that the header (or data) compression context or security key configured with the source eNB is applied to data to be transmitted to the source eNB, and the header (or data) compression context or security key configured with the target eNB is applied to data to be transmitted to the target eNB. If a header (or data) compression procedure has been configured, the header (or data) compression procedure may be applied. If integrity protection has been configured, an integrity protection procedure is applied to the PDCP header and data (PDCP SDU), and a ciphering procedure is applied thereto. Data to be transmitted to the source eNB may be delivered to the transmitting RLC layer device of the first bearer, and data to be transmitted to the target eNB may be delivered to the transmitting RLC layer device of the second bearer, thereby performing transmission. The two lower transmitting PDCP layer device functions 9-21 and 9-22 may be characterized in that, in order to accelerate the data processing rate, a header compression, integrity protection, or ciphering procedure may be performed in parallel (parallel data processing), and in that the two lower transmitting PDCP layer device functions may use different security keys to perform the integrity protection or ciphering procedure. In addition, different types of compression context, security keys, or security algorithms may be applied inside a logically single transmitting PDCP layer device, thereby performing a compression, integrity protection, or ciphering procedure with regard to difference pieces of data.

In connection with the receiving PDCP layer device, and with regard to data received from respective lower layer devices, specifically, with regard to data received from two RLC layer devices for each source eNB and each target eNB, the lower receiving PDCP layer device functions 9-21 and 9-22 for the source eNB or target eNB may independently perform procedures of detecting data outside the window or detecting duplication, with regard to data received from respective RLC layer devices, with reference to the PDCP sequence number or COUNT value. As another method, the UE may perform a procedure of detecting data outside the window or detecting duplication with regard to the entire received data, with reference to PDCP sequence number or COUNT value, without distinguishing respective RLC layer devices. As another method, for the purpose of more accurate duplication detection, the UE may detect data outside the window with regard to the entire received data, with reference to PDCP sequence number or COUNT value, without distinguishing respective RLC layer devices, and may independently perform a duplication detecting procedure with regard to each piece of data received from each RLC layer device. As another method, if pieces of data received from different eNBs overlap each other, the UE may detect data outside the window with regard to the entire received data, with reference to PDCP sequence number or COUNT value, without distinguishing respective RLC layer devices, in order to prevent loss of data for the header compression protocol. In connection with the duplication detection procedure, the UE may perform a deciphering procedure, integrity protection procedure, or header (or data) decompression procedure with regard to each piece of data received from each RLC layer device, and may then perform a duplication detecting procedure with regard to the entire data.

Lower-layer functions of the receiving PDCP layer device may be characterized in that, by using separate header (or data) compression context or security keys configured with each source eNB and each target eNB, a deciphering procedure is instantly applied to received data, and if integrity protection has been configured, an integrity protection procedure may be applied to the PDCP header and data (PDCP SDU).

The $(2\text{-}1)^{th}$ PDCP layer structure may be characterized in that the UE may instantly perform a header (or data) decompression procedure with regard to data received from RLC layer devices of the first bearer for each source eNB, without reordering the same, and may instantly perform a header (or data) decompression procedure with regard to data received from RLC layer devices of the second bearer for each target eNB, without reordering the same. In addition, in order to distinguish between data received from RLC layer devices of the first bearer for each source eNB and data received from RLC layer devices of the second bearer for each target eNB, the UE may define an indicator for each piece of data so as to distinguish between data received from the source eNB and data received from the target eNB. As another method, the UE may define a one-bit indicator of the PDCP header, SDAP header, or RLC header so as to distinguish between data received from the source eNB and data received from the target eNB. In addition, the UE may perform a duplication detecting procedure (procedure of discarding all, except for one piece of data (which may be applied to data received previously or data delivered to the upper layer), with regard to each PDCP sequence number or COUNT value), based on the PDCP sequence number or COUNT value, with regard to all of the data received from RLC layer devices of the first bearer for the source eNB, which have completed the header (or data) compression procedure, and the data received from RLC layer devices of the second bearer for the target eNB. In addition, the UE may perform a reordering procedure in an ascending order, based on the PDCP sequence number or COUNT value, with regard to all of the data received from RLC layer devices of the first bearer for the source eNB and the data received from RLC layer devices of the second bearer for the target eNB, and may then deliver data to the upper layer device in the order. The single PDCP layer device may receive data from different eNBs, that is, from the first or second bearer, regardless of the order, and the reordering procedure is always to be performed.

The two lower receiving PDCP layer device functions may be characterized in that, in order to accelerate the data processing rate, a header compression, integrity protection, or ciphering procedure is performed in parallel (parallel data processing), based on each PDCP sequence number or COUNT value, and in that different types of header (or data) compression context or security keys are used to perform the integrity protection, ciphering, or decompression procedure. In addition, the UE may apply different types of header (or data) compression context, security keys, or security algorithms inside a logically single transmitting PDCP layer device, thereby performing an integrity protection, ciphering, or decompression procedure with regard to different pieces of data. In addition, the lower receiving PDCP layer device functions are characterized in that an out-of-sequence deciphering or integrity verification procedure is performed with regard to each piece of received data, regardless of the order of the PDCP sequence number or COUNT value.

When the single PDCP layer device distinguishes between layer devices of the first bearer and layer devices of the second bearer, the fact that they are connected to different MAC layer devices is considered, or they are given different logical channel identifiers, or the fact that they are different RLC layer devices connected to different MAC layer devices is considered, or the fact that they use different ciphering keys is considered. As such, the layer devices (or first RLC layer device) of the first bearer and the layer devices (or second RLC layer device) of the second bearer are distinguished, different security keys are used to perform a ciphering or deciphering procedure with regard to uplink data and downlink data, and different types of compression protocol texts are used to compress or decompress the same.

The $(2\text{-}2)^{th}$ PDCP layer structure proposed by the disclosure (for example, NR PDCP layer device for DAPS handover method) based on the second PDCP layer structure proposed above may have the following characteristics. In addition, the same may be characterized in that, in the $(2\text{-}2)^{th}$ PDCP layer structure, a PUSH window is driven, based on the $(2\text{-}2)^{th}$ window parameter, $(2\text{-}3)^{th}$ window parameter, or $(2\text{-}4)^{th}$ window parameter, and received data is processed.

The upper transmitting PDCP layer device function may play the role of assigning PDCP sequence numbers to pieces of data received from the upper layer device. In addition, in connection with two lower transmitting PDCP layer device functions 9-21 and 9-22 for reach source eNB and each target eNB, separate security keys configured with each source eNB and each target eNB may be used such that the header (or data) compression context or security key configured with the source eNB is applied to data to be transmitted to the source eNB, and the header (or data) compression context or security key configured with the target eNB is applied to data to be transmitted to the target eNB. If a header (or data) compression procedure has been configured, the header (or data) compression procedure may be applied. If integrity protection has been configured, an integrity protection procedure is applied to the PDCP header and data (PDCP SDU), and a ciphering procedure is applied thereto. Data to be transmitted to the source eNB may be delivered to the transmitting RLC layer device of the first bearer, and data to be transmitted to the target eNB may be delivered to the transmitting RLC layer device of the second bearer, thereby performing transmission. The two lower transmitting PDCP layer device functions 9-21 and 9-22 may be characterized in that, in order to accelerate the data processing rate, a header compression, integrity protection, or ciphering procedure may be performed in parallel (parallel data processing), and in that the two lower transmitting PDCP layer device functions may use different security keys to perform the integrity protection or ciphering procedure. In addition, different types of compression context, security keys, or security algorithms may be applied inside a logically single transmitting PDCP layer device, thereby performing a compression, integrity protection, or ciphering procedure with regard to difference pieces of data.

In connection with the receiving PDCP layer device, and with regard to data received from respective lower layer devices, specifically, with regard to data received from two RLC layer devices for each source eNB and each target eNB, the lower receiving PDCP layer device functions 9-21 and 9-22 for the source eNB or target eNB may independently perform procedures of detecting data outside the window or detecting duplication, with regard to data received from respective RLC layer devices, with reference to the PDCP sequence number or COUNT value. As another method, for convenience of implementation, the UE may perform a procedure of detecting data outside the window or detecting duplication with regard to the entire received data, with reference to PDCP sequence number or COUNT value, without distinguishing respective RLC layer devices. As another method, for the purpose of more accurate duplication detection, the UE may detect data outside the window with regard to the entire received data, with reference to PDCP sequence number or COUNT value, without distinguishing respective RLC layer devices, and may independently perform a duplication detecting procedure with regard to each piece of data received from each RLC layer device. As another method, if pieces of data received from different eNBs overlap each other, the UE may detect data outside the window with regard to the entire received data, with reference to PDCP sequence number or COUNT value, without distinguishing respective RLC layer devices, in order to prevent loss of data for the header compression protocol. In connection with the duplication detection procedure, the UE may perform a deciphering procedure, integrity protection procedure, or header (or data) decompression procedure with regard to each piece of data received from each RLC layer device, and may then perform a duplication detecting procedure with regard to the entire data.

Lower-layer functions of the receiving PDCP layer device may be characterized in that, by using separate header (or data) compression context or security keys configured with each source eNB and each target eNB, a deciphering procedure is instantly applied to received data, and if integrity protection has been configured, an integrity protection procedure may be applied to the PDCP header and data (PDCP SDU).

The $(2\text{-}2)^{th}$ PDCP layer structure may be characterized in that a reordering procedure is performed with regard to all of the data received from RLC layer devices of the first bearer for each source eNB and the data received from RLC layer devices of the second bearer for each target eNB, and a header (or data) decompression procedure is performed by applying header (or data) compression context of each eNB (source eNB or target eNB) with regard to each piece of data received from each eNB (source eNB or target eNB), in the ascending order of the PDCP sequence number or COUNT value. In addition, in order to distinguish between data received from RLC layer devices of the first bearer for each source eNB and data received from RLC layer devices of the second bearer for each target eNB, the UE may define an indicator for each piece of data so as to distinguish between data received from the source eNB and data received from the target eNB. As another method, the UE may define a one-bit indicator of the PDCP header, SDAP header, or RLC header so as to distinguish between data received from the source eNB and data received from the target eNB. In addition, the UE may perform a duplication detecting procedure (procedure of discarding all, except for one piece of data (which may be applied to data received previously or data delivered to the upper layer), with regard to each PDCP sequence number or COUNT value), based on the PDCP sequence number or COUNT value, with regard to all of the data received from RLC layer devices of the first bearer for the source eNB, which have completed the header (or data) compression procedure, and the data received from RLC layer devices of the second bearer for the target eNB. In addition, the UE may deliver data to the upper layer device in the ascending order, based on the PDCP sequence number or COUNT value, with regard to all of the data received from RLC layer devices of the first bearer for the source eNB and the data received from RLC layer devices of the second bearer for the target eNB. The single PDCP layer device may receive data from different eNBs, that is, from the first or second bearer, regardless of the order, and the reordering procedure is always to be performed.

The two lower receiving PDCP layer device functions may be characterized in that, in order to accelerate the data processing rate, a header compression, integrity protection, or ciphering procedure is performed in parallel (parallel data processing), based on each PDCP sequence number or COUNT value, and in that different types of header (or data) compression context or security keys are used to perform the integrity protection, ciphering, or decompression procedure. In addition, the UE may apply different types of header (or data) compression context, security keys, or security algorithms inside a logically single transmitting PDCP layer device, thereby performing an integrity protection, ciphering, or decompression procedure with regard to different pieces of data. In addition, the lower receiving PDCP layer device functions may be characterized in that an out-of-sequence deciphering or integrity verification procedure is performed with regard to each piece of received data, regardless of the order of the PDCP sequence number or COUNT value.

When the single PDCP layer device distinguishes between layer devices of the first bearer and layer devices of the second bearer, the fact that they are connected to different MAC layer devices is considered, or they are given different logical channel identifiers, or the fact that they are different RLC layer devices connected to different MAC layer devices is considered, or the fact that they use different ciphering keys is considered. As such, the layer devices (or first RLC layer device) of the first bearer and the layer devices (or second RLC layer device) of the second bearer are distinguished, different security keys are used to perform a ciphering or deciphering procedure with regard to uplink data and downlink data, and different types of compression protocol texts are used to compress or decompress the same.

The disclosure proposes the structure of a third PDCP layer device that is handover-efficient, as in 9-30. The structure of the third PDCP layer device may be applied to the second embodiment of the efficient handover method for minimizing the data interruption time proposed by the disclosure. In addition, the structure of the third PDCP layer device proposed by the disclosure may be characterized in that the function of the PDCP layer device is identical to that in the structure of the second PDCP layer device proposed by the disclosure. However, the third PDCP layer device structure may be characterized in that the first bearer for the source eNB is released from the second PDCP layer device structure. Specifically, the structure of the third PDCP layer device proposed by the disclosure has the same function as the structure of the second PDCP layer device proposed by the disclosure, but may be characterized in that the first bearer (for example, SDAP layer device, PDCP layer device, RLC layer device, or MAC layer device) for the source eNB is released. Therefore, the structure of the third PDCP layer device proposed by the disclosure may be characterized in that QoS mapping information of the SDAP layer device for the source eNB, security key information for the source eNB of the PDCP layer device, header (or data) compression context information for the source eNB, or RLC layer device or MAC layer device for the source eNB is released.

If the second condition of the disclosure is satisfied, or if the UE is release wireless connection with the source eNB (9-03), the UE may change, reconfigure, or switch the structure of the second PDCP layer device to the structure of the first PDCP layer device or structure of the third PDCP layer device with regard to the bearer for which the second embodiment of the disclosure (DAPS handover method) is configured. In addition, when the UE changes, reconfigures, or switches the structure of the second PDCP layer device to the structure of the first PDCP layer device or structure of the third PDCP layer device with regard to the bearer for which the second embodiment of the disclosure (DAPS handover method) is configured, the UE may apply a window parameter (for example, $(1-1)^{th}$ window parameter, $(1-2)^{th}$ window parameter, $(1-3)^{th}$ window parameter, $(1-4)^{th}$ window parameter, $(2-1)^{th}$ window parameter, $(2-2)^{th}$ window parameter, $(2-3)^{th}$ window parameter, or $(2-4)^{th}$ window parameter) update procedure proposed when changing, reconfiguring, or switching from the structure of the first PDCP layer device to the structure of the second PDCP layer device. As another method, if the second condition is satisfied, or if the UE is to release wireless connection with the source eNB, the UE may maintain the value of the already-used window parameter (for example, $(1-1)^{th}$ window parameter, $(1-2)^{th}$ window parameter, $(1-3)^{th}$ window parameter, $(1-4)^{th}$ window parameter, $(2-1)^{th}$ window parameter, $(2-2)^{th}$ window parameter, $(2-3)^{th}$ window parameter, or $(2-4)^{th}$ window parameter) and use the same as is, when the UE changes, reconfigures, or switches the structure of the second PDCP layer device to the structure of the first PDCP layer device or structure of the third PDCP layer device with regard to the bearer for which the second embodiment of the disclosure (DAPS handover method) is configured.

Figure 10:
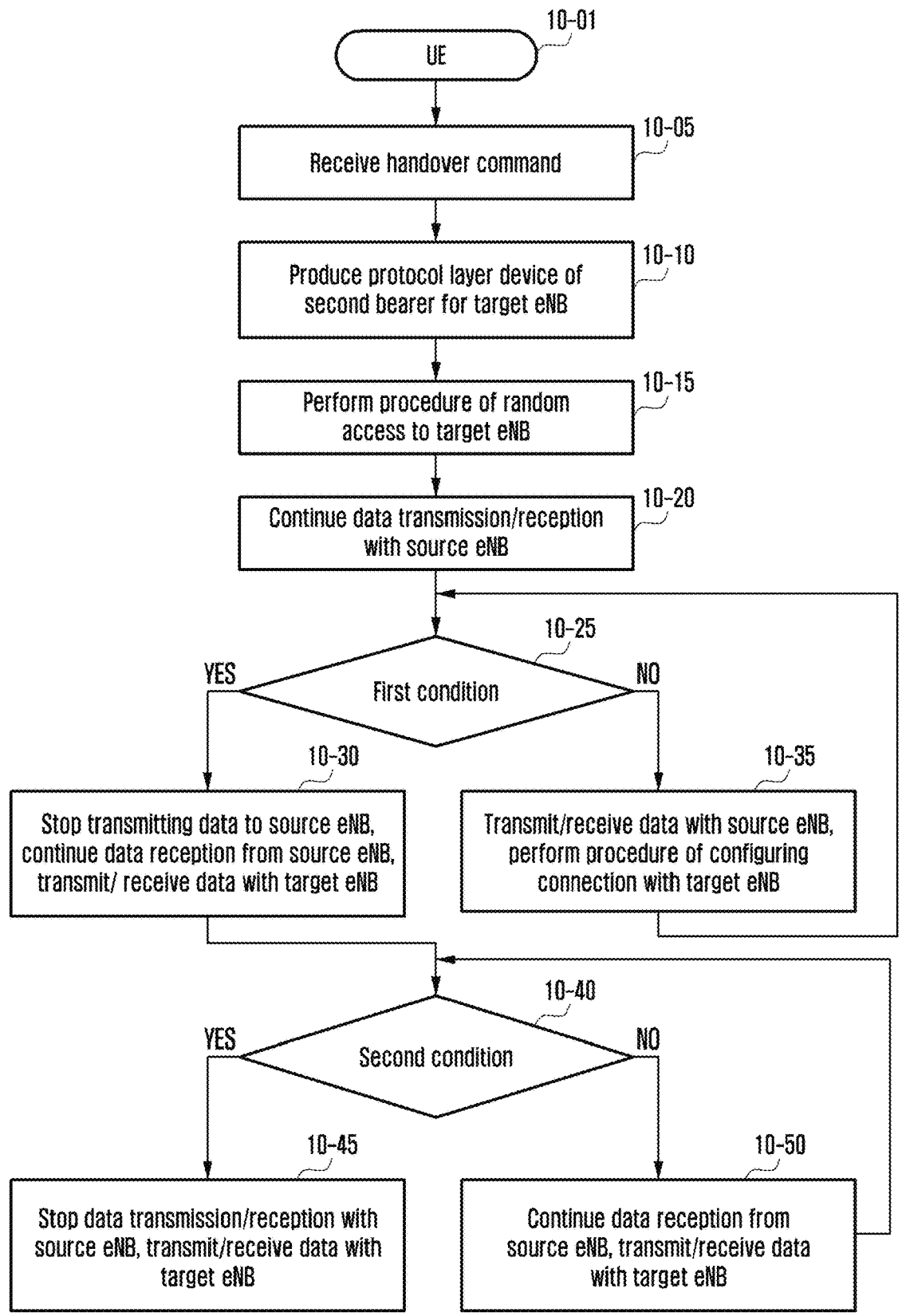
FIG. 10 illustrates a diagram illustrating UE operations applicable to embodiments proposed by the disclosure.

FIG. 10 illustrates a diagram illustrating UE operations applicable to embodiments proposed by the disclosure.

In FIG. 10, the UE 10-05 may transmit or receive data with the source eNB through the first PDCP layer device structure with regard to each bearer. However, if the UE receives a handover command message, and if the handover command message indicates the DAPS handover method of the second embodiment proposed by the disclosure, or if the handover command message indicates the DAPS handover method with regard to each bearer, the UE switches to the structure of the second PDCP layer device, in connection with the target eNB indicated by the message, with regard to each bearer or with regard to bearers for which the DAPS handover method is indicated. The UE configures/establishes protocol layer devices of the second bearer, and performs a procedure of random access to the target eNB through the established protocol layer devices (10-10, 10-15). In this process, the UE may continuously transmit or receive data (transmit uplink data and receive downlink data) with the source eNB through protocol layer devices of the first bearer (10-20).

If the first condition is satisfied (10-25), the UE my stop transmitting uplink data to the source eNB through protocol layer devices of the first bearer, may switch uplink data transmission, may transmit uplink data to the target eNB through protocol layer devices of the second bearer, and may continuously receive downlink data from the source eNB and the target eNB through protocol layer devices of the first bearer and the second bearer (10-30). In addition, the PDCP layer device of the second bearer may continue to seamlessly transmit or receive data with the target eNB by using information (for example, transmitted data, received data, sequence number information, or header compression and decompression context) stored in the PDCP layer device of the first bearer. If the first condition is not satisfied, the UE may continuously check the first condition while continuously performing the already performed procedure (10-35).

If the second condition is satisfied (10-40), the UE may stop receiving downlink data from the source eNB through protocol layer devices of the first bearer (10-45). In addition, the PDCP layer device of the second bearer may continue to seamlessly transmit or receive data with the target eNB by using information (for example, transmitted data, received data, sequence number information, or header compression and decompression context) stored in the PDCP layer device of the first bearer (10-45).

If the second condition is not satisfied, the UE may continuously check the second condition while continuously performing the already performed procedure (10-50).

A specific embodiment of the PDCP layer device proposed by the disclosure may perform a different procedure according to the type of handover indicated by a handover command message received by the UE, as follows:

If the type of handover indicated by the handover command message received by the UE from the source eNB corresponds to the handover of the first embodiment (for example, normal handover procedure), The UE may perform a PDCP re-establishment procedure with regard to the PDCP layer device with regard to each bearer. For example, the UE may, with regard to the SRB, initialize window state parameters and discard stored data (PDCP SDU or PDCP PDU), and may initialize window state parameters with regard to a UM DRB. In addition, with regard to data that has not yet been transmitted to a lower layer device, or with regard to data for which a PDCP discard timer has not expired, the UE may compress the same, based on the header (or data) compression context or security key of the target eNB, in the ascending order of the COUNT value, or may cipher the same, or may perform integrity protection, and may perform transmission or retransmission. In addition, if a reordering timer is being driven, the UE may stop and initialize the same, may successively process received pieces of data (PDCP SDU or PDCP PDU), and may deliver the same to an upper layer device. In connection with an AM DRB, the UE may not initialize window state parameters. The UE may compress or cipher the first piece of data (PDCP SDU or PDCP PDU), successful delivery of which from the lower layer device is not confirmed, and following pieces of data, based on the header (or data) compression context or security key of the target eNB, in the ascending order of the PDCP sequence number or COUNT value, or may perform integrity protection thereof, and may perform transmission or retransmission.

If the type of handover indicated by the handover command message received from the source eNB corresponds to the handover of the second embodiment (or handover indicated for each bearer), After receiving the handover command message, which indicates the DAPS handover method, the PDCP layer device may performing the following procedures without performing the PDCP re-establishment procedure. For example, with regard to an SRB, the UE may initialize window state parameters (parameter initialization may be omitted in order to fall back in the case of a DAPS handover failure), or may discard stored data (PDCP SDU or PDCP PDU). In addition, with regard to an UM DRB, the UE may not initialize window state parameters, and may continuously transmit or receive data with the source eNB with regard to data that has not yet been transmitted to a lower layer device, or with regard to data for which the PDCP discard timer has not expired. In addition, with regard to an AM DRB, the UE may not initialize window state parameters, and may continuously transmit or receive data with the source eNB.

The UE may perform proposed procedures, if the first condition of the disclosure is satisfied, with regard to each bearer (or with regard to the bearer to which the second embodiment is indicated).

The UE may perform proposed procedures, if the second condition of the disclosure is satisfied, with regard to each bearer (or with regard to the bearer to which the second embodiment is indicated).

In addition, if the source eNB indicates a handover, to which embodiments proposed by the disclosure are applied, to the UE, the source eNB may start data forwarding if the following third condition is satisfied. The third condition may mean that one of the following conditions or multiple conditions are satisfied.

If an indication that the UE has successfully completed handover is received from the target eNB If a handover command message is transmitted to the UE If a handover command message is transmitted to the UE, and if successful delivery (HARQ ACK, NACK, RLC ACK, or NACK) of the handover command message is identified If the source eNB receives, from the UE, an indication that the same disconnects from the source eNB (for example, RRC message (for example, RRCReconfiguration message), MAC CE, RLC control PDU, or PDCP control PDU).

If a handover command message is transmitted to the UE, if a predetermined timer is driven, and if the timer expires If information regarding confirmation of successful delivery of downlink data (for example, HARQ ACK or NACK, or RLC ACK or NACK) is not received from the UE for a predetermined time.

Next, the disclosure proposes a method wherein, if an eNB indicates the first embodiment proposed by the disclosure (normal handover method) or the second embodiment (DAPS handover method) to the UE through an RRC message (for example, handover command message), or if the same is indicated with regard to each bearer (or each logical channel) of the UE, the UE performs a handover procedure according to the first or second embodiment proposed by the disclosure, and an LTE or NR PDCP layer device connected to an AM DRB (RLC layer device operating in AM mode) or an LTE or NR PDCP layer device connected to a UM DRB (RLC layer device operating in UM mode) produces and configures a condition to trigger a PDCP status report and a triggered PDCP status report.

If one of the following multiple conditions is satisfied, each bearer-specific PDCP layer device may trigger, produce, and configure a PDCP status report and may deliver the same to a lower layer device, thereby performing transmission. The operations proposed below may be applied to a PDCP layer device of the UE or eNB.

If an upper layer device (RRC layer device) configures an LTE or NR PDCP layer device connected to an AM DRB (RLC layer device operating in AM mode) so as to trigger or send a PDCP status report (or an indicator (for example, status report required) in an RRC message configures whether or not to trigger a PDCP status report)

If the UE receives an RRC message (for example, handover message) from the eNB, if the message indicates the handover method corresponding to the first embodiment to the UE, and if a PDCP re-establishment procedure is indicated to an LTE or NR PDCP layer device connected to an AM DRB (RLC layer device operating in AM mode), or if an upper layer device (for example, RRC layer device) of the UE indicates a PDCP re-establishment procedure to an LTE or NR PDCP layer device connected to the AM DRB (RLC layer device operating in AM mode) of the UE The LTE or NR PDCP layer device connected to the AM DRB (RLC layer device operating in AM mode) may trigger and configure a PDCP status report and may transmit the same to the target or source eNB.

If the UE receives an RRC message (for example, handover message) from the eNB, if the RRC message indicates the handover method corresponding to the first embodiment to the UE, and if a PDCP data recovery procedure is indicated to an LTE or NR PDCP layer device connected to an AM DRB (RLC layer device operating in AM mode), or if an upper layer device (for example, RRC layer device) of the UE indicates a PDCP data recovery procedure to an LTE or NR PDCP layer device connected to the AM DRB (RLC layer device operating in AM mode) of the UE The LTE or NR PDCP layer device connected to the AM DRB (RLC layer device operating in AM mode) may trigger and configure a PDCP status report and may transmit the same to the target or source eNB.

If an RRC message (for example, handover message) received by the UE from the eNB indicates the handover method corresponding to the second embodiment (DAPS handover method) to the UE or with regard to each bearer of the UE, and if a DAPS handover method (or procedure proposed by the disclosure through an indicator) is indicated to an LTE or NR PDCP layer device connected to an AM DRB (RLC layer device operating in AM mode), or if an upper layer device (for example, RRC layer device) of the UE indicates a PDCP handover method (or procedure proposed by the disclosure through an indicator) to an LTE or NR PDCP layer device connected to the AM DRB (RLC layer device operating in AM mode) of the UE The LTE or NR PDCP layer device connected to the AM DRB (RLC layer device operating in AM mode) may trigger and configure a PDCP status report and may transmit the same to the target or source eNB. If the DAPS handover method is indicated, the source eNB may transmit a handover command message to the UE with regard to data of the bearer to which the DAPS handover method is indicated, and may instantly start downlink or uplink data forwarding to the target eNB. Therefore, if the UE transmits a PDCP status report regarding downlink data (indicating whether or not downlink data is successfully received) to the source eNB, unnecessary data forwarding may be prevented.

If an RRC message (for example, handover message) received by the UE from the eNB indicates the handover method corresponding to the second embodiment (DAPS handover method) to the UE or with regard to each bearer of the UE, if a DAPS handover method (or procedure proposed by the disclosure through an indicator) is configured for an LTE or NR PDCP layer device connected to an AM DRB (RLC layer device operating in AM mode), and if a lower layer device (MAC layer device) or an upper layer device (for example, RRC layer, if first timer has stopped) sends an indicator (for example, indicator instructing uplink data transmission switching) to the PDCP layer device, because the first condition proposed by the disclosure is satisfied, such that the PDCP layer device receives the indicator, or if a lower layer device (MAC layer device) or an upper layer device (for example, RRC layer, if first timer has stopped) sends an indicator (for example, indicator instructing uplink data transmission switching) to the PDCP layer device, because the first condition proposed by the disclosure is satisfied, such that the PDCP layer device receives the indicator The LTE or NR PDCP layer device connected to the AM DRB (RLC layer device operating in AM mode) may trigger and configure a PDCP status report and may transmit the same to the target or source eNB. When the PDCP layer device switches uplink data transmission, the UE may transmit a PDCP status report (or new PDCP control data) to the source or target eNB, thereby indicating to the source or target eNB that the PDCP layer device corresponding to the bearer of the UE has switched uplink data transmission. The source or target eNB may identify the timepoint at which the UE satisfies the first condition, and thus may reflect the same for scheduling and manage the transmission resource of the UE.

If an RRC message (for example, handover message) received by the UE from the eNB indicates the handover method corresponding to the second embodiment (DAPS handover method) to the UE or with regard to each bearer of the UE, if a DAPS handover method (or procedure proposed by the disclosure through an indicator) is configured for an LTE or NR PDCP layer device connected to an AM DRB (RLC layer device operating in AM mode), and if a lower layer device (MAC layer device) or an upper layer device (for example, RRC layer) sends an indicator (for example, indicator instructing the same to disconnect from the source eNB) to the PDCP layer device, because the second condition proposed by the disclosure is satisfied, such that the PDCP layer device receives the indicator, or if a lower layer device (MAC layer device) or an upper layer device (for example, RRC layer) sends an indicator (for example, indicator instructing the same to disconnect from the source eNB) to the PDCP layer device, because the second condition proposed by the disclosure is satisfied, such that the PDCP layer device receives the indicator The LTE or NR PDCP layer device connected to the AM DRB (RLC layer device operating in AM mode) may trigger and configure a PDCP status report and may transmit the same to the target or source eNB. When the PDCP layer device disconnects from the source eNB, the UE may transmit a PDCP status report (or new PDCP control data) to the source or target eNB, thereby indicating to the source or target eNB that the same has disconnected from the source eNB. The source or target eNB may identify the timepoint at which the UE satisfies the second condition, and thus may reflect the same for scheduling and manage the transmission resource of the UE.

If an upper layer device (RRC layer device) configures an LTE or NR PDCP layer device connected to a UM DRB (RLC layer device operating in UM mode) so as to trigger or send a PDCP status report (or an indicator (for example, status report required) in an RRC message configures whether or not to trigger a PDCP status report)

If an RRC message (for example, handover message) received by the UE from the eNB indicates the handover method corresponding to the second embodiment (DAPS handover method) to the UE or with regard to each bearer of the UE, and if a DAPS handover method (or procedure proposed by the disclosure through an indicator) is indicated to an LTE or NR PDCP layer device connected to a UM DRB (RLC layer device operating in UM mode), or if an upper layer device (for example, RRC layer device) of the UE indicates a DAPS handover method (or procedure proposed by the disclosure through an indicator) to an LTE or NR PDCP layer device connected to the UM DRB (RLC layer device operating in UM mode) of the UE The LTE or NR PDCP layer device connected to the UM DRB (RLC layer device operating in UM mode) may trigger and configure a PDCP status report and may transmit the same to the target or source eNB. If the DAPS handover method is indicated, the source eNB may transmit a handover command message to the UE with regard to data of the bearer to which the DAPS handover method is indicated, and may instantly start downlink or uplink data forwarding to the target eNB. Therefore, if the UE transmits a PDCP status report regarding downlink data (indicating whether or not downlink data is successfully received) to the source eNB, unnecessary data forwarding may be prevented.

If an RRC message (for example, handover message) received by the UE from the eNB indicates the handover method corresponding to the second embodiment (DAPS handover method) to the UE or with regard to each bearer of the UE, if a DAPS handover method (or procedure proposed by the disclosure through an indicator) is configured for an LTE or NR PDCP layer device connected to a UM DRB (RLC layer device operating in UM mode), and if a lower layer device (MAC layer device) or an upper layer device (for example, RRC layer, if first timer has stopped) sends an indicator (for example, indicator instructing uplink data transmission switching) to the PDCP layer device, because the first condition proposed by the disclosure is satisfied, such that the PDCP layer device receives the indicator, or if a lower layer device (MAC layer device) or an upper layer device (for example, RRC layer, if first timer has stopped) sends an indicator (for example, indicator instructing uplink data transmission switching) to the PDCP layer device, because the first condition proposed by the disclosure is satisfied, such that the PDCP layer device receives the indicator The LTE or NR PDCP layer device connected to the UM DRB (RLC layer device operating in UM mode) may trigger and configure a PDCP status report and may transmit the same to the target or source eNB. When the PDCP layer device switches uplink data transmission, the UE may transmit a PDCP status report (or new PDCP control data) to the source or target eNB, thereby indicating to the source or target eNB that the PDCP layer device corresponding to the bearer of the UE has switched uplink data transmission. The source or target eNB may identify the timepoint at which the UE satisfies the first condition, and thus may reflect the same for scheduling and manage the transmission resource of the UE.

If an RRC message (for example, handover message) received by the UE from the eNB indicates the handover method corresponding to the second embodiment (DAPS handover method) to the UE or with regard to each bearer of the UE, if a DAPS handover method (or procedure proposed by the disclosure through an indicator) is configured for an LTE or NR PDCP layer device connected to a UM DRB (RLC layer device operating in UM mode), and if a lower layer device (MAC layer device) or an upper layer device (for example, RRC layer) sends an indicator (for example, indicator instructing the same to disconnect from the source eNB) to the PDCP layer device, because the second condition proposed by the disclosure is satisfied, such that the PDCP layer device receives the indicator, or if a lower layer device (MAC layer device) or an upper layer device (for example, RRC layer) sends an indicator (for example, indicator instructing the same to disconnect from the source eNB) to the PDCP layer device, because the second condition proposed by the disclosure is satisfied, such that the PDCP layer device receives the indicator The LTE or NR PDCP layer device connected to the UM DRB (RLC layer device operating in UM mode) may trigger and configure a PDCP status report and may transmit the same to the target or source eNB. When the PDCP layer device disconnects from the source eNB, the UE may transmit a PDCP status report (or new PDCP control data) to the source or target eNB, thereby indicating to the source or target eNB that the same has disconnected from the source eNB. The source or target eNB may identify the timepoint at which the UE satisfies the second condition, and thus may reflect the same for scheduling and manage the transmission resource of the UE.

If a PDCP status report is triggered in an LTE or NR PDCP layer device connected to an AM DRB (RLC layer device operating in AM mode) or an LTE or NR PDCP layer device connected to a UM DRB (RLC layer device operating in UM mode) according to the PDCP status report triggering condition proposed by the disclosure, the PDCP status report may be composed as follows:

If a PDCP status report is triggered in an NR PDCP layer device connected to an AM DRB or a UM DRB, or if a PDCP status report is triggered The UE may compose a PDCP status report as follows:

The UE configures the first missing COUNT (FMC) value of the PDCP status report to be the value of RX_DELIV parameter (COUNT value of first data not delivered to upper layer device).

If RX_DELIV value (COUNT value of first data not delivered to upper layer device) is smaller than RX_NEXT value (COUNT value of data expected to be received next)

The UE may configure the length of a bitmap field to be a length corresponding to a multiple of 8 including values from a COUNT value not including the first lost PDCP SDU to a COUNT value of the last out-of-sequence data, or may configure the length of a bitmap field to be a length from a COUNT value not including the first lost PDCP SDU to a COUNT value of a PDCP SDU which makes PDCP control data (PDCP status report) have a size of 9000 bytes. The length may be configured according to one of the two conditions, which is satisfied first.

If PDCP SDUs corresponding to the bitmap field fail to be received successfully, or if a header decompression failure occurs, the UE may configure the bitmap field corresponding to the PDCP SDUs to be 0.

If PDCP SDUs corresponding to the bitmap field are received successfully, the UE may configure the bitmap field corresponding to the PDCP SDUs to be 1.

When transmitting the PDCP status report configured as above to a lower layer device, the UE may use the first PDCP PDU of the transmitting PDCP layer device to send the same to the lower layer device. That is, the UE may assign the highest priority to the PDCP status report and, if the PDCP status report is produced, may deliver the same first to the lower layer device, thereby guaranteeing fast transmission.

If a PDCP status report is triggered in an LTE PDCP layer device connected to an AM DRB, or if a PDCP status report is triggered If there is data received due to re-establishment of a lower layer device (RLC layer device), the UE may first process the same and then compose a PDCP status report as follows:

The UE configures the first missing PDCP sequence number (FMS) value to be a value obtained by adding 1 to the sequence number of the first lost PDCP SDU, or the PDCP sequence number of the first data not delivered to an upper layer device, or the PDCP sequence number of last data delivered to the upper layer device.

If at least one out-of-sequence PDCP SDU or more than one thereof are stored in a buffer The UE may configure the length of a bitmap field to be a length corresponding to a multiple of 8 including values from a PDCP sequence value not including the first lost PDCP SDU to a PDCP sequence value of the last out-of-sequence data, or may configure the length of a bitmap field to be a length from a PDCP sequence value not including the first lost PDCP SDU to a PDCP sequence value of a PDCP SDU which makes PDCP control data (PDCP status report) have a size of 8188 bytes. The length may be configured according to one of the two conditions, which is satisfied first.

If PDCP SDUs corresponding to the bitmap field fail to be received successfully, or if a header decompression failure occurs, the UE may configure the bitmap field corresponding to the PDCP SDUs to be 0.

If PDCP SDUs corresponding to the bitmap field are received successfully, the UE may configure the bitmap field corresponding to the PDCP SDUs to be 1.

When transmitting the PDCP status report configured as above to a lower layer device, the UE may use the first PDCP PDU of the transmitting PDCP layer device to send the same to the lower layer device. That is, the UE may assign the highest priority to the PDCP status report and, if the PDCP status report is produced, may deliver the same first to the lower layer device, thereby guaranteeing fast transmission.

If a PDCP status report is triggered in an LTE PDCP layer device connected to a UM DRB, or if a PDCP status report is triggered If there is data received due to re-establishment of a lower layer device (RLC layer device), the UE may first process the same and then compose a PDCP status report as follows:

The UE configures the first missing PDCP sequence number (FMS) value or a new field value to be a value obtained by adding 1 to the sequence number of the first lost PDCP SDU, or the PDCP sequence number of the first data not delivered to an upper layer device, or the PDCP sequence number of last data delivered to the upper layer device.

If at least one out-of-sequence PDCP SDU or more than one thereof are stored in a buffer The UE may configure the length of a bitmap field to be a length corresponding to a multiple of 8 including values from a PDCP sequence value not including the first lost PDCP SDU (or the first PDCP SDU not delivered to the upper layer device or the PDCP SDU next to last data delivered to the upper layer device) to a PDCP sequence value of the last out-of-sequence data, or may configure the length of a bitmap field to be a length from a PDCP sequence value not including the first lost PDCP SDU to a PDCP sequence value of a PDCP SDU which makes PDCP control data (PDCP status report) have a size of 8188 bytes. The length may be configured according to one of the two conditions, which is satisfied first.

If PDCP SDUs corresponding to the bitmap field fail to be received successfully, or if a header decompression failure occurs, the UE may configure the bitmap field corresponding to the PDCP SDUs to be 0.

If PDCP SDUs corresponding to the bitmap field are received successfully, the UE may configure the bitmap field corresponding to the PDCP SDUs to be 1.

When transmitting the PDCP status report configured as above to a lower layer device, the UE may use the first PDCP PDU of the transmitting PDCP layer device to send the same to the lower layer device. That is, the UE may assign the highest priority to the PDCP status report and, if the PDCP status report is produced, may deliver the same first to the lower layer device, thereby guaranteeing fast transmission.

As another method, if there is data received due to re-establishment of a lower layer device (RLC layer device), the UE may first process the same. Thereafter, as another method, the UE may compose PDCP status report as follows:

The UE configures a first missing PDCP sequence number (FMS) value of the PDCP status report, a next received PDCP sequence number (NRS) field value thereof, or a new field value thereof to be a PDCP sequence number expected to be received next.

If at least one out-of-sequence PDCP SDU or more than one thereof are stored in a buffer The UE may configure the length of a bitmap field to be a length corresponding to a multiple of 8 including values from a PDCP sequence value not including a PDCP SDU expected to be received next to a PDCP sequence value of the last data delivered to the upper layer in descending order (or next data or first data not delivered to the upper layer device), or may configure the length of a bitmap field to be a length from a PDCP sequence value not including the PDCP SDU expected to be received next to a PDCP sequence value of a PDCP SDU, which makes PDCP control data (PDCP status report) have a size of 8188 bytes, in descending order. The length may be configured according to one of the two conditions, which is satisfied first.

If PDCP SDUs corresponding to the bitmap field fail to be received successfully, or if a header decompression failure occurs, the UE may configure the bitmap field corresponding to the PDCP SDUs to be 0.

If PDCP SDUs corresponding to the bitmap field are received successfully, the UE may configure the bitmap field corresponding to the PDCP SDUs to be 1.

When transmitting the PDCP status report configured as above to a lower layer device, the UE may use the first PDCP PDU of the transmitting PDCP layer device to send the same to the lower layer device. That is, the UE may assign the highest priority to the PDCP status report and, if the PDCP status report is produced, may deliver the same first to the lower layer device, thereby guaranteeing fast transmission.

If an NR PDCP layer device connected to a UM DRB or AM DRB receives the PDCP status report composed as above, and if the bitmap field is configured as 1, or if successful delivery of each piece of data having a COUNT value smaller than the FMC field is confirmed, the PDCP layer device may perform a procedure of discarding the data.

If an LTE PDCP layer device connected to an AM DRB receives the PDCP status report composed as above, and if the bitmap field is configured as 1, or if successful delivery of each piece of data having a COUNT value smaller than the FMS field is confirmed, the PDCP layer device may perform a procedure of discarding the data.

If an LTE PDCP layer device connected to a UM DRB receives the PDCP status report composed as above, and if the bitmap field is configured as 1, or if successful delivery of each piece of data having a COUNT value smaller than the FMS field (or NRS field or new field) or each piece of data having a COUNT value larger than the same is confirmed, the PDCP layer device may perform a procedure of discarding the data.

If the PDCP status report has been received as above, and if data, successful delivery of which is confirmed by the PDCP status report, has been delivered to a lower layer device (for example, RLC layer device), the PDCP layer device may send an indicator to the lower layer device so as to instruct the same to discard the data, and operations of the lower layer device, which has received the discard indicator, is as follows:

If an indicator instructing that data (for example, PDCP user data) be discarded is received from an LTE or NR PDCP layer device, and if the RLC layer device that has received the discard indicator is an LTE RLC layer device If a part of user data (PDCP PDU, PDCP data PDU, or RLC SDU) received from the upper layer device (PDCP layer device) has not yet been mapped to RLC user data (RLC data PDU), or if the same has not been produced as RLC user data, the LTE PDCP layer device discards the user data. Therefore, if a part of the user data has already been mapped to the RLC user data (RLC data PDU), or if the same has been produced as RLC user data, the LTE PDCP layer device may transmit data to the source eNB without discarding the user data.

If an indicator instructing that data (for example, PDCP user data) be discarded has been received from the LTE or NR PDCP layer device, and if the RLC layer device that has received the discard indicator is an NR RLC layer device, If user data (PDCP PDU, PDCP data PDU, or RLC SDU) received from the upper layer device (PDCP layer device) or a part of the user data has been neither delivered nor sent to a lower layer device, the NR RLC layer device discards the user data. Therefore, if the user data or a part of the user data has been delivered or sent to a lower layer device, the NR RLC layer device may transmit data to the source eNB without discarding the user data. Therefore, unlike the LTE RLC layer device, the NR RLC layer device may discard more data, because even if the user data has been produced as RLC user data, the same may be discarded, as long as the same has not been delivered to a lower layer device. In addition, unnecessary data transmission may be prevented more efficiently.

Figure 11:
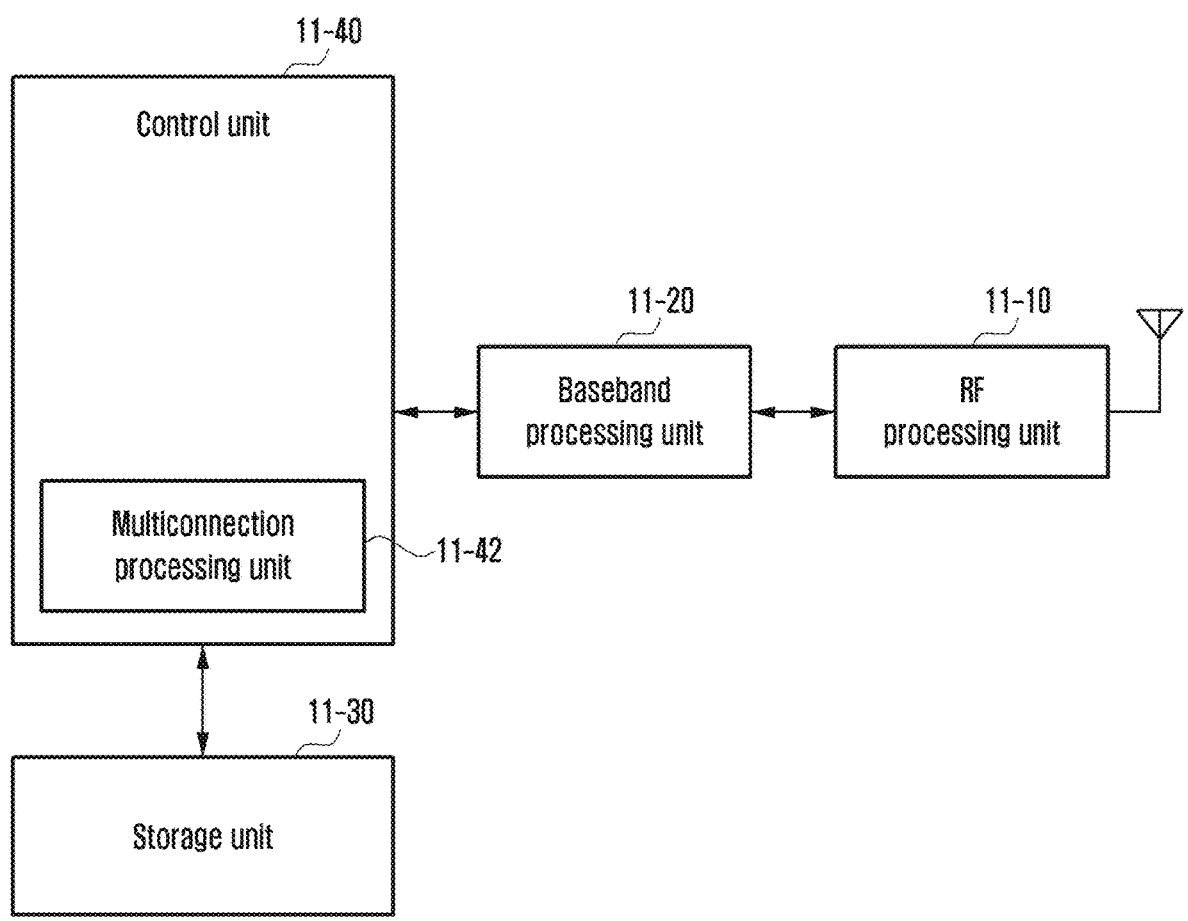
FIG. 11 illustrates the structure of a UE to which an embodiment of the disclosure is applicable.

FIG. 11 illustrates the structure of a UE to which an embodiment of the disclosure is applicable.

Referring to the diagram, the UE includes a radio frequency (RF) processing unit 11-10, a baseband processing unit 11-20, a storage unit 11-30, and a control unit 11-40.

The RF processing unit 11-10 is configured to perform functions for transmitting/receiving signals through a radio channel, such as signal band conversion and amplification. That is, the RF processing unit 11-10 up-converts a baseband signal provided from the baseband processing unit 11-20 to an RF band signal, transmits the same through an antenna, and down-converts an RF band signal received through the antenna to a baseband signal. For example, the RF processing unit 11-10 may include a transmitting filter, a receiving filter, an amplifier, a mixer, an oscillator, a digital-to-analog convertor (DAC), an analog-to-digital convertor (ADC), and the like. Although only one antenna is illustrated in the diagram, the UE may include multiple antennas. In addition, the RF processing unit 11-10 may include multiple RF chains. Moreover, the RF processing unit 11-10 may perform beamforming. For the purpose of beamforming, the RF processing unit 11-10 may adjust the phase and magnitude of respective signals transmitted/received through multiple antennas or antenna elements. In addition, the RF processing unit may perform MIMO, and may receive multiple layers when performing the MIMO operation. The RF processing unit 11-10 may appropriately configure multiple antennas or antenna elements under the control of the control unit, thereby performing received beam sweeping, or may adjust the direction of a received beam and the beam width such that the received beam is coordinated with a transmitted beam.

The baseband processing unit 11-20 is configured to perform a function for conversion between a baseband signal and a bit string according to the physical layer specification of the system. For example, during data transmission, the baseband processing unit 11-20 generates complex symbols by encoding and modulating a transmission bit string. In addition, during data reception, the baseband processing unit 11-20 restores a reception bit string by demodulating and decoding a baseband signal provided from the RF processing unit 11-10. For example, if an orthogonal frequency division multiplexing (OFDM) scheme is followed, and during data transmission, the baseband processing unit 11-20 generates complex symbols by encoding and modulating a transmission bit string, maps the complex symbols to subcarriers, and then configures OFDM symbols through inverse fast Fourier transform (IFFT) operation and cyclic prefix (CP) insertion. In addition, during data reception, the baseband processing unit 11-20 divides a baseband signal provided from the RF processing unit 11-10 into units of OFDM symbols, restores signals mapped to subcarriers through a fast Fourier transform (FFT) operation, and then restores the reception bit string through demodulation and decoding.

The baseband processing unit 11-20 and the RF processing unit 11-10 transmit and receive signals as described above. Accordingly, the baseband processing unit 11-20 and the RF processing unit 11-10 may be referred to as transmitting units, receiving units, transmitting/receiving units, or communication units. Furthermore, at least one of the baseband processing unit 11-20 and the RF processing unit 11-10 may include multiple communication modules to support multiple different radio access technologies. In addition, at least one of the baseband processing unit 11-20 and the RF processing unit 11-10 may include different communication modules in order to process signals in different frequency bands. For example, the different radio access technologies may include an LTE network, an NR network, and the like. In addition, the different frequency bands may include a super-high frequency (SHF) (for example, 2.5 GHz or 5 GHz) band and a millimeter wave (for example, 60 GHz) band.

The storage unit 11-30 is configured to store data for operations of the UE, such as basic programs, application programs, and configuration information. The storage unit 11-30 provides stored data at the request of the control unit 11-40.

The control unit 11-40 is configured to control overall operations of the UE. For example, the control unit 11-40 transmits/receives signals through the baseband processing unit 11-20 and the RF processing unit 11-10. In addition, the control unit 11-40 records and reads data in the storage unit 11-40. To this end, the control unit 11-40 may include at least one processor. For example, the control unit 11-40 may include a communication processor (CP) configured to perform control for communication and an application processor (AP) configured to control an upper layer, such as an application program. The control unit 11-40 may further include a multiconnection processing unit 11-42 supporting multiconnection.

Figure 12:
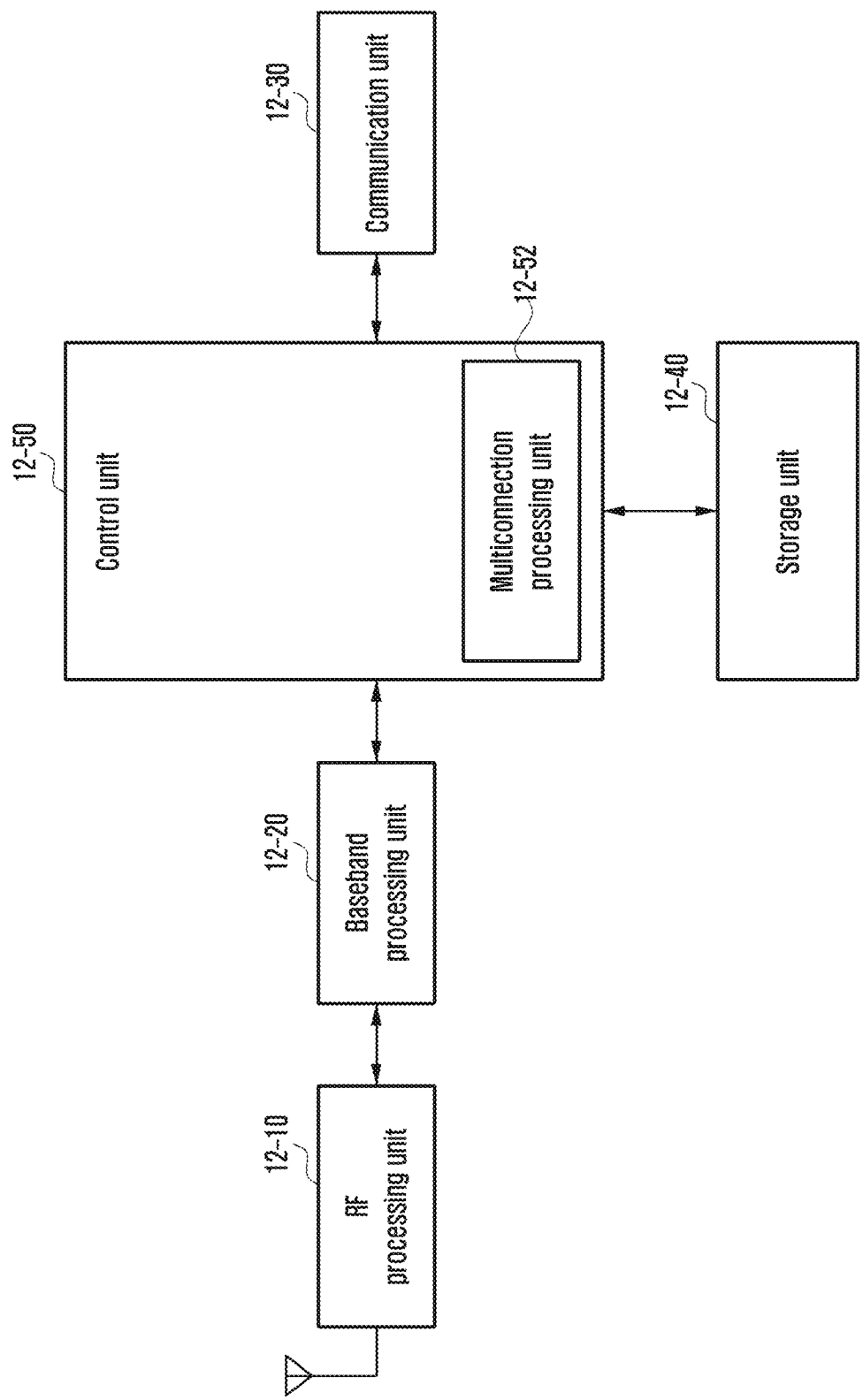
FIG. 12 illustrates a block configuration of a transmission reception point (TRP) in a wireless communication system to which an embodiment of the disclosure is applicable.

FIG. 12 illustrates a block configuration of a TRP in a wireless communication system to which an embodiment of the disclosure is applicable.

As illustrated in the diagram, the eNB includes an RF processing unit 12-10, a baseband processing unit 12-20, a backhaul communication unit 12-30, a storage unit 12-40, and a control unit 12-50.

The RF processing unit 12-10 is configured to perform functions for transmitting/receiving signals through a radio channel, such as signal band conversion and amplification. That is, the RF processing unit 12-10 up-converts a baseband signal provided from the baseband processing unit 12-20 to an RF band signal, transmits the same through an antenna, and down-converts an RF band signal received through the antenna to a baseband signal. For example, the RF processing unit 12-10 may include a transmitting filter, a receiving filter, an amplifier, a mixer, an oscillator, a DAC, an ADC, and the like. Although only one antenna is illustrated in the diagram, the first access node may include multiple antennas. In addition, the RF processing unit 12-10 may include multiple RF chains. Moreover, the RF processing unit 12-10 may perform beamforming. For the purpose of beamforming, the RF processing unit 12-10 may adjust the phase and magnitude of respective signals transmitted/received through multiple antennas or antenna elements. The RF processing unit may perform a downward MIMO operation by transmitting at least one layer.

The baseband processing unit 12-20 is configured to perform a function for conversion between a baseband signal and a bit string according to the physical layer specification of the first radio access technology. For example, during data transmission, the baseband processing unit 12-20 generates complex symbols by encoding and modulating a transmission bit string. In addition, during data reception, the baseband processing unit 12-20 restores a reception bit string by demodulating and decoding a baseband signal provided from the RF processing unit 12-10. For example, if an OFDM scheme is followed, and during data transmission, the baseband processing unit 12-20 generates complex symbols by encoding and modulating a transmission bit string, maps the complex symbols to subcarriers, and then configures OFDM symbols through IFFT operation and CP insertion. In addition, during data reception, the baseband processing unit 12-20 divides a baseband signal provided from the RF processing unit 12-10 into units of OFDM symbols, restores signals mapped to subcarriers through an FFT operation, and then restores the reception bit string through demodulation and decoding. The baseband processing unit 12-20 and the RF processing unit 12-10 transmit and receive signals as described above. Accordingly, the baseband processing unit 12-20 and the RF processing unit 12-10 may be referred to as transmitting units, receiving units, transmitting/receiving units, or communication units.

The communication unit 12-30 is configured to provide an interface for communicating with other nodes in the network.

The storage unit 12-40 is configured to store data for operations of the main eNB, such as basic programs, application programs, and configuration information. Particularly, the storage unit 12-40 may store information regarding a bearer assigned to an accessed UE, a measurement result reported by the access UE, and the like. In addition, the storage unit 12-40 may store information serving as a reference to determine whether to provide the UE with multiconnection or to abort the same. In addition, the storage unit 12-40 provides stored data at the request of the control unit 12-50.

The control unit 12-50 is configured to control overall operations of the main eNB. For example, the control unit 12-50 transmits/receives signals through the baseband processing unit 12-20 and the RF processing unit 12-10 or through the backhaul communication unit 12-30. In addition, the control unit 12-50 records and reads data in the storage unit 12-40. To this end, the control unit 12-50 may include at least one processor. The control unit 12-50 may further include a multiconnection processing unit 12-52 supporting multiconnection.

The embodiments of the disclosure described and shown above in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a source base station, a first radio resource control (RRC) message configuring a data radio bearer (DRB) associated with a dual active protocol stack (DAPS) handover, the first RRC message including information on status report required, and the information indicating that the DRB is configured to transmit a packet data convergence protocol (PDCP) status report in uplink;
   performing, with a target base station, a random access procedure for a DAPS handover based on the first RRC message;
   in case that a successful completion of the of the random access procedure is identified by a medium access control (MAC) entity, indicating the successful completion of the random access procedure to an upper layer;
   in case that the successful completion of the random access procedure is identified by the upper layer, requesting uplink data switching for the DRB to a PDCP entity;
   in case that request of the uplink data switching from the upper layer is identified by the PDCP entity,
   triggering a first PDCP status report for the DRB; and
   transmitting, to the target base station, the triggered first PDCP status report.

2. The method of claim 1, wherein the DRB associated with the first PDCP status report is at least one of acknowledged mode (AM) DRB or unacknowledged mode (UM) DRB.

3. The method of claim 1, further comprising:
   receiving, from the target base station, a second RRC message including an indication to release a connection with the source base station;
   triggering a second PDCP status report for the DRB based on the indication; and
   transmitting, to the target base station, the triggered second PDCP status report.

4. A method performed by a base station in a wireless communication system, the method comprising:
   performing, with a terminal, a random access procedure for a dual active protocol stack (DAPS) handover by using a data radio bearer (DRB) associated with the DAPS handover;
   in case that the random access procedure is successfully completed, receiving, from the terminal, a first PDCP status report for the DRB;
   transmitting, to the terminal, a radio resource control (RRC) message including an indication to release a connection with a source base station; and
   receiving, from the terminal, a second PDCP status report for the DRB.

5. The method of claim 4, wherein the DRB associated with the first PDCP status report is at least one of acknowledged mode (AM) DRB or unacknowledged mode (UM) DRB.

6. The method of claim 4,
   wherein the DRB associated with the second PDCP status report is an acknowledged mode (AM) DRB.

7. A terminal in a wireless communication system, the terminal comprising:
   a transceiver configured to transmit and receive a signal; and
   a controller configured to:
      receive, from a source base station, a first radio resource control (RRC) message configuring a data radio bearer (DRB) associated with a dual active protocol stack (DAPS) handover, the first RRC message including information on status report required, and the information indicating that the DRB is configured to transmit a packet data convergence protocol (PDCP) status report in uplink,
      perform, with a target base station, a random access procedure for a DAPS handover based on the first RRC message,
      in case that a successful completion of the of the random access procedure is identified by a medium access control (MAC) entity, indicate the successful completion of the random access procedure to an upper layer,
      in case that the successful completion of the random access procedure is identified by the upper layer, request uplink data switching for the DRB to a PDCP entity, in case that request of the uplink data switching from the upper layer is identified by the PDCP entity trigger a first PDCP status report for the DRB, and transmit, to the target base station, the triggered first PDCP status report.

8. The terminal of claim 7, wherein the DRB associated with the first PDCP status report is at least one of acknowledged mode (AM) DRB or unacknowledged mode (UM) DRB.

9. The terminal of claim 7, wherein the controller is further configured to:
receive, from the target base station, a second RRC message including an indication to release a connection with the source base station;
trigger a second PDCP status report for the DRB based on the indication; and
transmit, to the target base station, the triggered second PDCP status report.

10. A base station in a wireless communication system, the base station comprising:
a transceiver configured to transmit and receive a signal; and
a controller configured to:
perform, with a terminal, a random access procedure for a dual active protocol stack (DAPS) handover by using a data radio bearer (DRB) associated with the DAPS handover,
in case that the random access procedure is successfully completed, receive, from the terminal, a first PDCP status report for the DRB,
transmit, to the terminal, a radio resource control (RRC) message including an indication to release a connection with a source base station, and
receive, from the terminal, a second PDCP status report for the DRB.

11. The base station of claim 10, wherein the DRB associated with the first PDCP status report is at least one of acknowledged mode (AM) DRB or unacknowledged mode (UM) DRB.

12. The base station of claim 10, wherein the DRB associated with the second PDCP status report is an acknowledged mode (AM) DRB.

* * * * *